US008348747B2

(12) United States Patent
Arezina et al.

(10) Patent No.: US 8,348,747 B2
(45) **Date of Patent: *Jan. 8, 2013**

(54) MULTI-PLAYER, MULTI-TOUCH TABLE FOR USE IN WAGERING GAME SYSTEMS

(75) Inventors: Vladimir I. Arezina, Chicago, IL (US); Gilbert J. Q. Burak, Chicago, IL (US); Mark B. Gagner, West Chicago, IL (US); Benjamin T. Gomez, Chicago, IL (US); Joel R. Jaffe, Glenview, IL (US); James V. Palermo, Chicago, IL (US); James M. Rasmussen, Chicago, IL (US); Gene Rigsby, Chicago, IL (US); Richard T. Schwartz, Chicago, IL (US); Craig J. Sylla, Round Lake, IL (US); Alfred Thomas, Las Vegas, NV (US); Timothy C. Loose, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/407,046

(22) Filed: Feb. 28, 2012

(65) Prior Publication Data

US 2012/0157193 A1 Jun. 21, 2012

Related U.S. Application Data

(63) Continuation of application No. 12/444,112, filed as application No. PCT/US2007/021625 on Oct. 10, 2007, now Pat. No. 8,147,316.

(60) Provisional application No. 60/931,534, filed on May 24, 2007, provisional application No. 60/850,460, filed on Oct. 10, 2006.

(51) Int. Cl.
*G06F 17/00* (2006.01)

(52) U.S. Cl. ........................................................ 463/20

(58) Field of Classification Search .............. 463/16–25, 463/37, 39, 42
See application file for complete search history.

(56) References Cited

U.S. PATENT DOCUMENTS 4,484,179 A 11/1984 Kasday
4,746,770 A 5/1988 McAvinney
(Continued)

FOREIGN PATENT DOCUMENTS

EP 309946 4/1989
(Continued)

OTHER PUBLICATIONS

Hand Tracking, Finger Identification, and Chordic Manipulation on a Multi-Touch Surface, by Wayne Westerman; 363 pages (Spring 1999).

(Continued)

*Primary Examiner* — Ronald Laneau
(74) *Attorney, Agent, or Firm* — Nixon Peabody LLP

(57) ABSTRACT

A multi-player gaming system sensing multiple simultaneous contacts on a surface of a gaming table, differentiating contacts by different players. Privacy controls selectively display private information visible to only one of the players on or near the display surface of the gaming table. The gaming system also detects physical objects placed on the surface of the gaming table, causing wagering game functions or peripheral functions to be performed as a result of the placement of the object on the display surface.

25 Claims, 30 Drawing Sheets

U.S. PATENT DOCUMENTS

| | | | | |
|---|---|---|---|---|
| 4,968,877 | A | 11/1990 | McAvinney et al. | |
| 5,511,148 | A | 4/1996 | Wellner | |
| 5,589,856 | A | 12/1996 | Stein et al. | |
| 5,808,567 | A | 9/1998 | McCloud | |
| 5,896,126 | A | 4/1999 | Shieh | |
| 5,943,043 | A | 8/1999 | Furuhata et al. | |
| 6,067,112 | A | 5/2000 | Wellner et al. | |
| 6,246,395 | B1 | 6/2001 | Goyins et al. | |
| 6,255,604 | B1 | 7/2001 | Tokioka et al. | |
| 6,364,314 | B1 | 4/2002 | Canterbury | |
| 6,607,443 | B1 | 8/2003 | Miyamoto et al. | |
| 6,677,932 | B1 | 1/2004 | Westerman | |
| 6,788,295 | B1 | 9/2004 | Inkster | |
| 6,819,312 | B2 | 11/2004 | Fish | |
| 6,856,259 | B1 | 2/2005 | Sharp | |
| 7,077,009 | B2 | 7/2006 | Lokhorst et al. | |
| 7,204,428 | B2 | 4/2007 | Wilson | |
| 7,254,775 | B2 | 8/2007 | Geaghan et al. | |
| 7,331,868 | B2 | 2/2008 | Beaulieu et al. | |
| RE40,153 | E | 3/2008 | Westerman et al. | |
| 7,379,562 | B2 | 5/2008 | Wilson | |
| 7,397,464 | B1 | 7/2008 | Robbins et al. | |
| 7,411,575 | B2 | 8/2008 | Hill et al. | |
| 7,479,949 | B2 | 1/2009 | Jobs et al. | |
| 7,936,341 | B2 | 5/2011 | Weiss | |
| 2003/0067447 | A1 | 4/2003 | Geaghan et al. | |
| 2004/0001048 | A1 | 1/2004 | Kraus et al. | |
| 2004/0029636 | A1 | 2/2004 | Wells | |
| 2004/0053695 | A1 | 3/2004 | Mattice et al. | |
| 2004/0063482 | A1 | 4/2004 | Toyoda | |
| 2004/0166930 | A1 | 8/2004 | Beaulieu et al. | |
| 2005/0227217 | A1 | 10/2005 | Wilson | |
| 2005/0259378 | A1 | 11/2005 | Hill et al. | |
| 2006/0001652 | A1 | 1/2006 | Chiu et al. | |
| 2006/0010400 | A1 | 1/2006 | Dehlin et al. | |
| 2006/0031786 | A1 | 2/2006 | Hillis et al. | |
| 2006/0073891 | A1 | 4/2006 | Holt | |
| 2006/0097991 | A1 | 5/2006 | Hotelling et al. | |
| 2006/0101354 | A1 | 5/2006 | Hashimoto et al. | |
| 2006/0164399 | A1 | 7/2006 | Cheston et al. | |
| 2006/0284874 | A1 | 12/2006 | Wilson | |
| 2006/0294247 | A1 | 12/2006 | Hinckley et al. | |
| 2007/0124370 | A1 | 5/2007 | Nareddy et al. | |
| 2007/0152984 | A1* | 7/2007 | Ording et al. | 345/173 |
| 2007/0177803 | A1 | 8/2007 | Elias et al. | |
| 2007/0201863 | A1 | 8/2007 | Wilson et al. | |
| 2007/0236478 | A1* | 10/2007 | Geaghan et al. | 345/173 |
| 2007/0247435 | A1 | 10/2007 | Benko et al. | |
| 2008/0076506 | A1 | 3/2008 | Nguyen et al. | |
| 2008/0158145 | A1 | 7/2008 | Westerman | |
| 2008/0158146 | A1 | 7/2008 | Westerman | |
| 2008/0158147 | A1 | 7/2008 | Westerman et al. | |
| 2008/0158168 | A1 | 7/2008 | Westerman et al. | |
| 2008/0158169 | A1 | 7/2008 | O'Connor et al. | |
| 2008/0158174 | A1 | 7/2008 | Land et al. | |
| 2008/0163130 | A1 | 7/2008 | Westerman | |
| 2008/0180654 | A1 | 7/2008 | Bathiche et al. | |
| 2008/0211766 | A1* | 9/2008 | Westerman et al. | 345/156 |
| 2008/0231611 | A1 | 9/2008 | Bathiche et al. | |
| 2008/0309631 | A1 | 12/2008 | Westerman et al. | |
| 2008/0309634 | A1* | 12/2008 | Hotelling et al. | 345/173 |
| 2009/0002327 | A1 | 1/2009 | Wilson et al. | |
| 2009/0002344 | A1* | 1/2009 | Wilson et al. | 345/178 |
| 2009/0021489 | A1* | 1/2009 | Westerman et al. | 345/173 |
| 2009/0118001 | A1 | 5/2009 | Kelly et al. | |
| 2009/0118006 | A1 | 5/2009 | Kelly et al. | |
| 2009/0143141 | A1* | 6/2009 | Wells et al. | 463/37 |
| 2009/0197676 | A1 | 8/2009 | Baerlocher et al. | |
| 2010/0124967 | A1 | 5/2010 | Lutnick et al. | |
| 2010/0130280 | A1 | 5/2010 | Arezina et al. | |

FOREIGN PATENT DOCUMENTS

| | | | |
|---|---|---|---|
| JP | 1269120 | A | 10/1989 |
| JP | 8083144 | A | 3/1996 |
| JP | 8190453 | A | 7/1996 |
| JP | 8241161 | A | 9/1996 |
| JP | 2000/010733 | A | 1/2000 |
| WO | WO/97/30416 | | 8/1997 |
| WO | WO/99/19855 | | 4/1999 |
| WO | WO/2005/114369 | A2 | 12/2005 |
| WO | WO/2006/020305 | | 2/2006 |
| WO | WO/2007/003928 | | 1/2007 |
| WO | WO/2008/095132 | | 10/2008 |
| WO | WO/2008/017077 | | 12/2008 |

OTHER PUBLICATIONS

A Multi-Touch Three Dimensional Touch-Sensitive Tablet; CHI'85 Proceedings; pp. 21-25 (Apr. 1985).

The Sensor Frame Graphic Manipulator Final Report (Sensor Frame) 27 pages; (printed on Feb. 6, 2009).

The Design of a GUI Paradigm based on Tablets, Two-Hands, and Transparency; Gordon Kurtenbach, George Fitmaurice, Thomas Baudel, and Bill Buxton; 8 pages; (printed on Feb. 6, 2009).

SmartSkin: An Infrastructure for Freehand Manipulation on Interactive Surfaces, by Jun Rekimoto, Interaction Laboratory; 8 pages; (printed on Feb. 6, 2009).

Single-Handed Interction Techniques for Multiple Pressure-Sensitive Strips by Gábor Blaskó, Steven Feiner; 4 pages; (printed on Feb. 6, 2009).

A Multi-finger Interface for Performance Animation of Deformable Drawings; Tomer Moscovich, Takeo Igarashi, Jun Rekimoto, Kentaro Fukuchi, John F. Hughes; 2 pages; (printed on Feb. 6, 2009).

Precise Selection Techniques for Multi-Touch Screens; Hrvoje Benko and Andrew D. Wilson and Patrick Baudisch; 10 pages; (printed on Feb. 6, 2009).

ThinSight: Versatile Multi-touch Sensing for Thin Form-factor Displays; Steve Hodges, Shahram Izadi, Alex Butler, Alban Rrustemi and Bill Buxton; 10 pages; (printed on Feb. 6, 2009).

Written Opinion corresponding to co-pending International Patent Application Serial No. PCT/US2007/021625, United States Patent Office, dated Sep. 15, 2008, 3 pages.

International Search Report corresponding to co-pending International Patent Serial No. PCT/US2007/021625, United States Patent Office, dated Sep. 15, 2008, 2 pages.

Web pages printed from http://multi-touchscreen.com/microsoft-surface-video-multi-touch-jeff-han-apple-bill-gates.html; (downloaded Aug. 24, 2009); 7 pages.

Web pages printed from http://www.jazzmutant.com/lemur_overview.php; (downloaded Aug. 24, 2009); 2 pages.

Web pages printed from http://www.merl.com/projects/DiamondTouch/; (downloaded Aug. 24, 2009); 5 pages.

Web pages printed from http://www.merl.com/projects/?proj_area=Off+the+Desktop+Interaction+and+Dis; (Downloaded Aug. 24, 2009); 1 page.

Web pages printed from http://www.merl.com/projects/diamondspin/; (Downloaded Aug. 24, 2009); 2 pages.

Web pages printed from http://kioskmarketplace.com/article.php?id=12284&na=1; (Downloaded Aug. 25, 2009); 5 pages.

* cited by examiner

MULTI-PLAYER, MULTI-TOUCH TABLE FOR USE IN WAGERING GAME SYSTEMS

CROSS-REFERENCE TO RELATED APPLICATIONS

This application is a continuation of U.S. patent application Ser. No. 12/444,112, filed on Apr. 2, 2009, now allowed, which is a U.S. National Stage of International Application No. PCT/US2007/021625, filed Oct. 10, 2007, which claims the benefit of U.S. Provisional Application No. 60/850,460, filed on Oct. 10, 2006 and U.S. Provisional Application No. 60/931,534, filed on May 24, 2007, all of which are incorporated herein by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

TECHNICAL FIELD

The embodiments disclosed relate generally to wagering games, including wagering game systems that include a multi-touch table.

BACKGROUND

Gaming machines, such as slot machines, video poker machines and the like, have been a cornerstone of the gaming industry for several years. Generally, the popularity of such machines with players is dependent on the perceived likelihood of winning money at the machine and the intrinsic entertainment value of the machine relative to other available gaming options. Where the available gaming options include a number of competing machines and the expectation of winning at each machine is roughly the same, or believed to be the same, players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a need for gaming machine manufacturers to continuously develop new games and enhancements that will attract frequent play through enhanced entertainment value to the player.

In some cases, a “secondary” or “bonus” game may be played in conjunction with a “basic” game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with “progressive jackpot” awards that are funded, at least in part, by a percentage of coin-in from the gaming machine or a plurality of participating gaming machines. Because the bonus game concept offers enhanced player appeal and excitement relative to other known games, there is a continuing need to develop gaming machines with new types of bonus games to satisfy the demands of players and operators.

Gaming machines have also utilized a variety of input devices for receiving input from a player, such as buttons and touch screen devices. However, these input devices are limited in that they can receive only one input at a time from the player. For example, if a player touches a singlepoint sensing device such as a singlepoint touch screen device at two distinct points simultaneously, only one coordinate is provided by the touch screen driver corresponding to one of the distinct points only or to a single average point between the two points. The inability of the player to interact with the gaming machine and other players by providing multiple inputs simultaneously is a significant disadvantage to gaming machines heretofore.

In wagering games that make use of private information (e.g., the identity of a hole card in a poker hand), it can be useful to keep the information confidential. In this way, the player with substantially exclusive access to the information can maintain his advantage over other players, by selectively excluding others from obtaining the same information.

SUMMARY OF THE INVENTION

One example disclosed herein is a multi-player gaming system having an input device for receiving a wager associated with a wagering game. A display surface displays the wagering game and a randomly selected outcome thereof. A first identification device associated with a first player receives contact data when the first player contacts the display surface. A second identification device associated with a second player receives contact data when the second player contacts the display surface. A contact sensing device is positioned adjacent to the display surface to transmit contact data to the first and second identification devices. A controller is in communication with the first and second identification devices and the display surface. The controller is programmed to execute a wagering-game function associated with the contact data and associates the wagering-game function with the first player or the second player based on the contact data.

Another example disclosed is a method of conducting a multi-player wagering game on a gaming system. A wager associated with a wagering game is received. The wagering game is displayed on a display surface in proximity to a first and a second player. Contact by the first player on the display surface is sensed and a first contact data signal is generated. Contact by the second player is sensed on the display surface and a second contact data signal is generated. A wagering-game function associated with either the first contact data signal or the second contact data signal is performed. The wagering-game function is associated with the first player or the second player based on the received contact data signals.

Another example disclosed is a multi-player gaming system including a wager input device for receiving a wager to play a wagering game. The system includes a display surface in sufficient proximity to at least a first and a second player to allow contact of the display surface by the first and second players. A first multipoint sensing device is located adjacent the display and produces data indicative of at least two distinct contact points sensed simultaneously by the first multipoint sensing device. A controller is coupled to the first multipoint sensing device and to the display. The controller is programmed to cause a wagering-game function associated with the multipoint input data to be executed.

Another example disclosed is a method of playing a multi-player wagering gaming. A wager to play the wagering game is received. A display surface is positioned in sufficient proximity to at least a first and a second player to allow contact of the display surface by the first and second players. At least two distinct contact points is sensed simultaneously. Data indicative of at least two distinct contact points sensed simultaneously by a first multipoint sensing device is produced. A wagering-game function is associated with the multipoint input data to be executed.

Briefly, according to some aspects and implementations, multi-player gaming system and method allowing multiple player interaction on a display surface is disclosed. The example system includes a display surface displaying a wagering game and a randomly selected outcome generated by the game. A first identification device is associated with a first player to receive contact data when the first player contacts the display surface. A second identification device is associated with a second player to receive contact data when the second player contacts the display surface. A contact sensing device is positioned adjacent to the display surface to output contact data to the first and second identification device. A controller is coupled to the first and second identification devices and the display surface, the controller being programmed to execute a wagering-game function associated with the contact data and associating the wagering-game function with the first player or the second player based on the contact data.

According to still other aspects and implementations, a multi-player gaming system and method allowing multiple player interaction on a display surface with privacy controls is disclosed. A system may include a display surface displaying a wagering game and a randomly selected outcome generated by the game. A first identification device is associated with a first player to receive contact data when the first player contacts the display surface. A second identification device is associated with a second player to receive contact data when the second player contacts the display surface. A contact sensing device is positioned adjacent to the display surface to output contact data to the first and second identification device. A controller is coupled to the first and second identification devices and the display surface, the controller being programmed to execute a wagering-game function associated with the contact data and associating the wagering-game function with the first player or the second player based on the contact data. Privacy controls operate to selectively display private information on or near the display surface.

Other aspects and implementations relate to a wagering game system including a multiplayer, multi-touch table on which physical objects can be placed causing wagering game functions or peripheral functions to be performed as a result of the placement of the object, its location or orientation, its shape, its weight, or other characteristics. The physical object may be a player tracking device carried by the player and placed on the wagering game table. The table surface defines a number of regions such that when the player tracking card is placed in a predefined region, a predetermined function is carried out. If the card is placed in a region defined for transferring funds, credits or wagers can be transferred between the card and the table. If the card or object is placed in a region defined for manipulating a virtual camera, turning the object will manipulate the orientation angle of a virtual camera depicting a wagering game image. The physical object may be a blank roulette wheel with unnumbered pockets, whose numbers are projected onto the spinning wheel by a downward-facing projector system that captures the wheel's rotational speed and ball position to create video images that change with the spinning wheel.

Additional aspects of the invention will be apparent to those of ordinary skill in the art in view of the detailed description of various embodiments, which is made with reference to the drawings, a brief description of which is provided below.

DETAILED DESCRIPTION

Figure 1A:
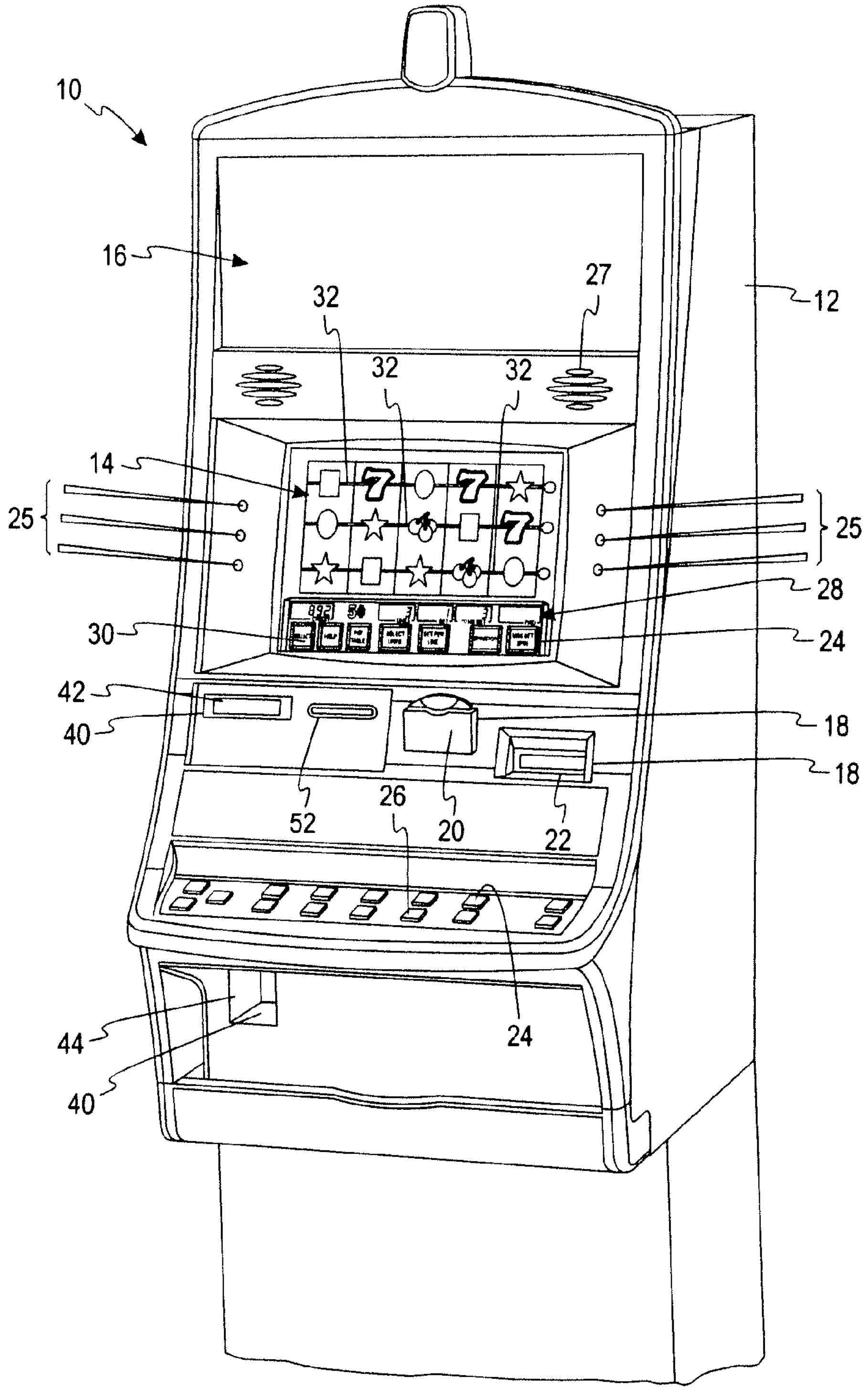
FIG. 1*a* is a perspective view of a free standing gaming machine.

While various embodiments of the invention may be realized in many different forms, there is shown in the drawings and described in detail several specific embodiments. These embodiments are meant to serve as examples, and not as limitations.

Referring to FIG. 1*a*, a gaming machine 10 is used in gaming establishments such as casinos. With regard to various embodiments of the invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1*a*). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1*a* as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
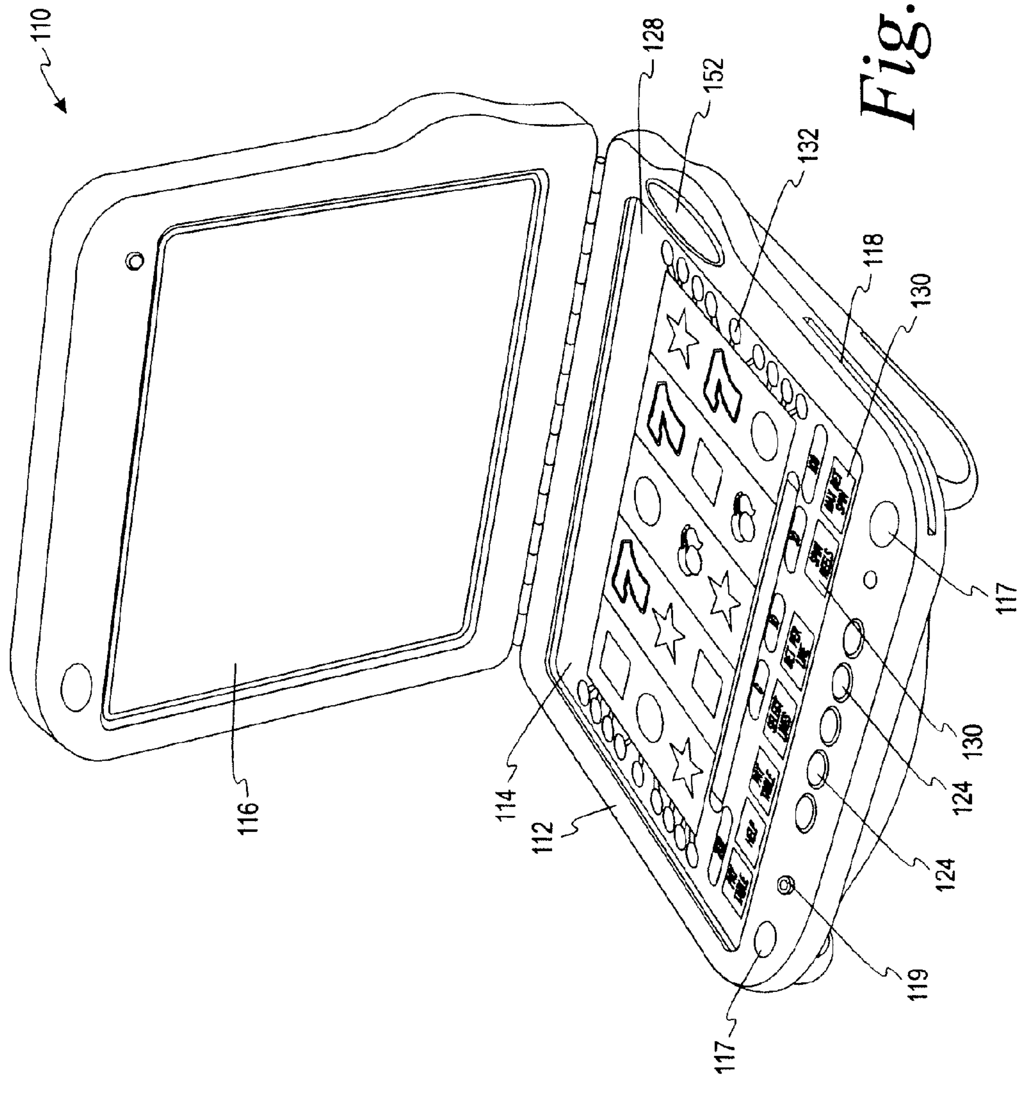
FIG. 1*b* is a perspective view of a handheld gaming machine.

Depicted in FIG. 1*b* is a handheld or mobile gaming machine 110. Like the free standing gaming machine 10, the handheld gaming machine 110 is preferably an electronic gaming machine configured to play a video casino game such as, but not limited to, slots, keno, poker, blackjack, and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen 128 mounted to a primary display 114 and/or secondary display 116. In one aspect, the touch screen 128 is matched to a display screen having one or more selectable touch keys 130 selectable by a user's touching of the associated area of the screen using a finger or a tool, such as a stylus pointer. A player enables a desired function either by touching the touch screen 128 at an appropriate touch key 130 or by pressing an appropriate push button 126 on the button panel. The touch keys 130 may be used to implement the same functions as push buttons 126. Alternatively, the push buttons may provide inputs for one aspect of the operating the game, while the touch keys 130 may allow for input needed for another aspect of the game.

The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably takes the form of a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 18 or an assignment of credits stored on the handheld gaming machine via the touch screen keys 130, player input device 124, or buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1*b*, comprises a biometric sensing device.

Figure 2:
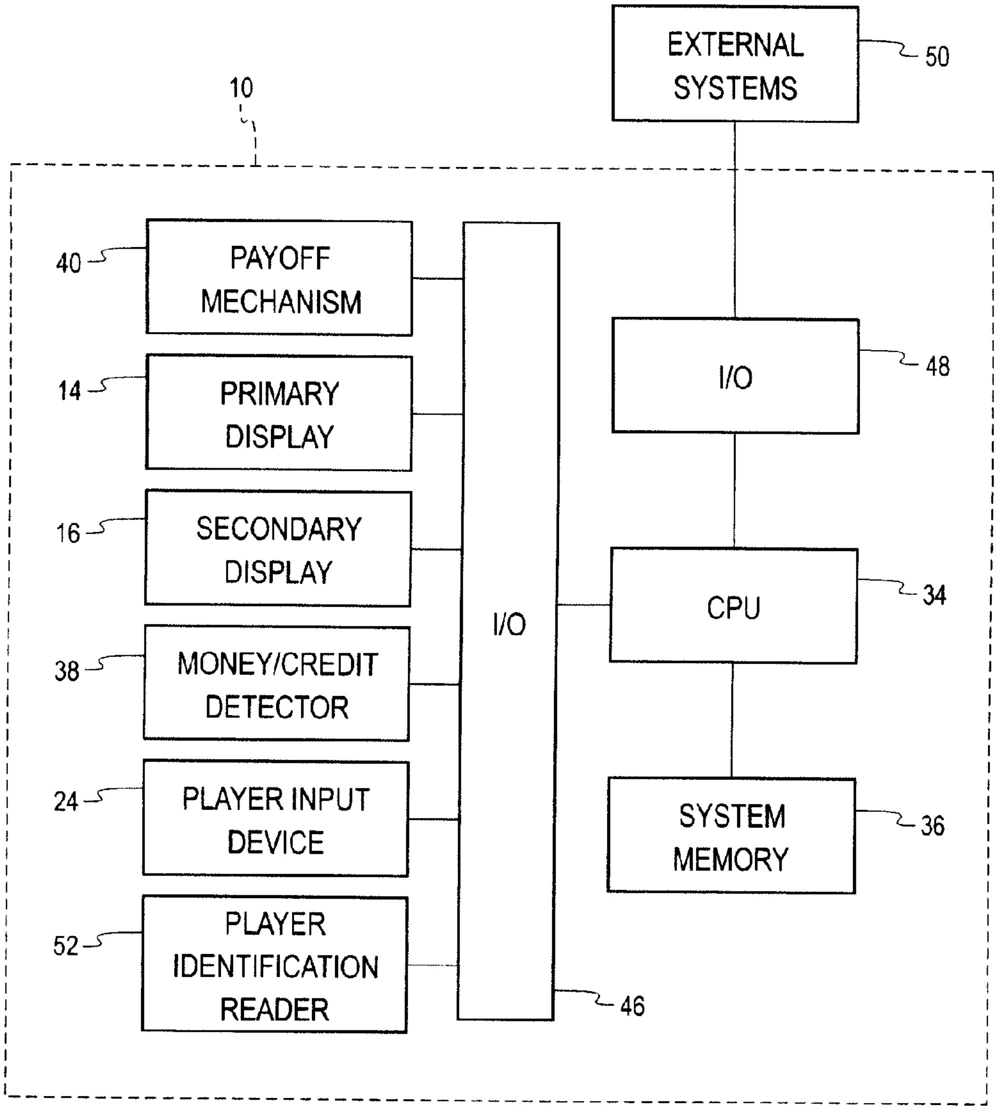
FIG. 2 is a block diagram of a control system suitable for operating the gaming machines of FIGS. 1*a* and 1*b;*

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1*a*, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10,110 may communicate with external systems 50 (in a wired or wireless manner) such that each machine operates as a "thin client," having relatively less functionality, a "thick client," having relatively more functionality, or through any range of functionality therebetween (e.g., a "rich client"). As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "rich client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10,110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

Aspects of various embodiments of the invention relate to multi-player wagering games that utilize single-point or multipoint/gesture sensing devices. In a preferred aspect, the wagering game is played on a gaming system having a table with a display surface and chairs and/or standing pads arranged around the table. Images associated with a wagering game are projected or displayed on the display surface and the players physically interact with the display surface to play the wagering game. The interactions facilitated by aspects of the various embodiments offer numerous advantages.

An advantage is that players have the ability to move virtual or physical wagering assets (such as a token) or other wagering elements across the display surface to or from a common area or among other players. Player-to-player exchanges are akin to a handshake, where one player moves a wagering element toward another player who accepts the wagering element and drags it to that player's designated area on the display surface. The gaming system keeps track of the exchanges and can even distinguish among the players seated around the display surface. As one player known to the gaming system touches a virtual or physical wagering element and moves it toward another player, the transaction is completed when the other player (also known to the gaming system) takes possession of that wagering element. The movements and the player's identities are tracked during the transaction. There is an immediacy and an intimacy associated with physically transacting things with another player that cannot be replicated in virtual or networked environments where players rarely even see each other. The display surface of the table allows all players to watch the exchanges and transactions, bringing a sense of realism and assurance to the players that a true transaction is taking place. In virtual environments, blind trust must be placed in the computing environment to carry out the transaction, which is often completed without the player's ability to observe the transaction throughout the entire process.

Another advantage is that touches or gestures by players interacting with a gaming system according to various embodiments of the invention can be distinguished among touches or gestures of other players. Traditional touch-based gaming systems do not have the ability to distinguish one touch from another. If a touch is detected, the gaming system is player-agnostic in the sense that it does not know that player's identity unless identity information is detected on the player or entered by the player. According to aspects of the various embodiments, touches by different players are distinguishable without the player's having to enter any identification information or have such information detected by the gaming system they are interacting with. Players' identities can remain anonymous, too, while playing multi-player games. In one aspect described below, the player is identified by a sensor in a chair, and each sensor outputs a different signal that is interpreted by the controller as a different player. If two players switch seats, for example, additional identification information could be inputted or detected, but not necessarily.

Still another advantage arises from the players' ability to select wagering elements or objects (whether virtual or physical) from a common area or move objects to a common area. The common area is visible by all players seated at the table, and the movement of objects in and out of the common area can be seen at all times by all players of the wagering game. Moreover, the players actually see which player has taken from or added to a common area and can observe the transfer of items into and out of the common area. This builds confidence in players particularly those who tend to prefer mechanical-type gaming machines. Objects moved into or out of a common area can be selected simultaneously by multiple players without one player having to wait for another player to complete a transfer. This eliminates sequential processing of commands present in traditional gaming systems, where there is a time-ordered sequence of events based on single inputs. Now, multiple inputs can be processed at once, without insisting upon any particular sequence of events to occur in order to keep the game play moving. Overall wagering throughput is increased because multiple wagers can be simultaneously received and multiple game actions can be taken simultaneously without waiting for other players or other wagering-game functions to be carried out. Moreover, there is an awareness by all players seated around the table as to what is happening at all times as the entire display surface is visible to all players, making all interactions at that table visible to all players. This builds confidence, allows players to observe each other and communicate with each other, and facilitates collective decision-making by the players as a group. Finally, because events need not be ordered or occur in a particular sequence, aspects of various embodiments of the invention allow players to enter and leave the wagering environment presented by the gaming system 300 freely. They may join at any point and leave at any point without disrupting the other players or requiring game play to be restarted or interrupted. Sensors in the chairs detect when players sit down or leave the table, and can automatically and quietly trigger any required transfers of wagering assets or balances to the player's account or to a portable data unit carried by the player, for example, without disrupting or interrupting ongoing game play. An example of such a multi-player wagering game is based on a virtual real estate wagering game, where players can own real estate on the table and rent that area out to other players who can place wagers on that area. Players can come and go in this game without disrupting ongoing game play, which theoretically continues indefinitely. Instead of chairs, the players may stand on pads that send signals to the table to distinguish among the players.

In a similar manner, players can barter or exchange assets in accordance with aspects of various embodiments of the invention across the display surface of the touch-responsive table. For example, the bartering medium may be cards, characters, chips, tokens, free spins, bonus awards, bonus rounds, and the like. To consummate a transaction, a player wishing to barter with another player slides the bartered asset across the table by gesturing on the display surface. The other player accepts the bartered asset and drags it to that other player's area on the table, completing the transaction. In one aspect, a "ramp up" trading feature is provided based on collective wagers placed by multiple players. Assets may have a fixed lifetime, fading and eventually disappearing over time. Under this "use it or lose it" scenario, players have an incentive to barter away assets before they lose them. The graphic depicting the bartered asset can be made to appear to fade so the player senses that he is about to lose the asset. In another aspect, players can trade unknown assets (such as a gift-wrapped present where the player does not yet know its contents, if any), creating a community mystery event. For example, two players can exchange presents in a multi-player wagering game based on the JACKPOT PARTY™ theme without knowing whether they have traded assets of equal value or any value.

Some aspects of the various embodiments, as mentioned above, encourage players as a group to communicate and interact with one another, which builds excitement and anticipation and a sense of community. The table format creates a more social atmosphere where onlookers and players see one another face-to-face (instead of the backs of their heads as with traditional upright gaming machines). As mentioned above, groups of players who might want to play together in a more social, relaxed environment, would be drawn to the gaming systems presented herein.

Another advantage offered by aspects of various embodiments of the invention described below is that player-defined areas can be defined on the display surface, giving the player a sense of identity or "ownership" of that area of the table. The player in a sense "stakes out" his area of the table, and that area becomes his own to interact with the wagering game. For example, the player can define a betting area where wagering assets are physically placed or moved (via gestures) into or out of during game play. The player can define the size of an object (the size may be constrained by the size of the player's wager, for example), that increases the probability of winning an award. Player-specific regions are also created on the display surface for each player, and within that region, the player can manipulate the wagering-game elements (for example, can rotate a virtual reel to another angle) or rotate a virtual camera for a different view (such as to see another side of a virtual reel).

Still another advantage is that different wagering games can be downloaded to the gaming systems described herein to allow the same table to be used to play poker, roulette, multi-player black jack, and so forth. For example, to convert a gaming system to play a roulette game instead of a poker game, and a video version of a roulette wheel is acceptable, no hardware changes need to be made. In some aspects, a mechanical roulette wheel may be desired, so an add-on "attachment" package can be offered so that the mechanical wheel is mounted on the display surface.

Figure 3:
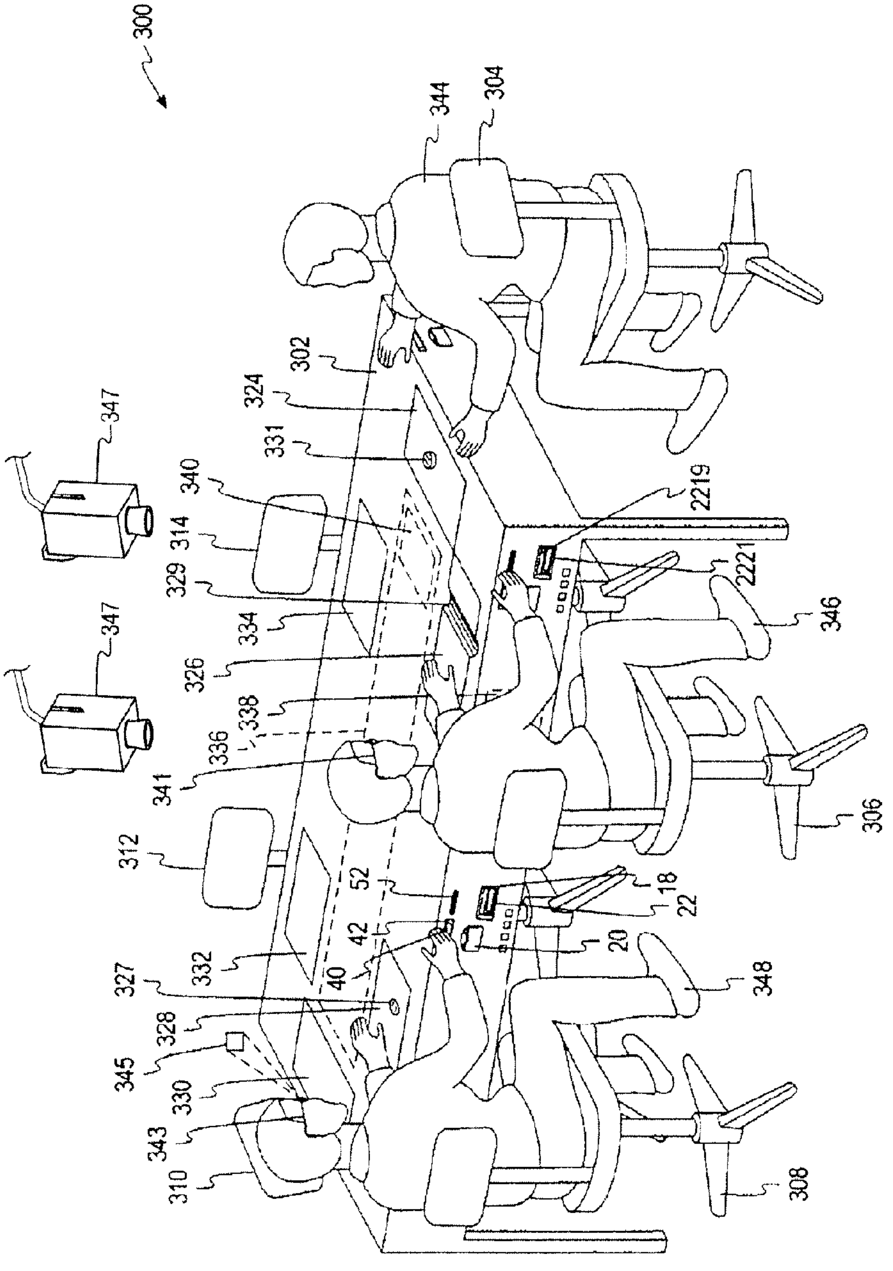
FIG. 3 is a perspective view of an example of a multi-player wagering game system.

FIG. 3 is a perspective view of a gaming system 300 for the purpose of playing a multi-player wagering game. The gaming system 300 includes a display surface 302 which in this case is positioned substantially horizontally relative to ground and is a table around which game players may be seated. Of course the display surface 302 may be mounted in a vertical position or in a slanted position relative to the game players. In this aspect, the gaming system 300 preferably includes a number of player chairs 304, 306, 308, 310, 312 and 314 for the game players. In another aspect, the gaming system 300 does not include chairs and allows players to stand, such as to play a virtual craps wagering game. In still another aspect, the gaming system 300 may be configured to be played by a single player. The display surface 302 includes different player regions 324, 326, 328, 330, 332 and 334 as well as a common region 336. In this aspect, each of the player regions 324, 326, 328, 330, 332 and 334 include a multi-point sensing device such as a multi-point sensing device 338 which senses the presence of a multi-point contact by a player anywhere in that region. Alternately, there may be one multi-point sensing device that optionally senses contacts or gestures by the players 344, 346, 348 located around the display surface 302 whose contacts or gestures can be differentiated via player identification devices that may be coupled to the chairs 304, 306, 308, 310, 312, 314 as described in more detail below. In this alternate aspect, player regions are created in software, which partitions the display surface into distinct regions. The common region 336 also has a common region multi-point sensing device 340 to sense multi-point contact anywhere in the common region 336. Identical features in the multi-player gaming system 300 as the gaming machines 10 and 110 are labeled with identical elements reference numbers. The gaming system 300 allows the playing of multi-player games as will be explained below by players such as players 344, 346 and 348. The display surface 302 is in sufficient proximity to the players to allow contact of the display surface 302 by the players. The display surface 302 may be mounted on a swivel and rotated in order to change the orientation of the display surface 302 relative to the players.

The player regions 324, 326, 328, 330, 332, 334 may be implemented by a multi-wire touchscreen such as the one offered by GM Nameplate described below. Each zone or region defined relative to the touchscreen is assigned to each player. When a player touches or gestures in the zone or region assigned to that player, the controller 34 distinguishes inputs from that zone from inputs from other zones. This aspect of the illustrated embodiment does not require sensors in the chairs to distinguish among touches. On the other hand, the zones in some embodiments cannot be modified, so each player should contact the display surface within the assigned zone.

One or more video cameras 347 are placed above the display surface 302 to capture images of objects and other things that may be placed on the display surface 302. The video camera(s) 347 work in conjunction with other sensors associated with the gaming system 300 to provide wagering and non-wagering related functionality to the wagering game(s) being played on the gaming system 300. Although two video cameras 347 are shown, the number of video cameras is in part a function of the dimension of the area that needs to be monitored by a camera. For a long table, such as shown in FIG. 3, at least two cameras provide a better viewing angle (to avoid oblique angles that tend to skew the perspective of the image being captured) and to address obstructions such as arms or heads that might block the field of vision of the camera on the surface being monitored. The other camera can capture the area of the surface that is obscured to the first camera. Having multiple cameras mounted substantially directly above the respective areas they are monitoring provides a better and more direct viewing angle of the objects being captured. For a relatively small multi-touch table, such as one dimensioned to accommodate one or two players, a single camera may suffice. As mentioned above, the gaming system 300 may display a wagering game that is played by a single player or more than one player.

Figure 4:
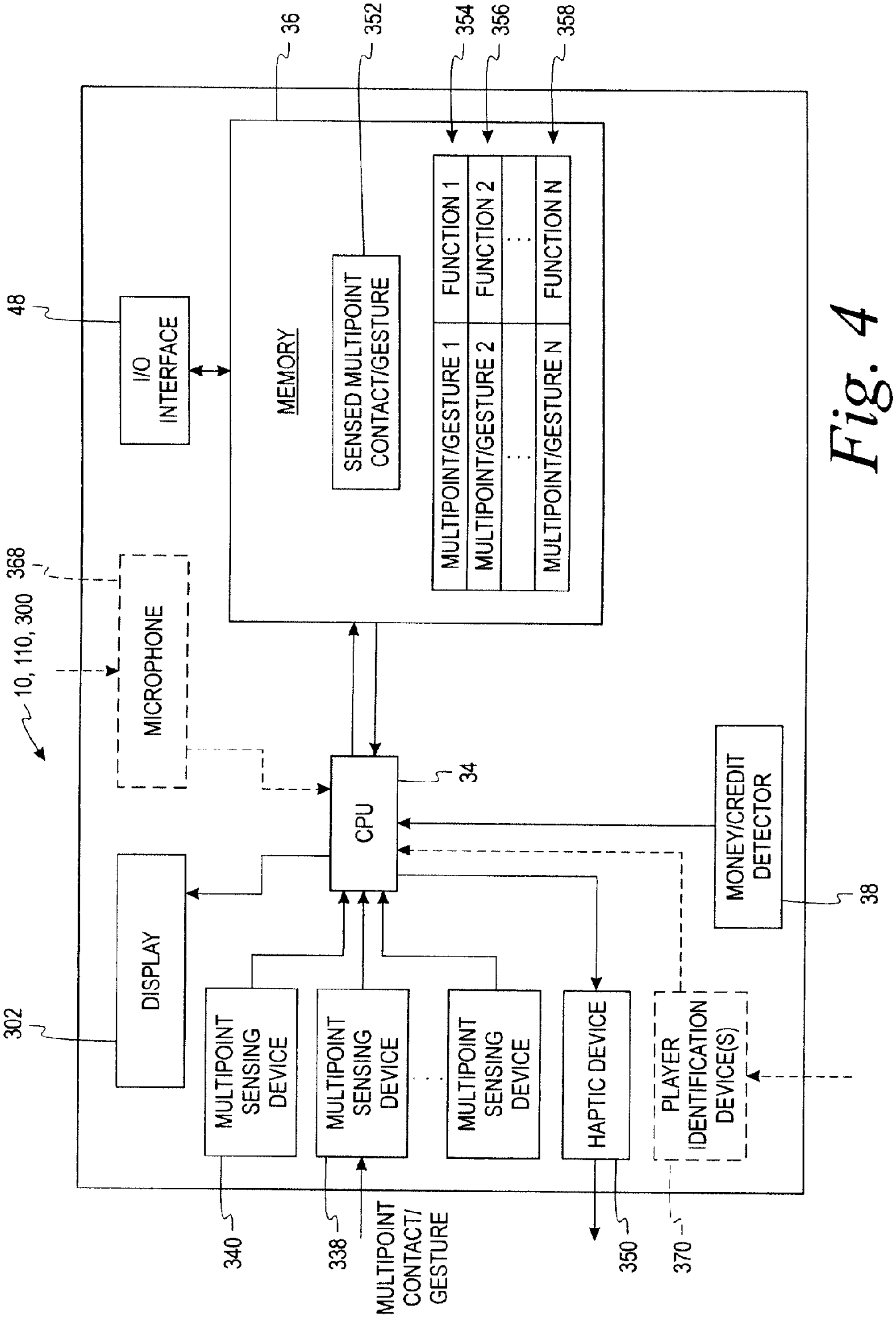
FIG. 4 is a functional block diagram of the multi-player wagering game system in FIG. 3 with an example multipoint sensing device.

FIG. 4 is a functional block diagram illustrating the gaming system 300 and the multipoint sensing device 338 or 340 that constitutes a human-machine interface (HMI) between the human player and the gaming system 300. The multipoint sensing device 338 detects multiple points touched or nearly touched simultaneously by one or more players on the region of the display surface 302 associated with the multipoint sensing device 338 such as the player region 324. The multipoint sensing device 338 also detects multipoint gestures while maintaining continuous contact with the multipoint sensing device 338, or a combination of one or more multiple points and multipoint gestures. As used herein, a multipoint gesture refers to multiple gestures that originate by contacting two or more points on the multipoint sensing device 300. Such gestures may be bimanual (i.e., require use of both hands to create a "chording" effect) or multi-digit (i.e., require use of two or more fingers as in rotation of a dial). Bimanual gestures may be made by the hands of a single player, or by different hands of different players, such as in a multi-player wagering game. By "simultaneously" it is meant that at some point in time, more than one point is touched. In other words, it is not necessary to touch two different points at the precise same moment in time. Rather, one point can be touched first, followed by a second point, so long as the first point remains touched as the second point is touched. In that sense, the first and second points are touched simultaneously. If contact is removed from the first point before the second touch is applied, then such a touch-scheme would be deemed to be a single-touch scheme.

The multipoint sensing device 338 outputs multipoint data representative of the multiple points touched or the multiple gestures. The multipoint data may include the coordinates of the points contacted or touched, the pressure of the points or areas touched, the directions of the gestures, the size (one finger, two fingers, etc., for example) of the areas touched, the velocity of the gestures, the acceleration of the gestures, or the length of time a point or area on the multipoint sensing device 338 was touched or a gesture lingered on the multipoint sensing device 338.

The system memory 36 may store data representing the multipoints touched or the multipoint gesture sensed in a memory location 352. Predetermined data corresponding to a first multipoint/gesture (i.e., a multipoint or a multipoint gesture) may be stored in a memory location 354, data corresponding to a second multipoint/gesture may be stored in a memory location 356, and an nth multipoint/gesture may be stored in a memory location 358. The sensed multipoint/gesture data 352 is compared against the predetermined data 354, 356 and 358 to determine a function to execute by the controller 34. Of course the data representing the sensed multipoint/gesture 352 and the predetermined data 354, 356, 358 may be stored in a memory separate from the system memory 36.

The multipoint sensing device 338 may be any suitable multipoint touchscreen capable of detecting or sensing multiple points touched simultaneously on the device 338 or multiple gestures gestured on the device 338. An example of suitable multipoint sensing devices includes a multipoint touchscreen available from CAD Center Corp. under the trade designation "NEXTRAX™." This multipoint touchscreen is an optical-based device that triangulates the touched coordinate(s) using infrared rays (retroreflective system) or an image sensor. Another example is a frustrated total internal reflection (FTIR) device, such as developed by the Media Research Laboratory at New York University's Department of Computer Science, and described in Jefferson Y. Han, Low-Cost Multi-Touch Sensing Through Frustrated Total Internal Reflection (Proceedings of the 18th Annual ACM Symposium on User Interface Software and Technology 2005), at 115-118. An FTIR device is shown and described in connection with FIG. 5. A device suitable as a multipoint sensing device in accordance with aspects described herein is the "Entertaible" developed by Philips Research, which uses a series of infrared LEDs and photodiodes mounted around the perimeter of an LCD display. A still further example of a multipoint sensing device 338 is a transparent self-capacitance or mutual-capacitance touchscreen, such as described and shown in WO 2005/114369, entitled "Multipoint Touchscreen," which claims priority to U.S. patent application Ser. No. 10/840,862, and is assigned to Apple Computer, Inc. A self-capacitance touchscreen is shown and described in connection with FIG. 6. Another suitable contact sensing device in accordance with aspects herein is the Diamond Touch Table offered by Mitsubishi Electric Research Laboratories. Mitsubishi's Diamond Touch Table works by broadcasting a low-level RF signal to the surface of the table in a scanned manner. The table top includes an array of small antennas that are selectable in a grid. Each player's chair has a sensing receiver attached to it. When the player touches the table surface, the signal is coupled through the player, into the chair, and then into the receiver electronics. The X-Y position is determined by coordinating the scan of the table-top antenna grid with the receiver timing.

Still another suitable contact sensing device in accordance with aspects herein is the multi-zone five-wire touchscreen offered by GM Nameplate, Inc. and developed in conjunction with TouchKO, which allows up to four input zones on a single screen, and all four touches may occur simultaneously, leading to four distinct inputs. Yet another suitable contact sensing device is a sensor available from 3M TouchSystems. This sensor couples a different low-level signal to player user through an "In Play" button. The table top includes an array of small receiver antennas. When a player touches the table surface, that player's RF signal is coupled into the corresponding grid location, and detected. Another suitable contact sensing device may be based upon the Lemur multitouch device offered by JazzMutant headquartered in Bordeaux, France.

A 5-wire analog touchscreen operates by decoding or measuring a direct resistive circuit. The touchscreen includes six layers: a top polyester flex layer (coated with a thin conductive film), a polyester middle membrane with adhesive on both the top and bottom, a glass layer (coated with a thin conductive film) and an adhesive layer on the front or back for mounting. Printed spacer dots on the glass layer control actuation force and keep the conductive layers from making premature contact. The entire touchscreen is transparent and can overlay a video display, such as an LCD or plasma display. Because transmissivity is reduced with a multi-wire resistive touchscreen, a bright output display (such as plasma or vacuum fluorescent, for example) is preferred.

The gaming system 300 may optionally include a haptic device 350. Examples of suitable haptic devices include a haptic touchscreen manufactured by Immersion Corporation of San Jose, Calif., under the trade designation TouchSense®, a linear or rotary voice-coil actuator, or one or more piezoelectric elements. The haptic device 350 produces vibrations that are perceived by the tactile sense of the player. These vibrations can be synchronized with the multipoint gesture to provide tactile feedback to the player. The tactile feedback creates a more realistic interactive gaming environment and can also provide assurance to the player that the multipoint gesture is being sensed properly.

The memory 36 also stores the instruction set for a wagering game or wagering games for the gaming system 300. As will be explained below, part or all of the instruction sets may be received from an external source via the external I/O interface 48.

The gaming system 300 may optionally include a player identification device 370. Aspects of various embodiments of the invention incorporating one or more player identification devices are described in connection with FIG. 8 below. Those aspects can be implemented with the gaming system 300 shown in FIG. 3.

The gaming system 300 may optionally include a microphone 368 that receives speech inputs or commands from one or more players and converts those speech patterns into predetermined commands that are correlated with functions executed by the CPU 34. For example, during a Blackjack game, a player may utter "Hit me," or during a Poker game, a player may utter "All in." Other commands could be received, such as a wager amount, a movement command (to move an object projected or displayed relative to the display surface 302 from one area to another), a command to cash out, a command for more wagering funds, a command to speak with an attendant to, for example, order drinks or request additional wagering funds, and the like. According to an aspect, a player seated at a chair may utter a request for a drink or may touch a drink request button on the display surface 302. The CPU 34 sends to an external system a signal indicative of the order and the chair number requesting the drink. An attendant interacting with the external system prepares the drink order and, by virtue of the identification information transmitted with the drink order information, knows which player ordered the drink and can deliver the drink order to the proper customer. Similarly, if a player requests additional tokens or funds to be added to a wagering account or at table side, the attendant can deliver those monetary assets to the proper requesting player.

Figure 5:
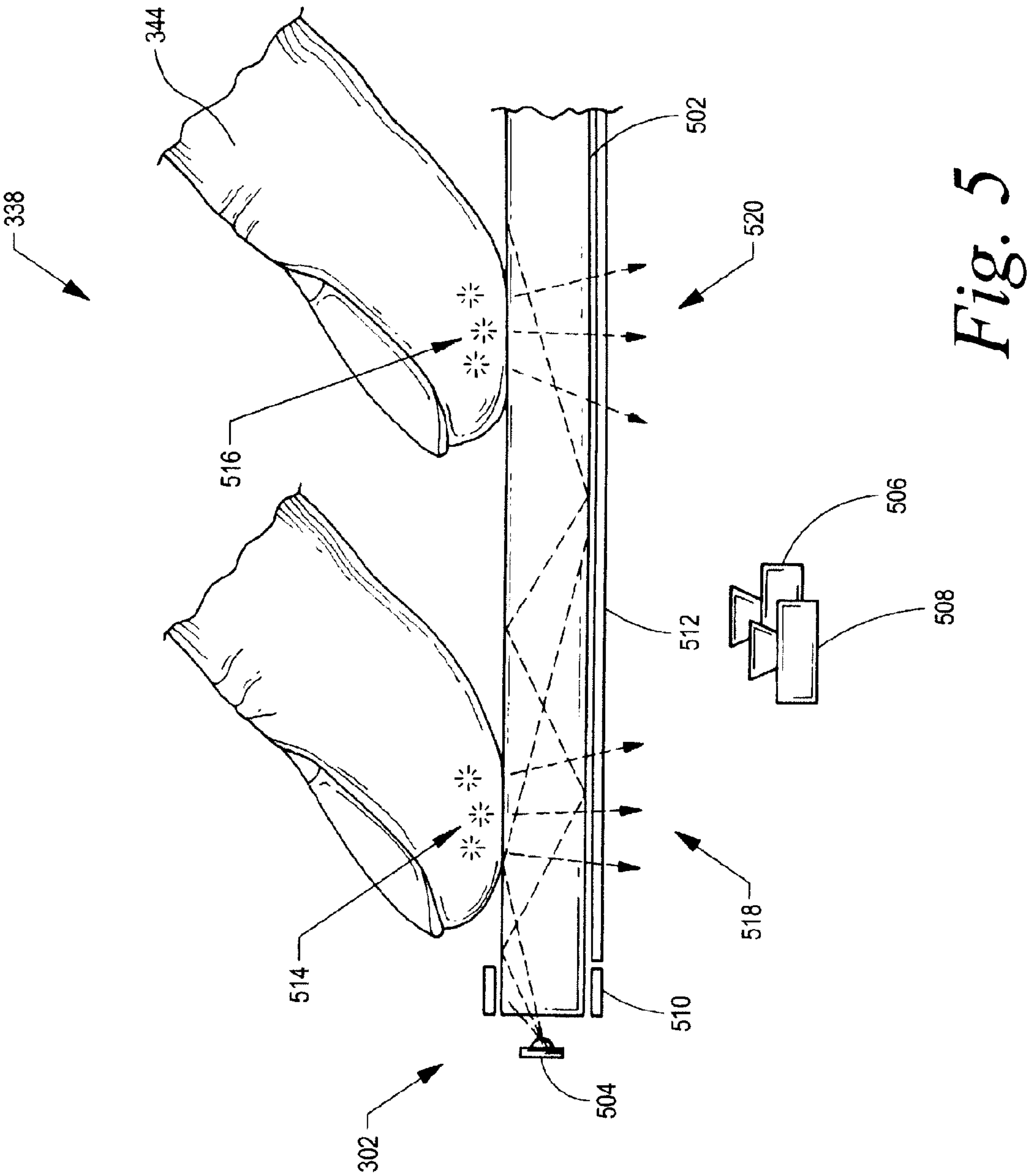
FIG. 5 is a functional illustration of a multipoint sensing device that utilizes an example frustrated total internal reflection (FTIR) device.

FIG. 5 is a functional illustration of the multipoint sensing device 338 configured as a frustrated total internal reflection (FTIR) device. The FTIR device 338 may be used in the gaming machine 10, the handheld gaming machine 110 or the gaming system 300. The FTIR device 338 includes a transparent substrate 502, preferably made of acrylic, an LED array 504, a projector 506, a video camera 508, a baffle 510, and a diffuser 512 secured by the baffle 510. The projector 506 and the video camera 508 together comprise the display surface 302 of the gaming system 300.

The transparent substrate 502 is edge-lit by the LED array 504, which may include high-power infrared LEDs or photodiodes placed directly against the polished edges of the transparent substrate 502. The video camera 508, preferably a digital one, includes a band-pass filter to isolate the infrared frequencies and is coupled to the controller 34. The rear-projection projector 506 projects images onto the transparent substrate 502, which diffuses through the diffuser 512 and rendered visible. Pressure can be sensed by the FTIR device 338 by comparing the pixel area of the point touched. For example, a light touch will register a smaller pixel area by the video camera 508 than a heavy touch by the same finger tip.

The FTIR device 338 is capable of sensing or detecting multiple touches, such as the touches 514 and 516. When the fingers of the player 344 touch the points 514 and 516 on the transparent substrate 502, the infrared light bouncing around inside the transparent substrate 502 is scattered in the general directions 518 and 520 and these optical disturbances are picked up by the band-pass filter in the video camera 508. Gestures can also be recorded by the video camera 508, and data representing the multipoint gestures is transmitted to the controller 34 for further processing. The data can include any one or more of the velocity, direction, acceleration, and pressure of a gesture.

Figure 6:
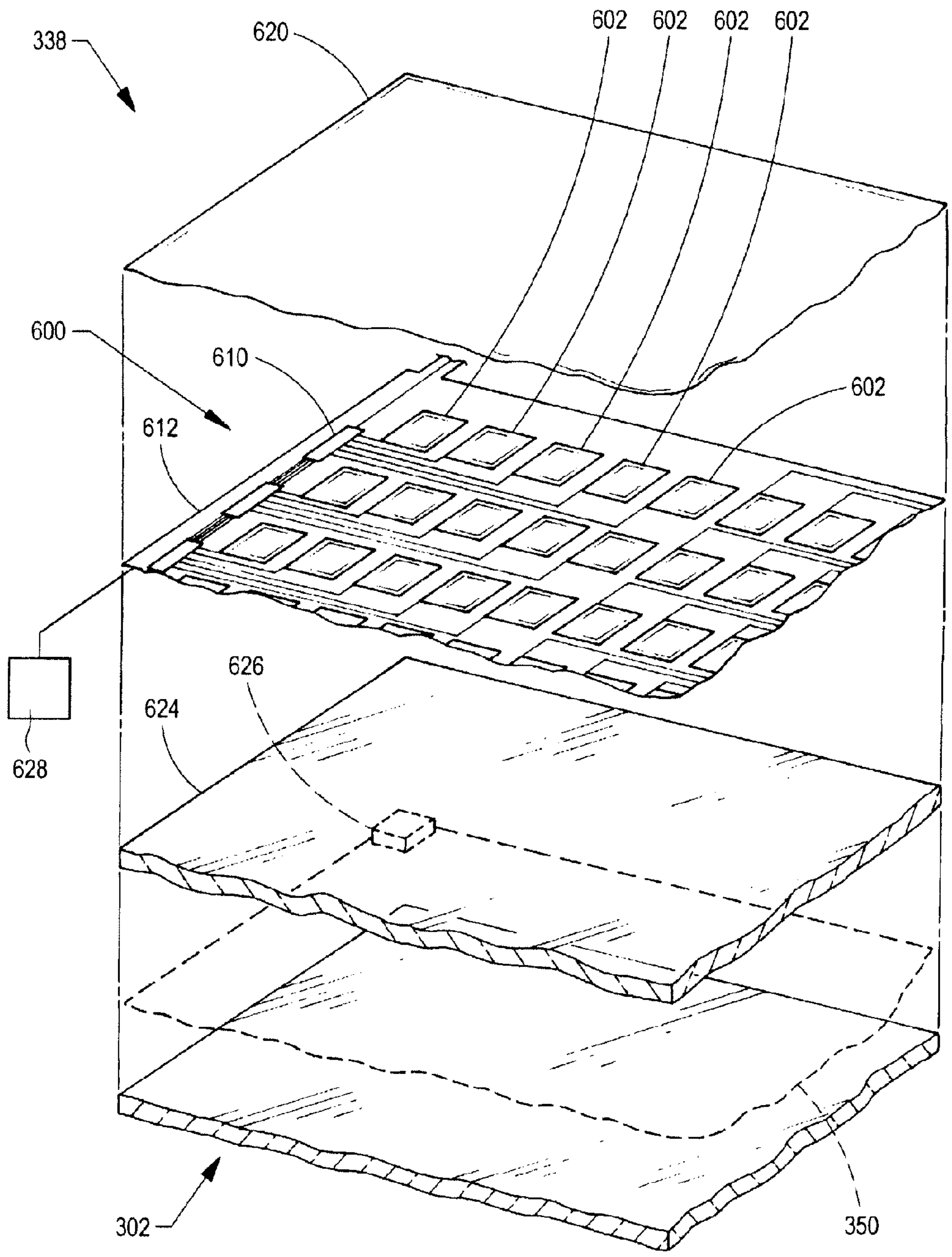
FIG. 6 is a functional illustration of an example multipoint sensing device employing self-capacitance nodes.

Another touchscreen device suitable for detecting multiple touches or multipoint gestures is shown in FIG. 6. The multipoint sensing device 338 in FIG. 6 includes a transparent touchscreen 600 that includes multiple transparent capacitive electrodes 602 arranged in an array across a surface of a transparent substrate 612. Sensor circuits 610 serially connected together measure the capacitance of each corresponding electrode 602 to which they are connected via miniscule traces that are at least semi-transparent or translucent. The electrodes 602 have a size and shape dimensioned to detect an average human finger tip. Each electrode 602 represents an individual capacitor, allowing multiple points or multipoint gestures to be detected simultaneously. In the illustrated embodiment, individual electrodes 602 measure their own capacitance independent of the other electrodes relative to ground. In another embodiment, the capacitance is measured between two or more electrodes, producing a higher "resolution" of touchpoints as the electrodes can be made smaller and can overlap one another.

The touchscreen 600 is overlaid with a transparent glass or plastic substrate 624, which together are overlaid on the display surface 302 and the optional haptic touchscreen 350, which includes actuating devices 626 (such as one near each corner of the haptic touchscreen 350) that are actuated according to a vibration profile in order to create a haptic effect. A protective transparent cover 620 is placed over the transparent substrate 612. Because the electrodes 602 are capacitive-sensing, touches on the protective cover 620 will cause a change in capacitance in the electrodes 602. The outputs of the sensor circuits 610 are coupled to a controller 628 that processes data representing which electrodes 602 measured a change in capacitance. The magnitude of the change represents a pressure. A greater deviation in capacitance represents a greater pressure, and these deviations can be converted by an analog-to-digital converter into numbers representing an amount of pressure. The data can also represent a gesture where multiple electrodes 602 register a touch at various time intervals. The velocity, direction, and acceleration of the gesture can be represented in the data.

Other touch sensing technologies are suitable for use as the multipoint sensing device 338, including resistive sensing, surface acoustic wave sensing, pressure sensing, optical sensing, and the like. Also, other mechanisms may be used to display the graphics on the display surface 302 such as via a digital light processor (DLP) projector that is suspended at a set distance in relation to the display surface.

Figure 7:
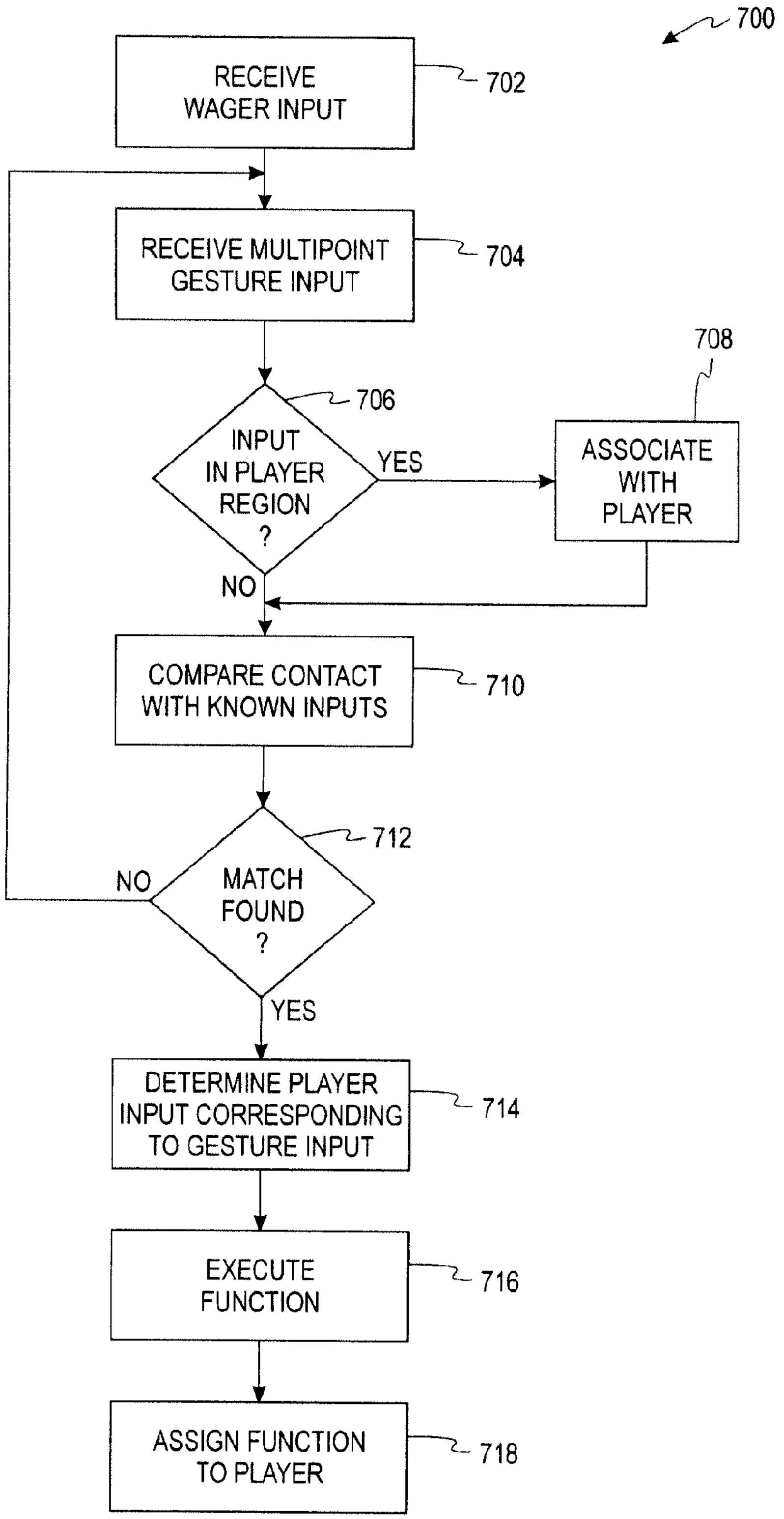
FIG. 7 is a flow chart depicting an example method of sensing a multipoint gesture input by the gaming system of FIG. 3.

FIG. 7 is a flow chart diagram of an example method (700) of determining a multipoint gesture input from the gaming system 300. A wager input is received (702) via, for example, the value input device 18 or a signal representing a wager, such as wager-input data wirelessly communicated between a portable data unit and the gaming system 300, gaming machine 10 or wager-input data communicated from the handheld gaming machine 110. A multipoint gesture input is received (704) via a multipoint sensing device such as the sensing device 338 or 340 in FIG. 3. The input is associated with a player based on whether the determination of the multipoint sensing device receiving the input (706) is in a specific player-assigned region of the display surface 302. If the system is within a player-assigned region, the input is associated with a specific player (708). The input is converted into data representing the multipoint gesture (such as coordinates of the points touched on the display surface 302, the magnitude of the pressure applied to the points touched, the direction, velocity, and acceleration of a multipoint gesture), which is compared against known multipoint gesture inputs (710) to determine whether a match is found (712). For example, a known multipoint gesture input may include a set of coordinates relative to the multipoint sensing device 338 representing multiple points touched simultaneously. Another known multipoint gesture input may include a circular gesture having a predetermined radius or range of radii.

If a match is found (712), the method (700) includes determining a player input corresponding to the multipoint gesture input (714). The player input may be, for example, a selection of multiple cards in a game with a card game theme, an indication of a payline to be selected, an indication of the number of wagers per payline, an indication of a bonus award amount, a selection of a space in a game with a board game theme, movement of a graphical icon, and the like. Then, the wagering-game function associated with the player input is executed (716). Examples of wagering-game functions are provided herein, including without limitation selecting a payline, increasing or decreasing an amount to wager per payline, increasing or decreasing a potential bonus award, selecting a bonus award amount, selecting numbers in a keno-type or roulette-type wagering game, requesting a hold for one or more cards, inputting a wager amount, selecting a wager amount, selection of number of reels, selection of cards, an instruction to deal another card, a request to be dealt another card, a request to not be dealt another card, a cash-out request, and the like. The wagering game function is then associated with the particular player if the input is associated with a particular player region (718).

Figure 8:
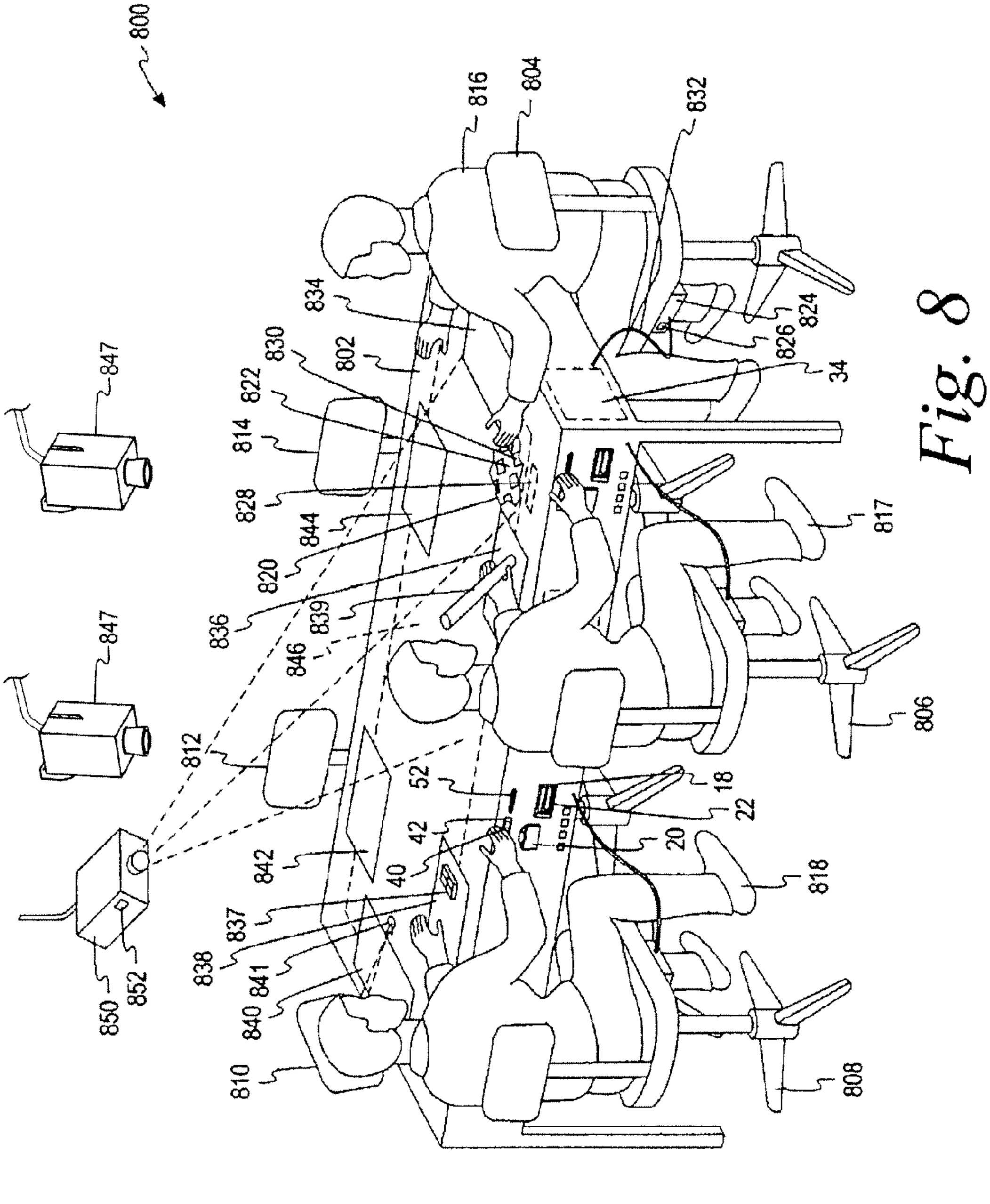
FIG. 8 is a perspective view of another example of a multi-player wagering game system.

FIG. 8 is a perspective view of another gaming system 800 for the purpose of playing a multi-player wagering game. Identical features in the gaming system 800 as the gaming machines 10 and 110 and gaming system 300 are labeled with identical element reference numbers. The gaming system 800 differs from the gaming system 300 in FIG. 3 as it may recognize single contacts and associate such contacts with a particular player. Of course the gaming system 800 may also sense multipoint contacts as the gaming system 300. As with the gaming system 300, the gaming system in some aspects is configured for a single player. The multi-player wagering game system 800 includes a display surface 802 which in this case is positioned substantially horizontally relative to ground and configured as a table for game players to gather around. The gaming system 800 includes a number of player chairs 804, 806, 808, 810, 812 and 814. Each of the players, such as the players 816, 817 or 818 in this example, seated in one of the player chairs has access to most or all of the area of the display surface 802. Instead of being mounted horizontally, the display surface 802 may be mounted in a vertical position or in a slanted position relative to the players. As will be detailed below, each contact made by a player with the display surface 802 is associated with one of the player chairs 804, 806, 808, 810, 812 and 814. Contact with the display surface 802 by any of the players is sensed by a contact sensing device 820 positioned adjacent to the display surface 802. The contact sensing device 820 includes an array of antennas 822. Each of the antennas in the array 822 are positioned under the display surface 802 and emit a positional signal indicative of the position of the contact on the display surface 802. An example of a suitable contact sensing device may be the Diamond Touch Table offered by Mitsubishi Electric Research Laboratories. The display surface 802 may mounted on a swivel and rotated in order to change the orientation of the display surface 802 relative to the players. Objects and other things placed on the display surface 802 may be captured by a video camera 847 positioned above the display surface 802.

As with the gaming machines 10 and 100, the gaming system 800 has one or more value input devices 18 for receiving a wager associated with a wagering game. The wagering game is displayed on the display surface 802. The display surface 802 also displays the randomly selected outcome or outcomes generated by the wagering game. A controller 34 is coupled to the display surface 802 and causes graphics to be generated on the display surface 802. The controller 34 is programmed to execute a wagering-game function associated with contact data from the players and, as will be explained below, associates the wagering-game function with an individual player based on the contact data. The controller 34 may also recognize the specific identity of the player via information taken from the player information obtained via the player information reader 52. In this manner, the controller 34 may provide additional functionality to a specific player based on their contact with the table and previous gaming data.

In this example, a player identification device 824 in the chair 804 includes a receiver 826 that is capacitively coupled to the respective player 816. The receiver 826 is in communication with the controller 34. The receiver 826 receives signals transmitted from a transmitter array 828 to an antenna 830 in the antenna array 822 under the display surface 802 via a contact by the player 816 sitting in the chair 804. When the player 816 touches the display surface 802, a position signal is sent from the antenna 830 through the body of the player 816 to the receiver 826. The receiver 826 sends the signal to the controller 34 indicating the player 816 sitting in the chair 804 has contacted the display surface 802 and the position of the contact. In this example, the receiver 826 communicates with the controller 34 via a control cable 832. Those of ordinary skill in the art will understand that a wireless connection may be used instead of the control cable 832 by including a wireless interface on the receivers and controller 34.

The controller 34 associates the contact input with the chair 804 and hence the player 816. The controller 34 executes the appropriate function according to the wagering game such as changing the graphics displayed on some or all of the display surface 802 or other game actions such as selecting a payline, increasing or decreasing an amount to wager per payline, increasing or decreasing a potential bonus award, selecting a bonus award amount, selecting numbers in a keno-type or roulette-type wagering game, requesting a hold for one or more cards, inputting a wager amount, selecting a wager amount, selection of number of reels, selection of cards, an instruction to deal another card, a request to be dealt another card, a request to not be dealt another card, a cash-out request, and the like. Of course it is to be understood that the chairs 804-814 and associated receivers 826 could be replaced with a player-carried device such as a wrist strap, headset or waist pack in which case a player may stand on a conductive floor plate in proximity to the display surface 802. The display surface 802 may include different player regions 834, 836, 838, 840, 842 and 844 as well as a common region 846 to assist players in their interaction with the wagering game. However, since the controller 34 recognizes each player, the contacts of a player anywhere within the display surface 802 including another player region will be associated with the player. Players can "individualize" their region 834, 836, 838, 840, 842 and 844 by writing their name with their finger on the display surface 802.

The antenna array 822 may be used in conjunction with any of the other multipoint contact sensors described in FIGS. 5-6 above to provide greater sensing of movement, pressure, gestures, etc. The antenna array 822 may also be used with a haptic device such as the haptic device 350 in FIG. 4 to provide tactile feedback to a player. Of course it is to be understood that any of the sensors in FIGS. 5-6 may be modified to sense single-point contacts by the players or a single player. As mentioned above, the gaming system 800 is configured in some aspects to display a wagering game played by a single player.

In this example, graphics are projected on the display surface 802 via a digital light processor (DLP) projector 850 that is suspended at a set distance in relation to the display surface 802. The DLP projector 850 has a graphics input 852 which is in communication with the controller 34 to generate graphics for projection on the display surface 802. Alternately, the graphics may also be projected on the display surface 802 via a backlit projector or via a liquid crystal display. The controller 34 may be programmed to change the graphic on the display surface 802 in response to the contact data received from the receivers.

Figure 9:
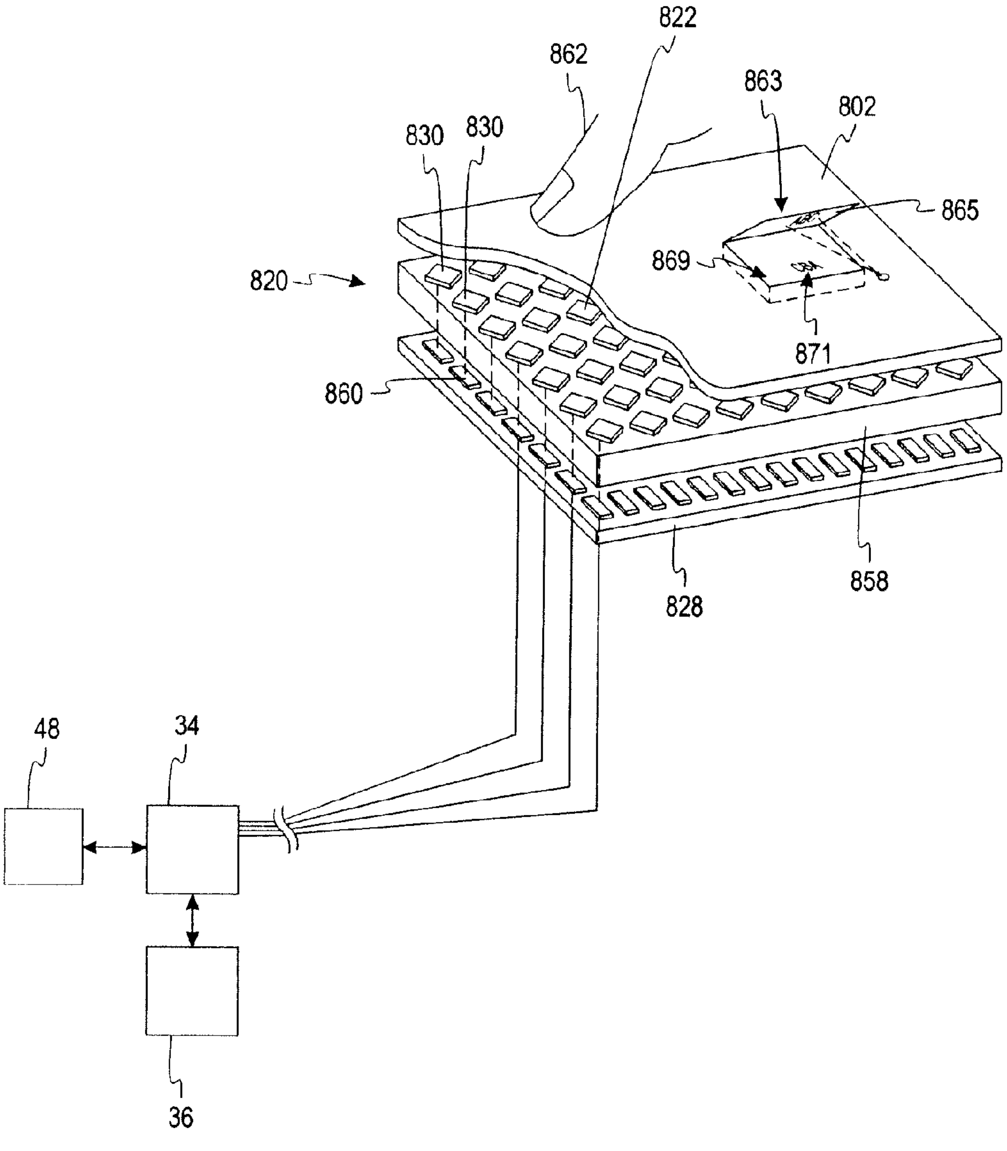
FIG. 9 is a functional illustration of an example of a contact sensing device for differentiating player contact used with the gaming system of FIG. 8.

FIG. 9 is a cross sectional view of the contact sensing device 820. The display surface 802 in this example is an opaque flat insulator material. The antenna array 822 has a number of antennas such as the antenna 830 which correspond to different grid positions of the display surface 802. Each antenna 830 is a thin piece of an electrically conductive material. Each antenna 830 in the array 822 is insulated from the other antennas. The antennas 830 are mounted on a substrate 858. Each antenna 830 is capacitively coupled to a receiver such as the receiver 826 (shown in FIG. 8) when the player contacts the display surface 802. A capacitor circuit is thus created between a finger of the player 862 and the antenna 830 with the display surface insulating material acting as a dielectric. The receiver 826 is electrically coupled to the transmitter array 828 through a shared electrical ground reference to complete the circuit. The antenna 830 has an associated signal transmitter 860 which transmits the position signal. The position signal from the antenna 830 is received by the receiver 826 in the chair 804 in FIG. 8 via the player's finger 862. The location of the contact corresponds with the known location of the antenna 830 within the antenna array 822. The position signal received from the antenna 830 is transmitted by the transmitter associated with the antenna 830 in the transmitter array 828 in FIG. 9 to identify the player and associate the location of the contact touch with the player. As explained above, the signals are sent by the receiver 826 to the controller 34 and compared with command sequences stored in the system memory 36. The memory 36 also stores the instruction set for a wagering game or wagering games for the gaming system 800. As will be explained below, part or all of the instruction sets may be received from an external source via the external I/O interface 48.

In this example, each point in the grid of the display surface 820 has its own antenna. The signals emitted by the antennas 830 may be unique to each antenna and thus continuously transmitted. Alternatively, the antennas 830 may be activated via time-division multiplexing driving each antenna in turn resulting in less distinct signals and reduced circuitry. Also, the antennas may be driven with a set or orthogonal signals by code-division multiplexing. It is to be understood that the antennas may be arrayed in a row layer and a column layer minimizing the overlap between the antennas in each layer. In this manner, unique row and column signals from the respective antennas are provided to determine the position of the contact.

Figure 10:
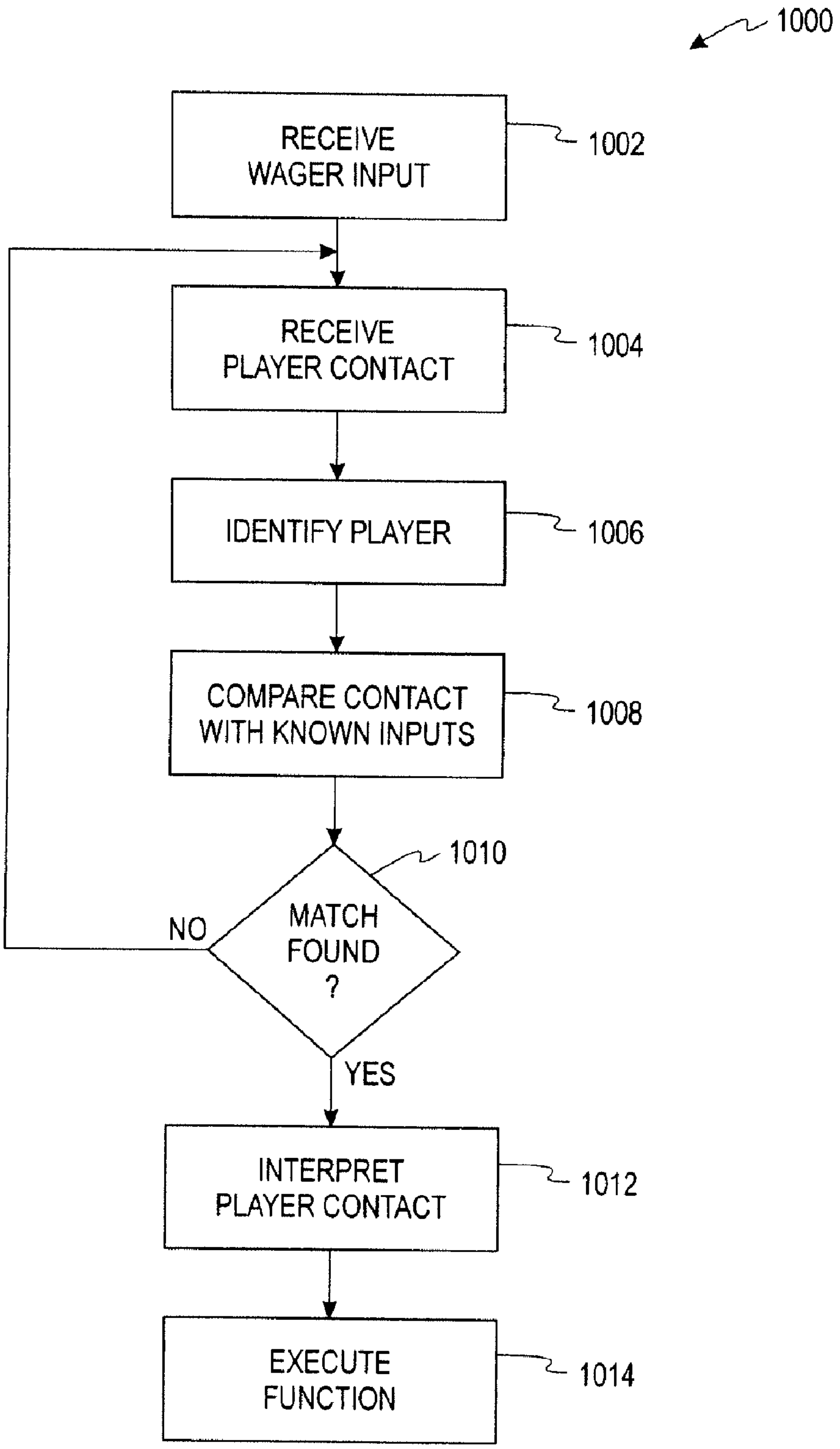
FIG. 10 is a flow chart depicting a method of sensing a contact input and associating the contact with a player.

FIG. 10 is a flow chart of a method (1000) of carrying out game interaction and player identification with a contact initiated by a player in the gaming system 800 in FIG. 8. A wager input is received (1002) via, for example, the value input device 18 or a signal representing a wager, such as wager-input data wirelessly communicated between a portable data unit and the gaming system 800 or wager-input data communicated to the handheld gaming machine 110 or gaming system 800. A contact input on the display surface 802 is received (1004) via the sensing device 820. The identity of the player initiating the contact input is determined and assigned to the player (1006). The contact input is converted into data representing the contact gesture (such as coordinates of the points touched, the magnitude of the pressure applied to the point or points touched, the direction, velocity, and acceleration of a gesture), which is compared against known inputs (1008) to determine whether a match is found (1010). For example, a known input may include a set of coordinates relative to the particular antenna on the contact sensing device 822 which correspond to an area on the display surface 802 used to operate a game function. If no match is found, the method (1000) continues to determine whether a further contact has occurred (1004).

If a match is found (1010), the method (1000) includes determining a player input corresponding to the contact input (1012). The player input may be, for example, a selection of multiple cards, an indication of a payline to be selected, an indication of the number of wagers per payline, an indication of a bonus award amount, and the like. The wagering-game function associated with the player input is then executed (1014) for the selected player. Examples of wagering-game functions are provided herein, including without limitation selecting a payline, increasing or decreasing an amount to wager per payline, increasing or decreasing a potential bonus award, selecting a bonus award amount, selecting numbers in a keno-type or roulette-type wagering game, requesting a hold for one or more cards, inputting a wager amount, selecting a wager amount, selection of number of reels, selection of cards, an instruction to deal another card, a request to be dealt another card, a request to not be dealt another card, a cash-out request, and the like.

FIG. 11*a* to FIG. 17 depict graphics projected or displayed on or relative to the display surface 302 or the display surface 802 for various wagering games which sense multipoint or single-point contacts or gestures to cause a wagering-game function to be carried out. Generally, in various embodiments of the invention, when a point or gesture is sensed by the sensing device 820, a graphic on the display surface 802 is correlated with the touch point or points or a gesture. The correlation may be proximate the touch point, points or gesture such that the graphic is displayed proximate the touch point, points or gesture, or the correlation may be distal the touch point, points or gesture such as when the player touches an non-selectable area relative to the display surface 802 and a graphic is displayed somewhere that is not proximate the touch point, points or gesture.

In particular the ability of the gaming system 800 to identify and associate contacts with a particular player allows use in (1) turn-based games, (2) simultaneous selection of a common element by multiple players, and (3) exchanging of virtual or physical objects between players on the display surface 802. Players may also vote using collective power of a group to make a decision between all players, the results of which may be reflected in the common area of the display surface 802. The use of different multi-point sensing devices in conjunction with the different player regions also allows the gaming system 300 to operate games using the above features by associating contacts in the player regions with a particular player. Certain types of games playable on the systems 300 and 800 allow players to enter and leave freely and join at different points in time. The gaming systems 300 and 800 also allow simultaneous actions by different players. The interactive nature of the gaming systems 300 and 800 entices players to sit down at the table.

Figure 11A:
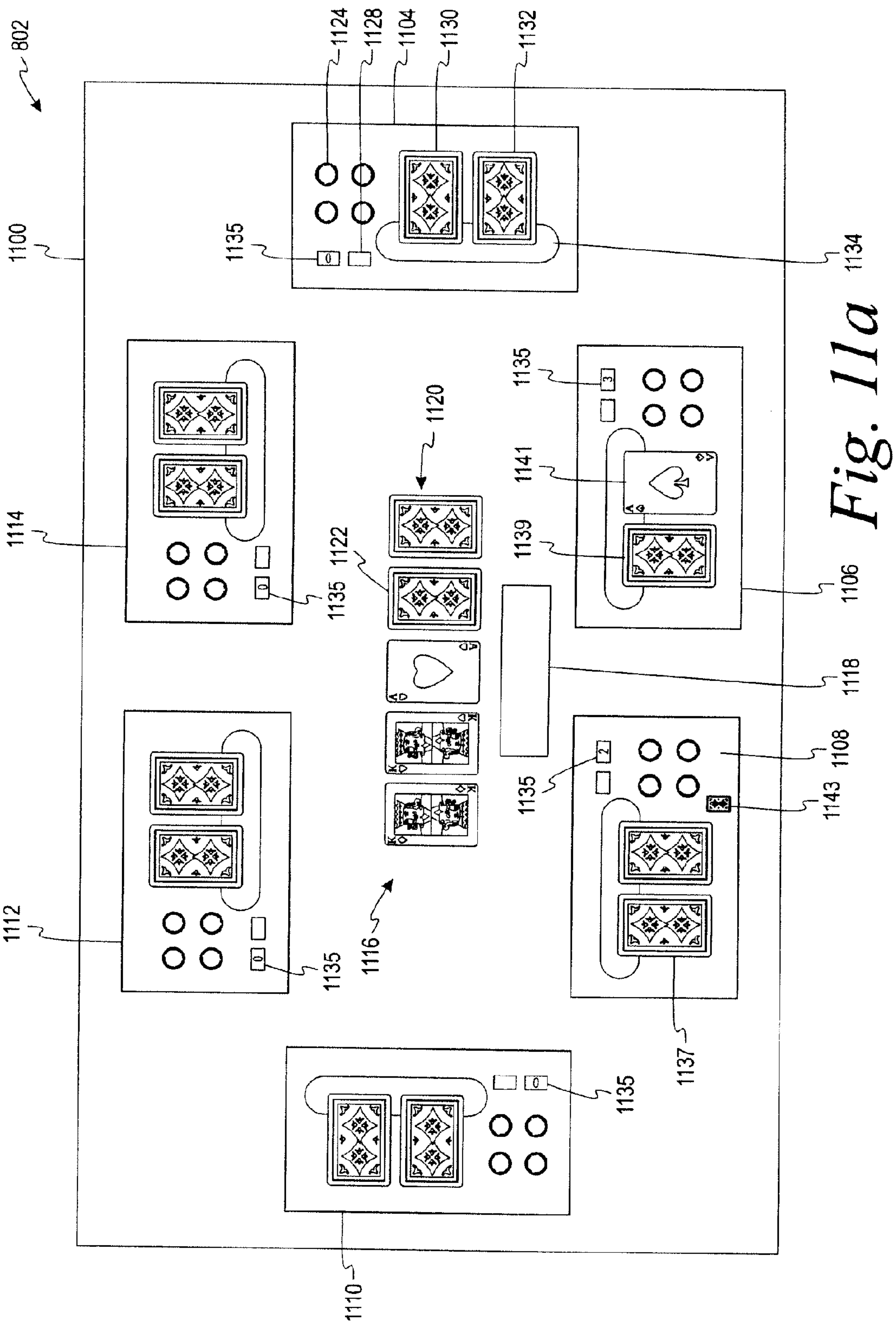
FIG. 11*a* is an illustration of a display surface graphic for an example multi-player electronic poker game.

FIG. 11*a* is an illustration of a graphics display 1100 projected or displayed on the display surface 802 in FIG. 8 for a poker-type wagering game having a turn-based format. The display surface 802 is configured to display the graphics display 1100 which is a poker game format. Each player has a separate player region 1104, 1106, 1108, 1110, 1112 and 1114 defined by the graphics display 1100. Each region 1104-1114 contains graphics which are specific to the associated player in relation to the game as will be explained below.

The graphics display 1100 includes a common area 1116 having a pot area 1118 and a community card area 1120. The community card area 1120 includes graphics of playing cards 1122 which are "dealt" as different wagers are offered by the players. The pot area 1118 contains a casino chips graphic 1124 which represents the current award from winning the game. The poker game format allows players to wager amounts based on the hole cards in the player region and the community cards such as the playing cards 1122 for the best poker hand. In this example, the game is Texas Hold 'Em, allowing player to wager based on their hole cards and make additional wagers based on the strength of their hand as the community cards are revealed. Other poker games such as Omaha, draw and stud or wagering card games such as Blackjack and Baccarat, may be played with the gaming system 800 after appropriate gaming mechanics modifications. Other card games may allow players to exchange cards by sliding a card graphic from a player region via player contact across the common area to another player region.

Figure 11C:
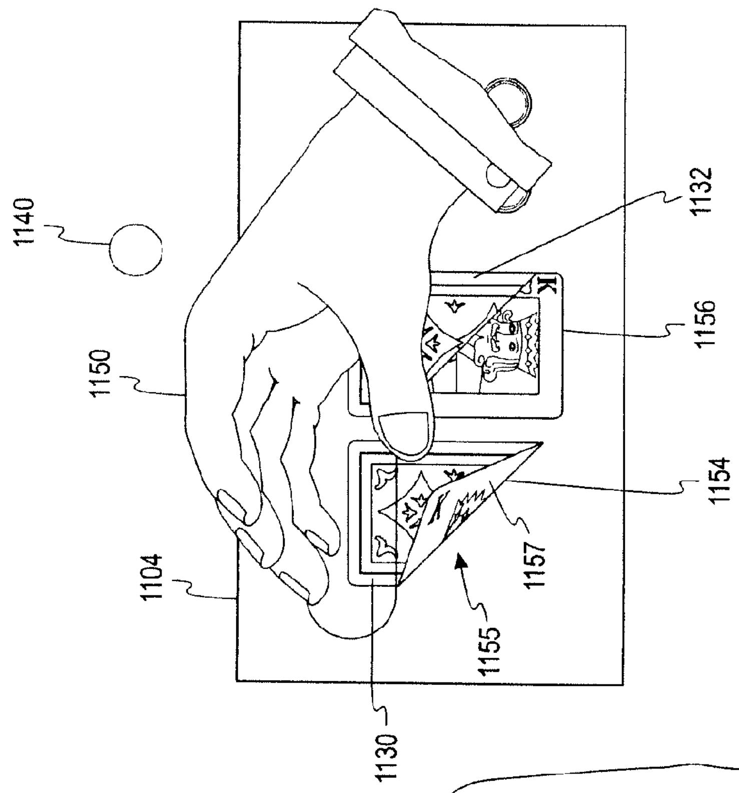
FIG. 11*c* is an illustration of the display surface graphic of an individual view on the display surface when card graphics are hidden from other players.
Figure 11B:
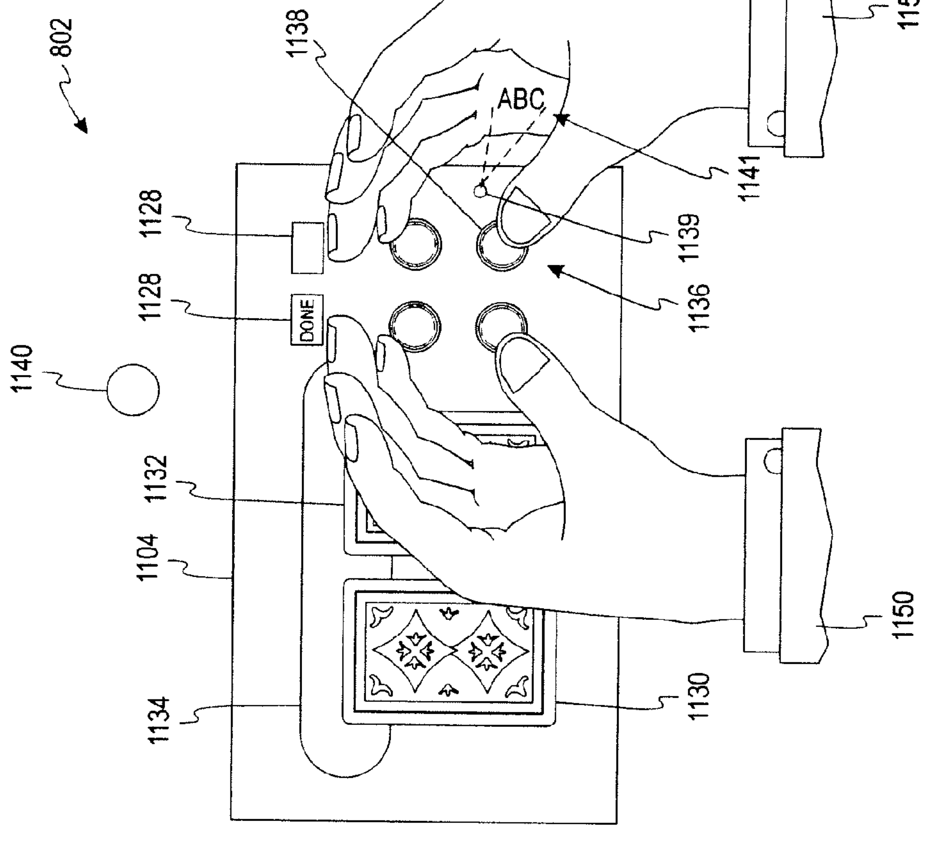
FIG. 11*b* is an illustration of the display surface graphic of an individual player's view in FIG. 11*a;*

FIG. 11*b* shows the player region 1104 of the graphics display 1100 projected or displayed on the display surface 802. The player region 1104 may include a set of player inputs such as input buttons 1128 for various player actions such as initiating a game or indicating that a player has completed their turn. The player region 1104 includes the graphics for two face down hole cards 1130 and 1132. A hand placement area 1134 is located above the cards 1130 and 1132. The player region 1104 also includes a chips area 1136 which contains graphics of chips 1138 representing the credits available for the player for wagering. When a player's hands are not in substantial or multi-point contact on the hand placement area 1134, the cards 1130 and 1132 are opaque, obscuring the value of the hole cards 1130 and 1132. The player may place their hands in other parts of the player region 1104 to contact and push the chips 1138 into the common area 1122 to represent a wager and the hole cards will remain opaque. Since the contacts made by a player are assigned to the particular player, a chip 1140 may be pushed into the common area 1122 or anywhere else on the display surface 802 and will be associated with the player. Also, a player may select multiple chips 1138 by placing both hands 1150 and 1152 in contact with the display surface 802 around a certain number of chips as shown in FIG. 11*b*. The chips between the hands could then be moved by a player moving their hands. Selected chips or any other chip in contact with the player may be assigned to the player and may be locked in place on the display graphic 1100 to allow only the player to move the chips relative to the display surface 802. Alternatively, wagers may be made via an input control such as the player input device 24 in FIG. 8 or input buttons 1128.

FIG. 11*c* shows the player region 1104 with a player's hand 1150 placed on the hand placement area 1134. The contact sensing device 820 senses the position of the hand 1150 or hands on the hand placement area 1134 and changes the card graphics 1130 and 1132 to reveal the value of the player's hole cards via an upturned corner 1154 and 1156 respectively in this example. The positioning of the player's hand 1150 hides the hole card information from the other players. The controller 34 may be programmed by the game to only reveal upturned corners 1154 and 1156 with the actual card value when the player's hand is in contact with enough of the hand placement area 1134 to insure effective concealment of the card values. The threshold contact value may be the activation of a certain number of antennas within the hand placement area 1134.

In operation the game provides or "deals" hole cards to all participating players. Each player can in turn either fold by pushing the cards 1130 and 1132 to the common area 1122 or wager by pushing the chips 1136 to the common area 1122. The player may contact the appropriate graphic and use a motion to move the card or chip graphics from the player region 1104 to the common area 1122. At the end of a wagering turn, the chips 1140 in the common area 1122 are determined by the controller 34 and an appropriate chip graphic is generated in the pot area 1118 representing the award for winning the game. The identity of three community cards 1122 is then revealed and the remaining players wager or fold in turn. The identity of a fourth community card 1122 is then revealed and the remaining players wager or fold in turn. Finally, the identity of the fifth community card 1122 is revealed and the remaining players make a final wager. The controller 34 then determines the highest poker hand based on the combination of the player's hole cards and the community cards 1122 and awards the pot to the winning player. The award may take the form of additional value represented by chips graphics being rendered in the player region corresponding to the winning player.

Figure 12:
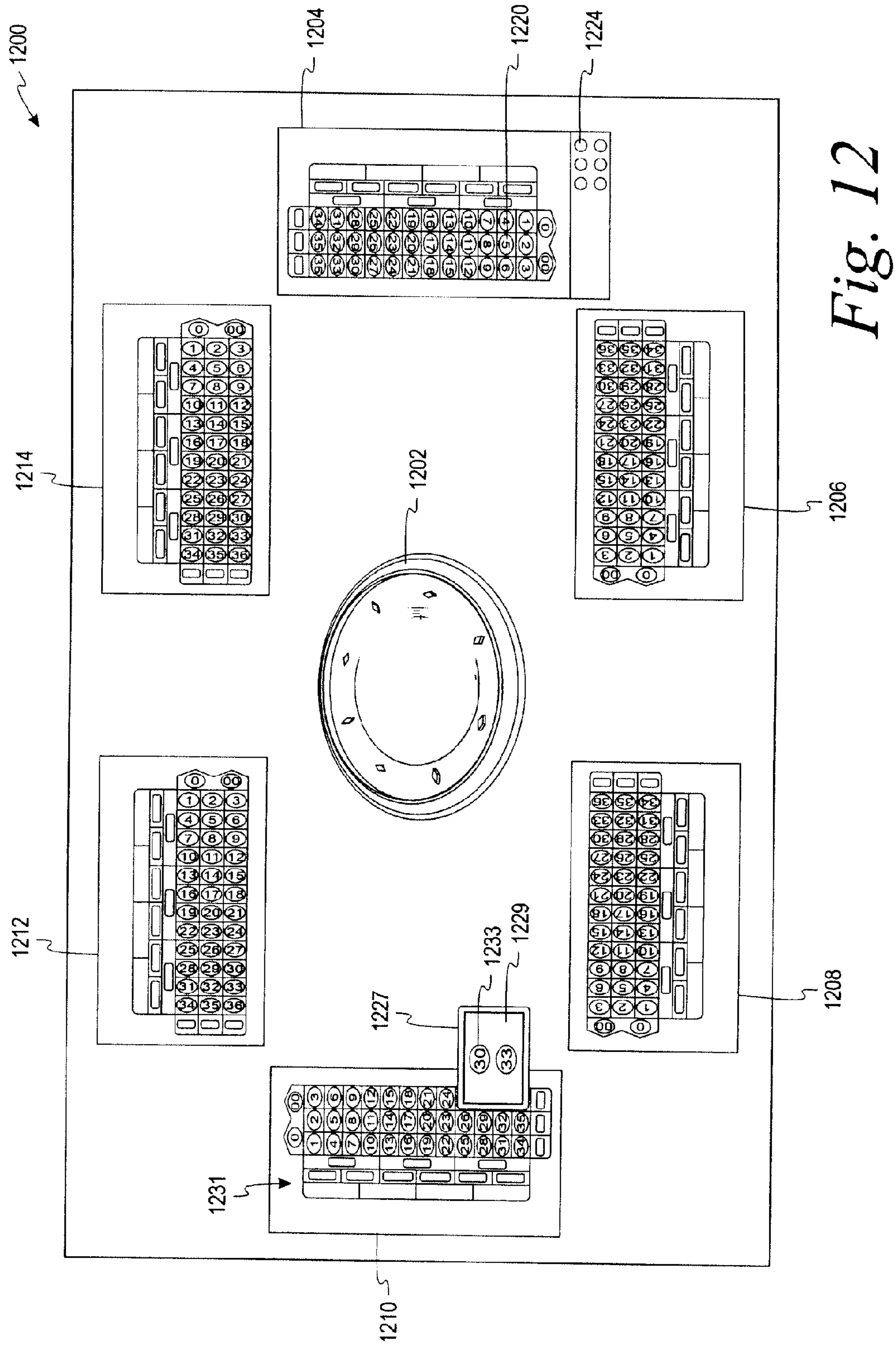
FIG. 12 is an illustration of a display surface graphic for an example roulette game.

FIG. 12 shows a graphic display 1200 of a roulette type game projected on the display surface 802 of the gaming system 800. The graphic display 1200 includes a representation of a roulette wheel 1202. Each of the players has a player region 1204, 1206, 1208, 1210, 1212 and 1214. For example, the player region 1204 has a betting board 1220 with representations of each of the numbers on the roulette wheel as well as areas for other wagers such as red numbers, odd numbers, low numbers, etc. The player region 1204 also has graphics of chips 1224. In order to make a wager a player places their finger or fingers in contact with the chip graphic 1224 and makes a sliding motion to move the graphic 1224 to the appropriate area on the betting board 1220 to represent a wager. The "chips" 1224 respond only to the touch of the player seated in front of the player region 1204. If an adjacent player attempts to move the chips 1224 to the betting board of player region 1206, the chips will not respond to that player's touch. In this respect, theft of chips is prevented because chips or other wagering assets will respond only to the touches of the players who are assigned to them. The betting board 1220 in front of each player may also display the wagers of other players with different graphics such as different shapes, patterns or colors. The common area 846 of the display surface 802 may also have a large representation of the betting board 1220 with all of the wagers for all of the players.

After each player has completed making wagers, the controller 34 will render a spinning roulette wheel from the wheel 1202. A ball graphic will be rendered to land on a number on the wheel 1202 according to a randomly generated outcome and the players with wagers on the winning number or areas on the betting board 1220 will be awarded. The award may take the form of additional credits represented by chip graphics such as the chip 1224 rendered in the winning player region or regions. Alternatively, an actual mechanical roulette wheel and ball may be used which may be added to the display surface with an appropriate electronic interfaces to the controller 34 to communicate the number the balls lands in after a spin.

Of course the graphic displays 1100 and 1200 and their underlying games in FIGS. 11-12 may be used with the gaming system 300 with appropriate modification for multi-point contacts to activate the wagering-game functions and identification of players with each particular player region.

Figure 13A:
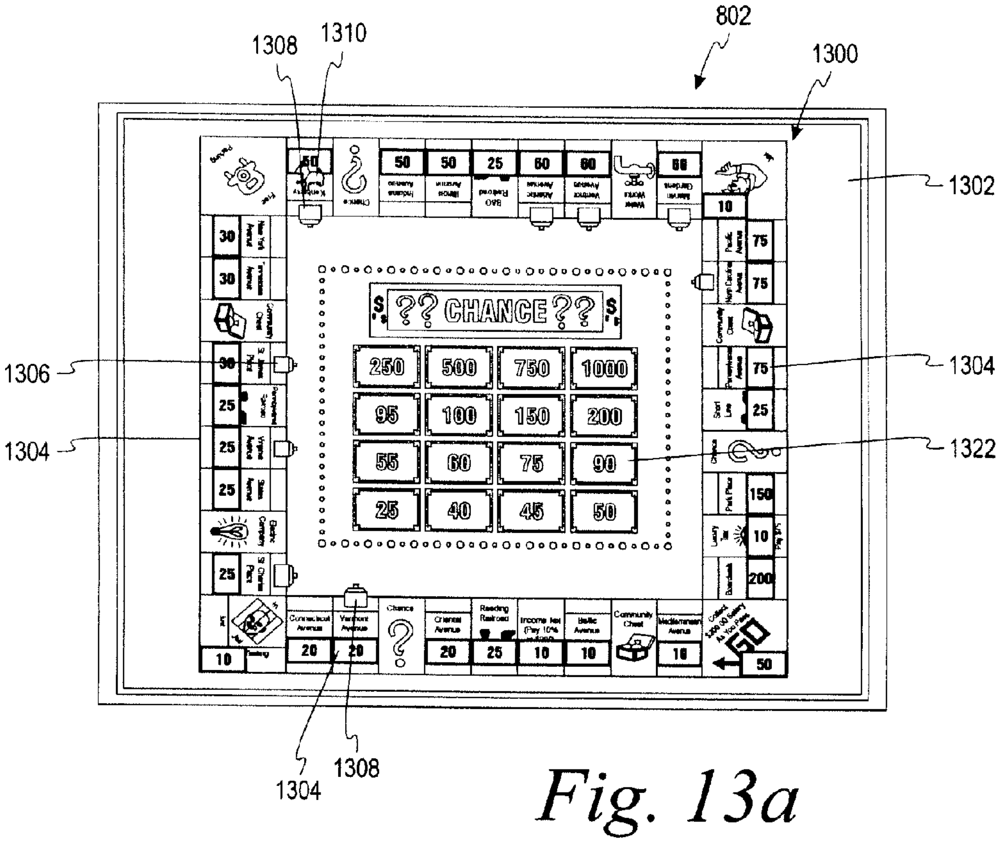
FIG. 13*a* is an illustration of a display surface graphic for an example board game.

FIG. 13*a* is a display graphic 1300 of a turn-based game for multiple players which may be projected on the display surface 802 of the gaming system 800. In this example, the turn-based game is a representation of a board game such as one with a MONOPOLY® theme and may be associated as a bonus game to base games played by players on either the gaming system 300 or the gaming system 800 or from gaming machines 10 and 100. In an aspect of various embodiments, the game displayed on the display surface 802 is based on the BIG EVENT™ MONOPOLY® game offered by the assignee of the present invention. The display graphic 1300 includes a game board 1302 which is a representation of a MONOPOLY® game board. The game board 1302 various spaces 1304 which represent properties in the MONOPOLY® board game. The display graphic 1300 allows the players to participate in community events or games involving the game board 1302. One example of a community game is allowing each player to place a house icon 1306 or a hotel icon 1308 on the various spaces 1304 which represent MONOPOLY® properties.

Another aspect of the game involves assigning each of the spaces 1304 to a player. Each player may then be awarded a certain number of houses or hotels in their respective player region based on the success in the base game. In turn, each player may place the available hotel or house icons by contacting the house or hotel icon in their player region and moving their finger to the various spaces 1304 on the game board 1302. After each player has placed the house and hotel icons 1306 and 1308 on the game board 1302, a game token icon 1310 is moved randomly around the board in relation to a predetermined outcome generated by the controller 34. When the game token icon 1310 lands on a property belonging to a player, the single player assigned to the property or all the players may receive an award. If the property is occupied by a house or a hotel, that player may receive a bonus award. In another embodiment, a player may place a physical house or hotel object on the display surface 802, and the multipoint sensing device associated with the display surface 802 distinguishes between the house and hotel objects by, for example, calculating the size of the footprint that the physical object makes when contacting the display surface 802. Based on the difference in footprint sizes, the controller of the gaming machine detects whether the player has put down a house or a hotel and its associated property. This aspect is described in more detail in connection with FIG. 13*b* below. When another player lands on a property on which a house has been placed, the player who owns that house may be awarded with one or more free "spins" or their equivalent (here, for example, rolls of the dice).

Another aspect of the game may involve special spaces. If the game token icon 1310 lands on a special space, a community event may be triggered for the players. For example, if the icon 1310 lands on a "Chance space," a special bonus graphic (not shown) may be displayed. In such a case, each player would be allowed to select a mystery card 1322 by placing their finger in contact with the card icon. After each player has selected a mystery card 1322, the game reveals the cards. Players may earn individual awards or the players collectively may earn an award.

The display graphic 1300 may also be configured as a turn-based player competition game. In such a configuration, players would be assigned an individual game token icon. The gaming system is configured for a virtual dice roll to advance the game token around the game board 1302. A player would be awarded depending on the space or spaces the game token lands on. The virtual dice roll is carried out by a player making a gesture on the display surface 802 that resembles a dice throw, and the direction, velocity, and/or pressure of that gesture is converted into a dice roll that is depicted graphically on the display surface 802. For two dice, the player may use two fingers and gesture both fingers across the display surface 802 to impart motion to the dice.

Figure 13B:
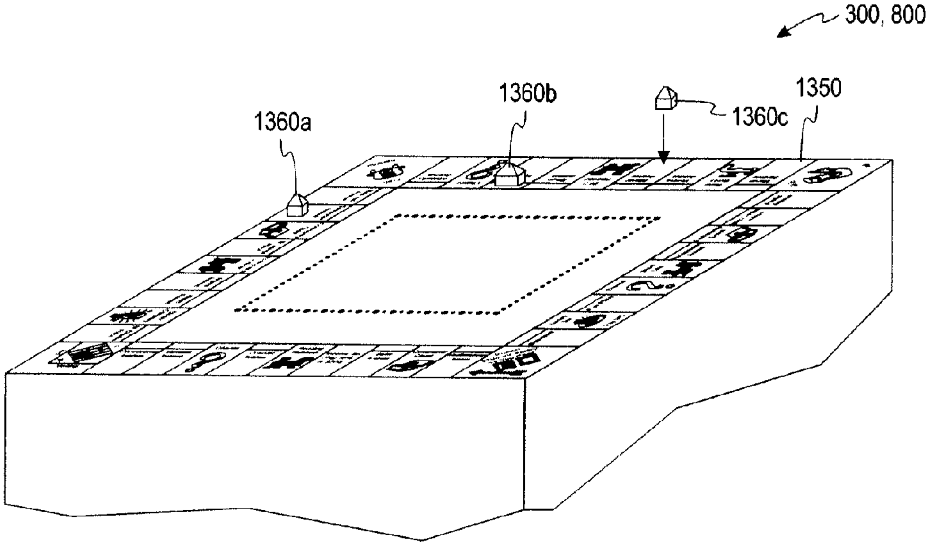
FIG. 13*b* is a perspective illustration of a display surface for an exemplary board game on which physical objects are placed.

FIG. 13*b* is a perspective view of an exemplary display surface 1350 on which physical objects are placed and recognized by the gaming system 300, 800. A board game according to a MONOPOLY® theme is projected or displayed on the display surface 1350. In the example shown, the board game is a turn-based game in which players can be awarded physical objects 1360*a*, 1360*b* and 1360*c* that can be placed on the display surface 1350. The physical object provides something tangible to the player who gains a sense ownership of the award with the ability to touch it and place it as an asset on a wagering game. This encourages the player to continue playing as the player is reluctant to relinquish the asset. When the player places an object on the display surface 1350, the controller of the gaming system 300, 800 is programmed to calculate the footprint size of the object to distinguish whether the object is a house or a hotel in the illustrated example. Other physical characteristics that may be used to distinguish among physical objects include the form factor of a footprint left by a physical object, the weight of a physical object, and the color of a physical object. Because the display surface 1350 is associated with a multipoint sensing device, multiple physical objects can be placed on the display surface 1350 and can be recognized simultaneously. Other finger points or gestures can also be detected during wagering-game play.

Another turn-based multi-player wagering game is based on the Spin-the-Bottle game wherein each player takes turn spinning a virtual bottle displayed on the display surface. The bottle spins around and eventually comes to rest; the player to whom the bottle is pointing when it comes to rest wins an award. If no player is present where the bottle is pointing, no award is made, encouraging players to find other players to fill all the seats around the table.

Another turn-based multi-player wagering game is based on the REEL 'EM IN™ wagering game offered by WMS Gaming, Inc. Multiple players "place" virtual or physical boats on a virtual lake displayed on a display surface of a gaming system according to aspects of the various embodiments. The players cast their reels and the fish swimming around in the lake will eventually bite on the bait of one or more players' fishing lines. An award is awarded to the player whose fish took the bait. In another aspect, this multi-player wagering game is modified to eliminate its "turn-based" aspect. Some players may perceive a disadvantage or an advantage in the turn order, so the wagering game in this other aspect allows players to place their wagers on the same spot on the display surface before the game outcome is revealed.

Another multi-player wagering game that is well-suited for the gaming systems of various embodiments of the invention involves a pinball-type theme. Players purchase credits which are used to acquire virtual bumpers or flippers that are placed on the display surface. A ball is released and bounces around the surface of the table, changing directions when it contacts a bumper or flipper. A player can increase the size of any bumper or flipper by purchasing more credits. Multiple players play this game until the ball reaches a destination at which time an award, if any, is awarded to the winning player(s). In this wagering game, the players can place wagers on other player's bumpers or flippers.

Figure 14A:
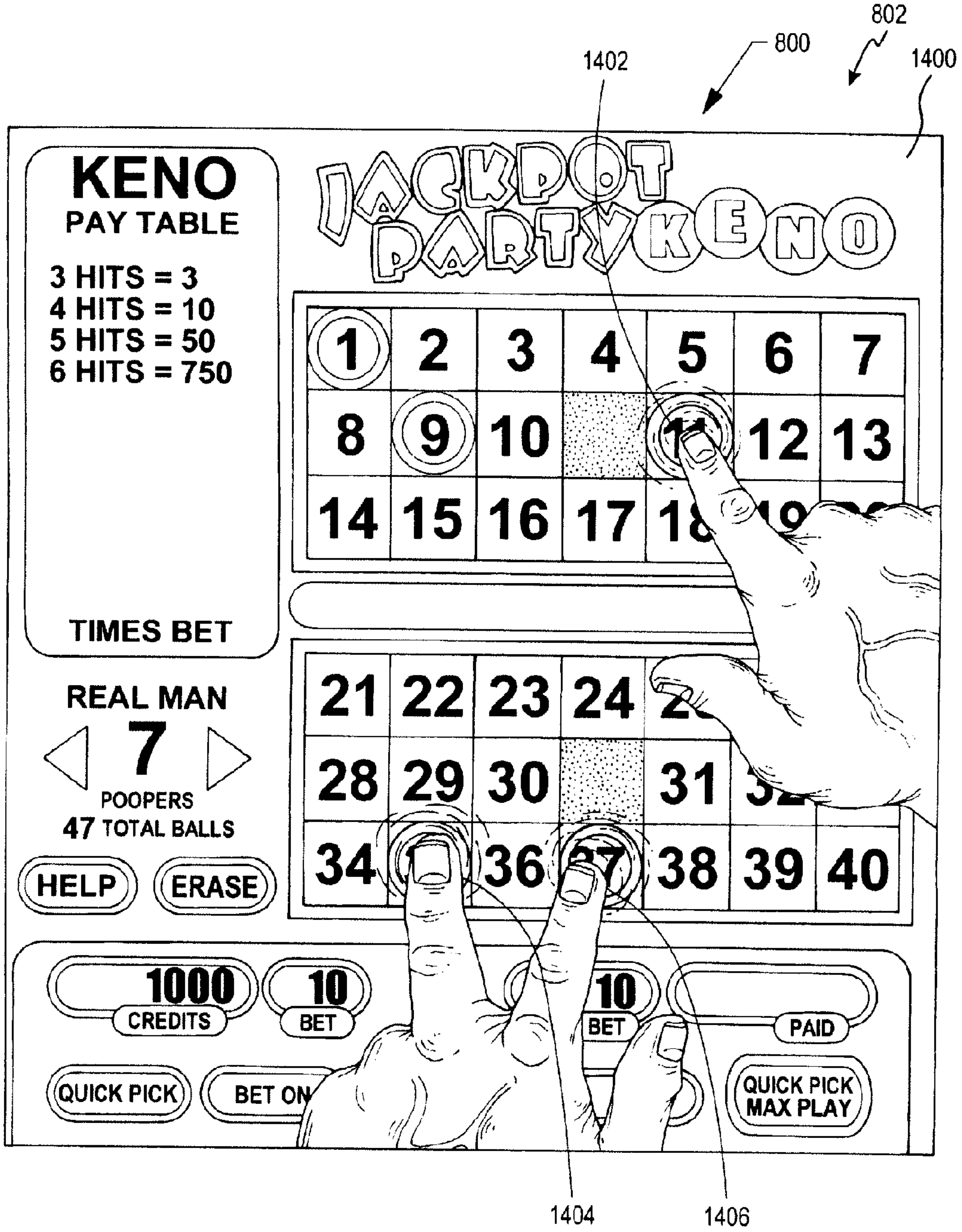
FIG. 14*a* is an illustration of a display surface graphic showing selection of multiple keno numbers by touching multiple points simultaneously on a multipoint sensing device.

FIG. 14*a* illustrates a display graphic for the multiple selection of keno numbers for a keno-type wagering game for each player in the multi-player gaming system 300 or gaming system 800. The same principles apply to the roulette-type wagering game, where the numbers selected are numbers on a wheel which is rendered in the common area 846 of the display surface 802. A Keno card graphic 1400 is displayed in each of the player regions on the display surface 802. Here, the player touches three points 1402, 1404, 1406 simultaneously on the display surface 802 to select three keno numbers, 11, 35, and 37, respectively. This bimanual selection may also require the use of multiple fingers on each hand. Now, the player need not select each number in seriatim but rather can quickly select using both hands and multiple fingers on each hand multiple numbers simultaneously. It has been found that players actually select more numbers when they can select multiple numbers simultaneously, and are less likely to deselect numbers once they are selected because they grow accustomed to a more rapid game play. Each of the players of the gaming systems 300 and 800 would have a similar display as that shown FIG. 14*a* in proximity to their chairs to make individual selection of numbers.

Figure 14B:
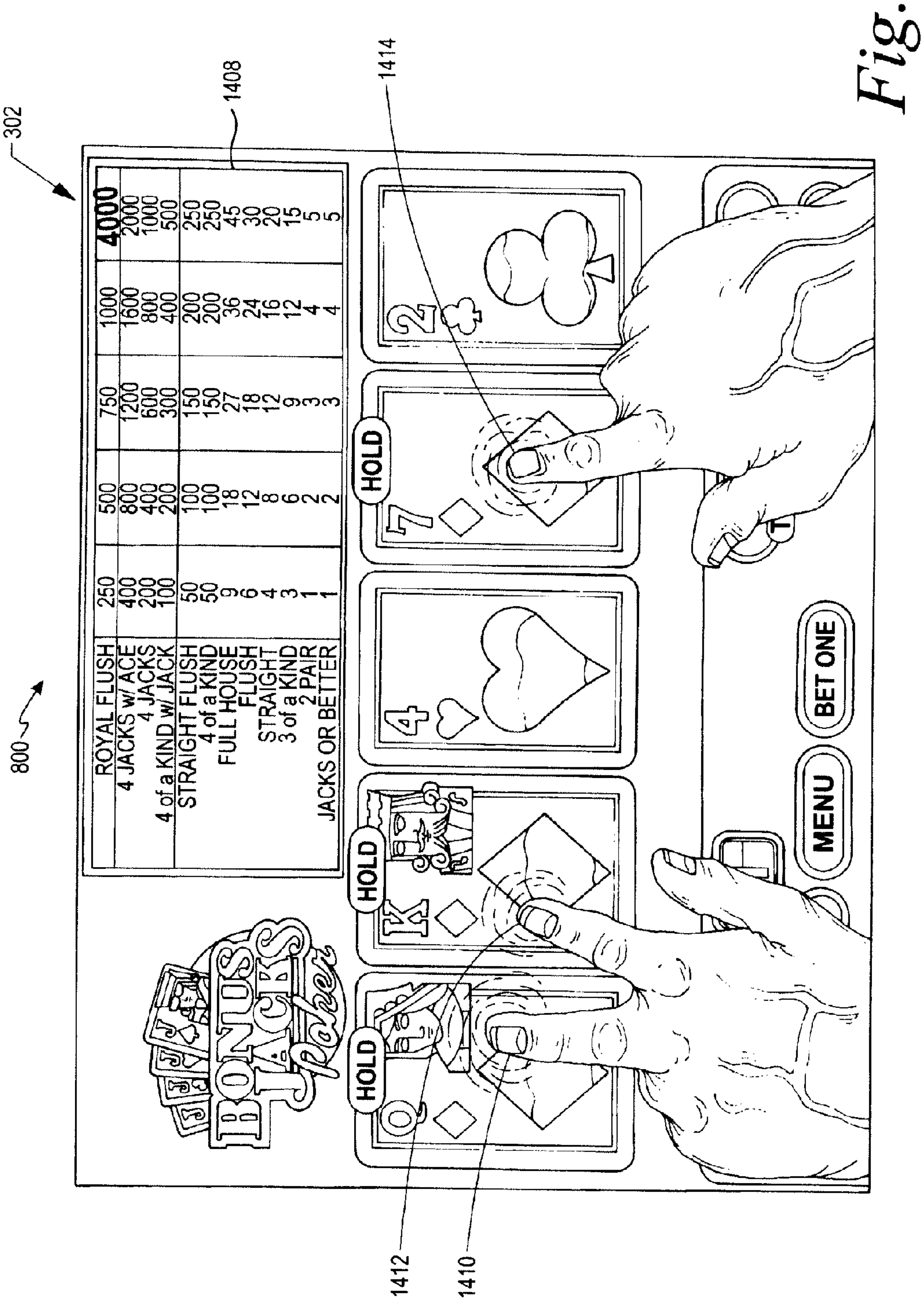
FIG. 14*b* is an illustration of a display surface graphic for an electronic card game with a request to hold multiple cards by touching multiple points simultaneously on a multipoint sensing device.

FIG. 14*b* illustrates a display graphic for multiple selection of cards in a poker-type wagering game. A draw poker graphic 1408 is displayed in each of the player regions on the display surface 802. In the case of the gaming system 300, multiple points 1410, 1412, 1414 are touched simultaneously on the multipoint sensing device 320 to cause the wagering-game function of holding a poker card to be carried out. Each card "touched" indicates a hold request by the player. In the illustrated embodiment, three hold requests have been made by the player. As with the other examples, the touch scheme is intuitive—to hold multiple cards, the player simply touches and "holds" the desired cards. Graphical elements such as the illustrated HOLD images can be displayed over the selected cards to provide feedback confirmation to the player that the requested cards have been selected by the gaming system 300 or 800. Alternatively, the game may configured to allow the players to play their hands against each other for bonus award or collectively such as by sharing an award for the highest winning hand against a game-derived hand.

Figure 15A:
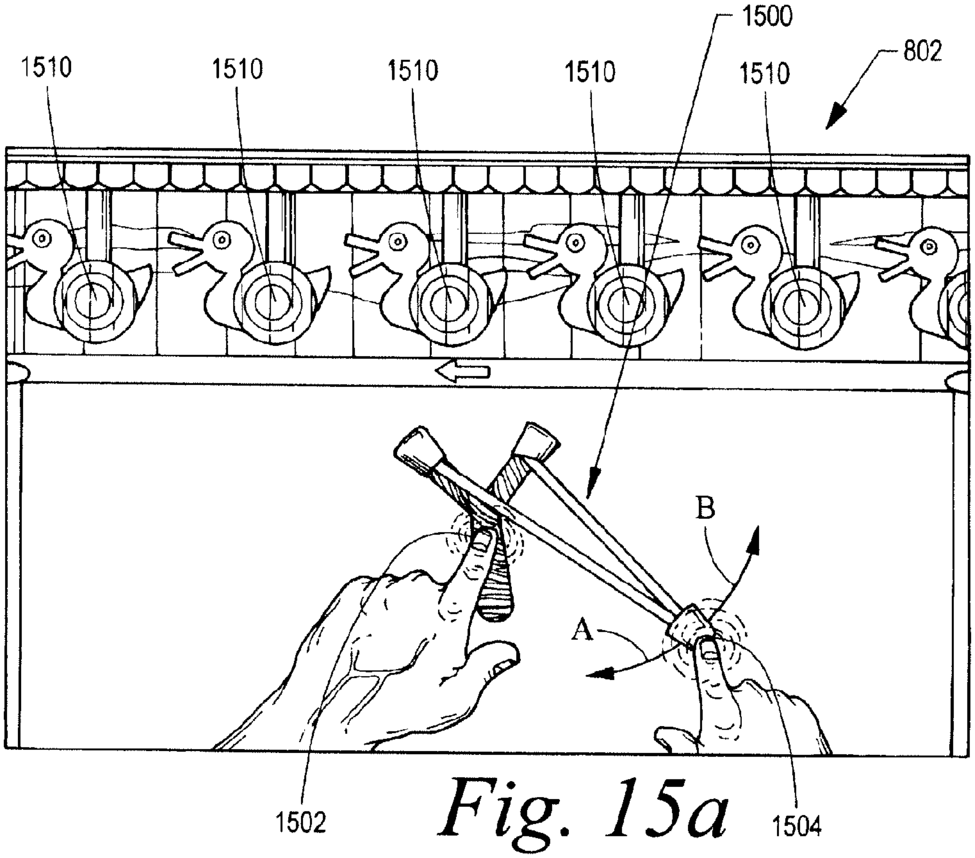
FIG. 15 is an illustration of a display surface graphic for an interactive skill type game.
Figure 15B:
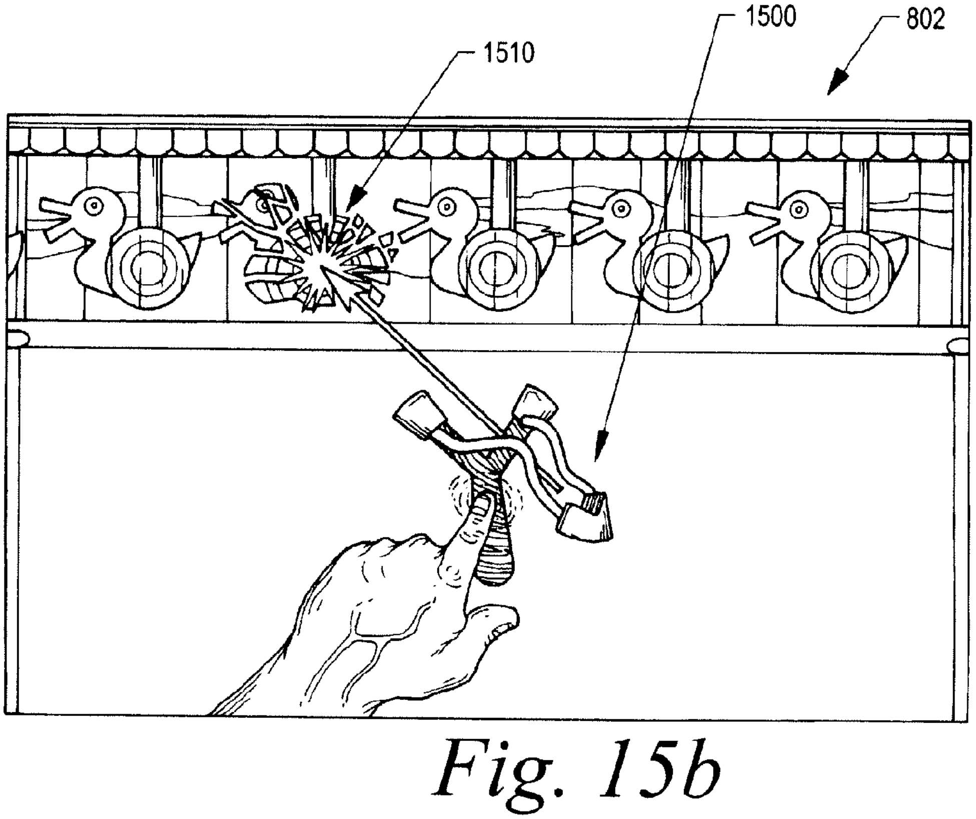

FIGS. 15*a* and 15*b* illustrate a multipoint gesture that causes a wagering-game function of selecting a bonus award amount for each player on the display surface 302 of the gaming system 300. A slingshot 1500 is displayed on the player region in front of each player. The player touches the slingshot 1500 at a point 1502 with one finger while simultaneously touching a pocket 1504 attached to a virtual band. The pocket holds a virtual projectile, which is aimed at various moving targets 1510, each target representing a hidden bonus award amount. The player holds the point 1502 while simultaneously gesturing with point 1504 in directions A, B to "aim" the projectile at one of the moving targets 1510. Note that the gesture depicted in FIGS. 15*a* and 15*b* is directional in that a direction is calculated based on the distance and relative coordinate positions of the two points 1502 and 1504. A velocity and acceleration can also be calculated, and environmental effects such as wind or gravity may be simulated to affect the virtual projectile as it leaves the pocket 1504. As the player moves the point 1504 around the multipoint sensing device 320, the slingshot 1500 is redrawn to track the movement of the band and pocket. This animation provides visual feedback and confirmation to the player that the gesture is being sensed. A motion trail proximate the finger can also be displayed, which tracks the movement of the player's finger relative to the display surface 802. The player can also move the position of the slingshot handle 1502 to orient it in an optimal position for hitting one of the moving targets 1510. Sound effects can also provide audible feedback confirmation of certain gestures, such as stretching the band or moving the pocket 1504 relative to the handle 1502. Vibrational feedback can be supplied by the haptic device 350, such as by increasing the frequency of vibrations as the slingshot 1500 is stretched to simulate the increasingly taut forces applied to the slingshot band.

Any of the gesture aspects of various embodiments of the invention may include a synchronized trail or animation for graphical feedback, akin to the trail that can be displayed as a mouse is dragged across a video display. The animated trail, synchronized with the direction of the gesture movement, provides assurance to the player that the gaming systems 300 and 800 are properly interpreting the player's input. Further, any of the gesture aspects of the various embodiments may also be synchronized with a corresponding haptic feedback from the haptic device 350.

Pressure sensing techniques described herein can be employed here to require the player to apply increasing pressure on point 1502 as point 1504 is moved further away from point 1502, to simulate the increased pressure caused by the stretching forces created by the slingshot band. If the player does not apply a sufficient pressure to the point 1502, the slingshot can be made to appear to fly out of the player's hand along with an informational message such as "Whoops, you need to hold on tightly to the slingshot as you stretch the band." In this manner, an actual slingshot motion can be simulated, enhancing the player's experience and creating a sense that the player is highly interacting with the wagering game. High levels of excitement and interest and generating feelings of interaction and engagement in the player are very important aspects to successful wagering games.

To release the projectile, the player lifts his finger from the point 1504, and the projectile is launched from the slingshot 1500 in the direction of the arrow and hits one of the moving targets 1510, whereupon the bonus award amount is revealed to the player. The wagering-game function being carried out here is a selection of a bonus award amount, but in FIGS. 15*a* and 15*b*, it is carried out in a manner that is fun, engaging, interactive, and intuitive to the player. Some level of player "skill" is involved in which the player must aim and estimate the direction and trajectory of the projectile, using both fingers to determine the direction and velocity of the shot. Note that the bonus award amount may be selected when the player's fingers are oriented to launch the projectile in a certain direction, or the bonus award amount may also require the player to also orient the fingers to launch the projectile with an appropriate velocity. If the player misses the direction or fails to launch the projectile with the appropriate velocity, the bonus award amount may be denied to the player.

Another gesture that can be interpreted by any of the gaming systems herein is a slap on the display surface, which is at least pressure-based. For example, players can slap certain areas on the display surface, causing award amounts to appear to pop up or other wagering-game functions to be executed in response to the detection of a pressure profile resembling a slap.

Similar gestures can be utilized to simulate different physical actions such as flying a plane or helicopter or driving a car or a boat with appropriate graphics to accomplish an event related to a wagering game, such as eligibility for a bonus round. Multiple fingers or multiple hands are used as the flight or steering controls, with multipoint gestures controlling movement, speed, attitude, altitude, speed, acceleration, direction, gear, and the like. The experience of each player is enhanced by competition with other players at the gaming system.

Figure 16:
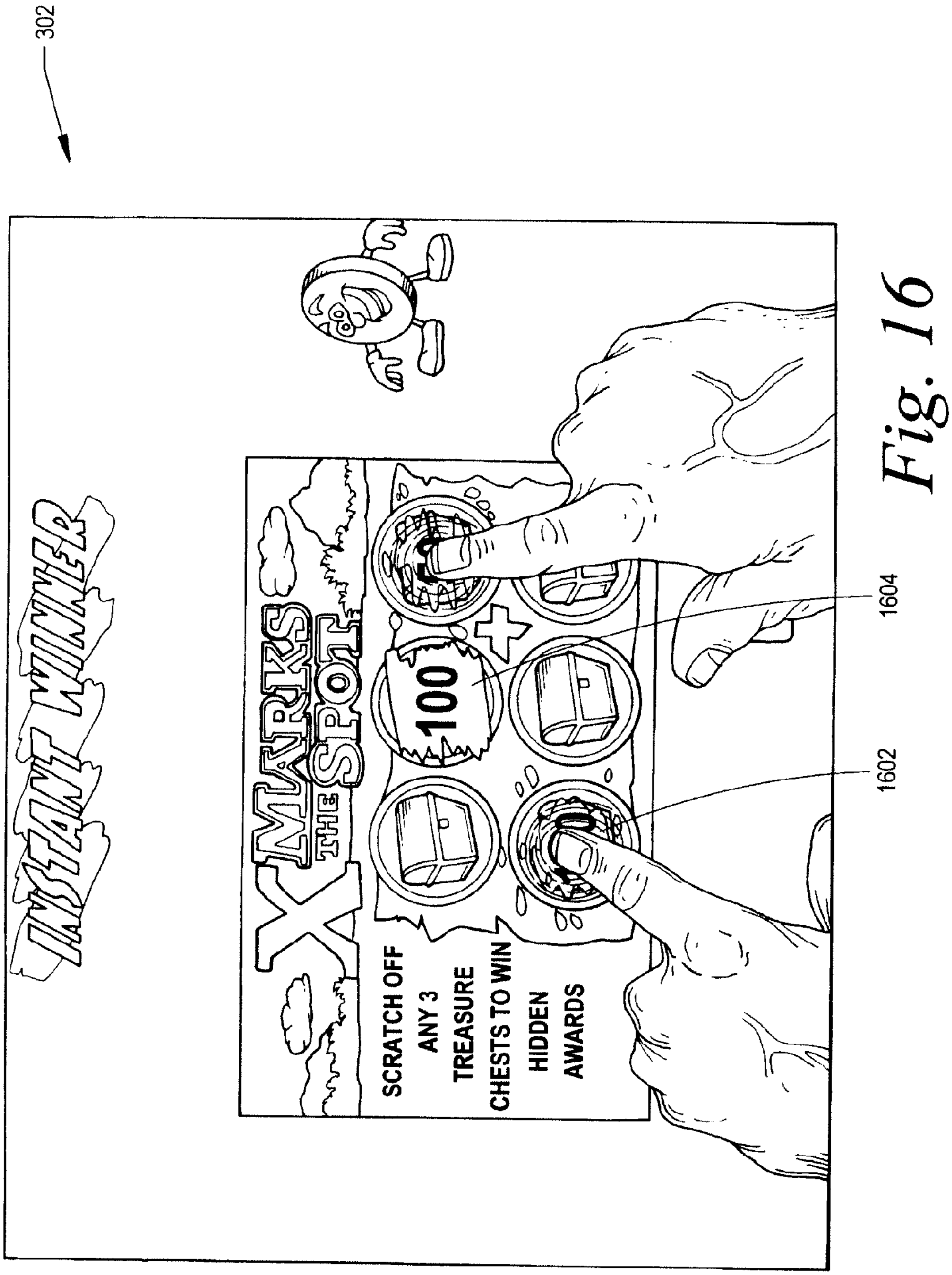
FIG. 16 is an illustration of a display surface graphic for selection of a bonus award revealed by applying multiple scratching gestures to objects depicted on a virtual scratch card in which total bonus award amount is initially concealed until multiple objects are scratched off.

FIG. 16 is an illustration of a "scratch-and-win" scratch card displayed relative to the display surface 302 of the gaming system 300 in proximity to each player in which multiple points corresponding to treasure chests 1602 and 1604 are touched simultaneously to reveal hidden awards inside the treasure chests. The wagering-game function to be carried out is selecting bonus awards. The multipoint gesture can be a back-and-forth scratching motion as a player would make to scratch a physical scratch card to reveal hidden potential prizes. According to an aspect, the player would touch simultaneously multiple treasure chests initially, and then using a scratching gesture across one or more treasure chests to rub off the treasure chest, thereby revealing the bonus award amount. The haptic device 350 may simulate a scratching vibration to provide haptic feedback to the player as the player is making a scratching gesture on the virtual card.

The player can also use more than one finger to scratch off a symbol. By using, for example, two or three fingers, the player can "scratch off" more of the treasure chest 1602 and 1604 than with one finger. In this respect, the multipoint sensing device 338 is operable to detect the size of the area contacted, and based on the size detected, cause more of the hidden potential prize to be revealed.

Figure 17:
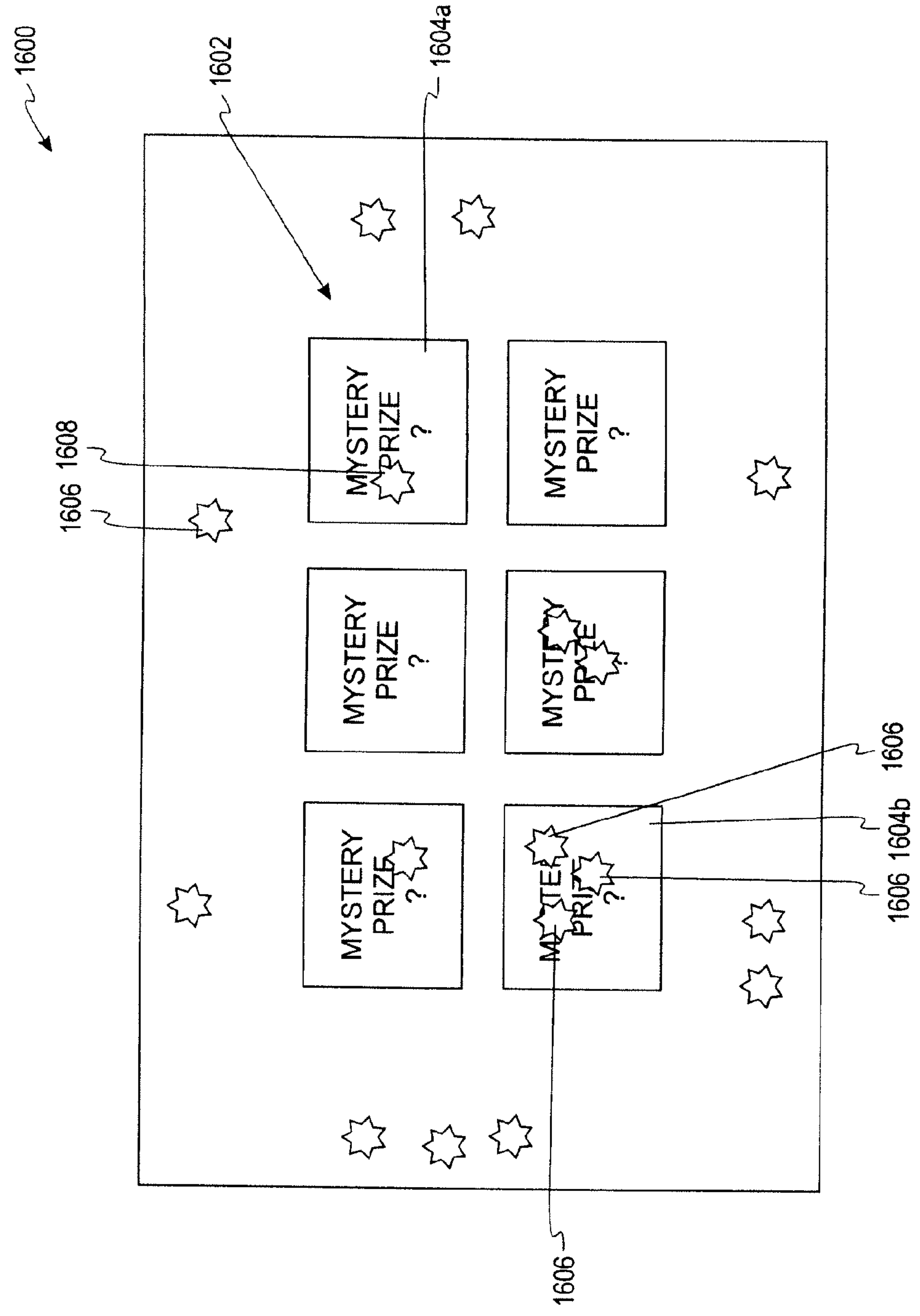
FIG. 17 is an illustration of a display surface graphic for a collective decision prize game.

Various community decisions from players may be utilized on wagering games for the gaming systems 300 and 800. For example, FIG. 17 illustrates a display graphic 1600 of a jackpot party themed wagering game which may be used as a bonus game for multiple players or a basic game. The game includes a prize-selection area 1602 with a number of random unknown present graphics 1604*a,b*. Each player is assigned a virtual or physical token or tokens 1606 for placement on the prize selection area 1602. Each player selects a present 1604*a* or 1604*b* using the token or tokens 1606, 1608 available to the player. In effect, the players collectively determine via their tokens the unknown present to be selected. When the players have placed their tokens the present with the most tokens reveals an award for all of the players. Players as a collective group or individually decide which present to put the tokens on. The award may also be made proportional to the number of player tokens on the selected present.

According to an aspect of various embodiments, a first player has placed a token 1608 on a present 1604*a* either by dragging the token 1608 across the display surface or by placing a physical token 1608 on the display surface above the graphic displaying the present 1604*a*. One or more other players have placed tokens 1606 on present 1604*b*. The players can coordinate and strategize among themselves as to where to place their tokens, and they can vote using the collective power of a group to make a decision about where to place wagers. The aspects and implementations of the various embodiments encourage precisely this sort of collaboration and sense of involvement with multiple players that cannot be duplicated with remote machines where players do not have the ability to see each other face-to-face and communicate in person among themselves. Groups of players who arrive at a wagering environment together are particularly attracted to the multi-player aspects of the disclosed embodiments. They can play a video-type wagering game together, while socializing or collaborating about communal decisions for the benefit of the entire group. Players can also readily see where other players are placing wagers and what they are placing wagers on and, based on those observations, can make their own individual wagering decisions. The multiple independent decisions become collective decisions that can potentially benefit the multiplicity of players as a group. In this manner, the players have an incentive to work together to maximize mutual benefit for themselves.

A variation of the game in FIG. 17 changes the probability of winning an award based on the number of players which select a certain present. Multiple players selecting the same potential prize increases the probability of a win. This may be illustrated graphically by making the selected icon such as a present graphic bigger. The players may place or remove the wager at any time and leave the table and later players can come to the table and add wagers to the pool. The probabilities are adjusted dynamically based on wagers present in the pool. The players must split any eventual award, but by pooling their wagers, individual players can increase their odds of an award payout.

Figure 18:
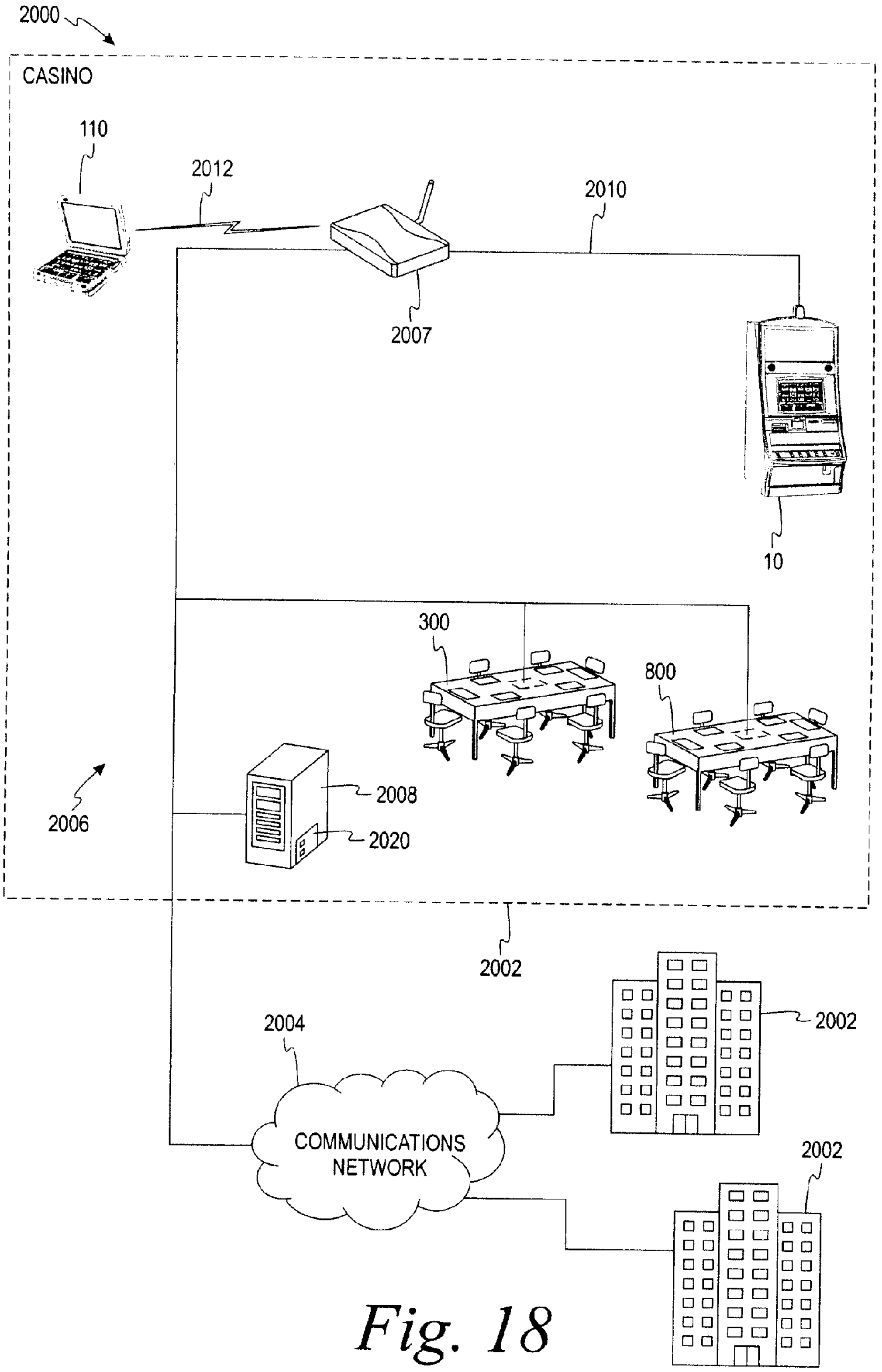
FIG. 18 is a block diagram of an example wagering game network 200 with the example multi-player gaming systems.

It is to be understood that either of the gaming systems 300 or 800 may be configured to accept different games such as those described in relation to FIGS. 11-17 above. FIG. 18 is a block diagram of an example wagering game network 2000 which may include a plurality of gaming establishments such as casinos 2002 connected to a communications network 2004. As those of ordinary skill in the art will appreciate, the communications network 2004 may be for example the Internet, or an Intranet with appropriate security mechanisms. The wagering game network 2000 may include other network devices, such as accounting servers, wide area progressive servers, player tracking servers, and/or other devices suitable for use in connection with gaming terminals.

Each of the plurality of casinos 2002 in this example includes a local area network 2006. The local area network 2006 may include a wireless access point 2007 and gaming machines 10 and 110. The gaming systems 300 and 800 are also part of the local area network 2006. A wagering game server 2008 may serve wagering games on the gaming machines and systems over the local area network 2006 and function as a remote controller as described above. The wagering game server 2008 includes hardware and machine readable media including instructions for performing the operations described herein. Those of ordinary skill in the art will appreciate that each casino 2002 may include other local area networks such as the local area network 2006 which may serve to connect many other wagering games. Alternatively, multiple servers may be used for the functions of the wagering game server 2008. The local area network 2006 may be any type of suitable property LAN configuration including, for example, a dedicated hardwired property LAN or a wireless property LAN. The local area network 2006 may be configured in a bus topology, a star topology, a ring topology, a tree topology, a full or partial mesh topology, etc., and may therefore include a single customer network data link or multiple customer network data links. The local area network 2006 may also be a peer-to-peer network in which case one or more of the controllers of the game machines 10 or 110 or game systems 300 or 800 perform some or all of the functions of the server 2008.

The local area network 2006 includes wired communication links 2010 and wireless communication links 2012. In this example, the stand alone gaming machine 10 and the gaming systems 300 and 800 communicate with the network 2006 via the wired communication links 2010. The handheld gaming machine 110 communicates with the network 2006 via the wireless communication links 2012. Of course other combinations of wired and wireless connections to different gaming machines may be used. The wired and wireless communication links 2010 and 2012 may employ any suitable connection protocols such as Bluetooth, IEEE 802.11, Ethernet, public switched telephone networks, SONET, etc. The game server 2008 may also serve wagering game devices and/or distribute content to devices located in other casinos 2002 or at other locations on the communications network 2004. The local area network 2006 may be configured to enable downloading of instruction sets (software) for games, game configuration data, game outcomes, etc. from the central server(s) such as the server 2008 to the gaming machines, and to enable uploading of marketing and operations data from the gaming terminals to the central server, in one embodiment.

The server 2008 includes a storage device 2020 that contains software instruction sets for different wagering games which may be loaded onto a storage device of gaming machines such as the system memory 36 of the gaming systems 300 and 800. It is to be understood that different parts of the game instruction sets may be stored on the storage device 230 with other parts of the tame instruction sets stored on the individual gaming systems. For example, the gaming systems may store part of the instruction sets in the form of modules relating to graphics files, audio/sound files, and certain game functions and operations such as player greetings or instructions. The stored instructions sets are mated with the remainder of the instruction sets loaded from the storage device 2020 over the network 2006.

Part or all of the software instruction set for wagering games may be sent to the gaming systems 300 and 800 via the wired communication links 2010 or the wireless communication links 2012. The wagering games are received by the external I/O circuit 48 of the respective gaming systems 300 and 800. The controller 34 of the respective gaming system loads the instruction set for the new wagering game or games in the system memory 36 and runs the wagering game in accordance with the software instructions. It is to be understood that different games may be installed on either game system 300 or 800 via manually delivery of content by replacing the media of the existing memory 36, such as the ROM, flash RAM or CD-ROM with new media containing updated game content. In addition, different games may be stored on the system memory 36 to give the multiple players of the gaming system a set of game options.

Figure 19:
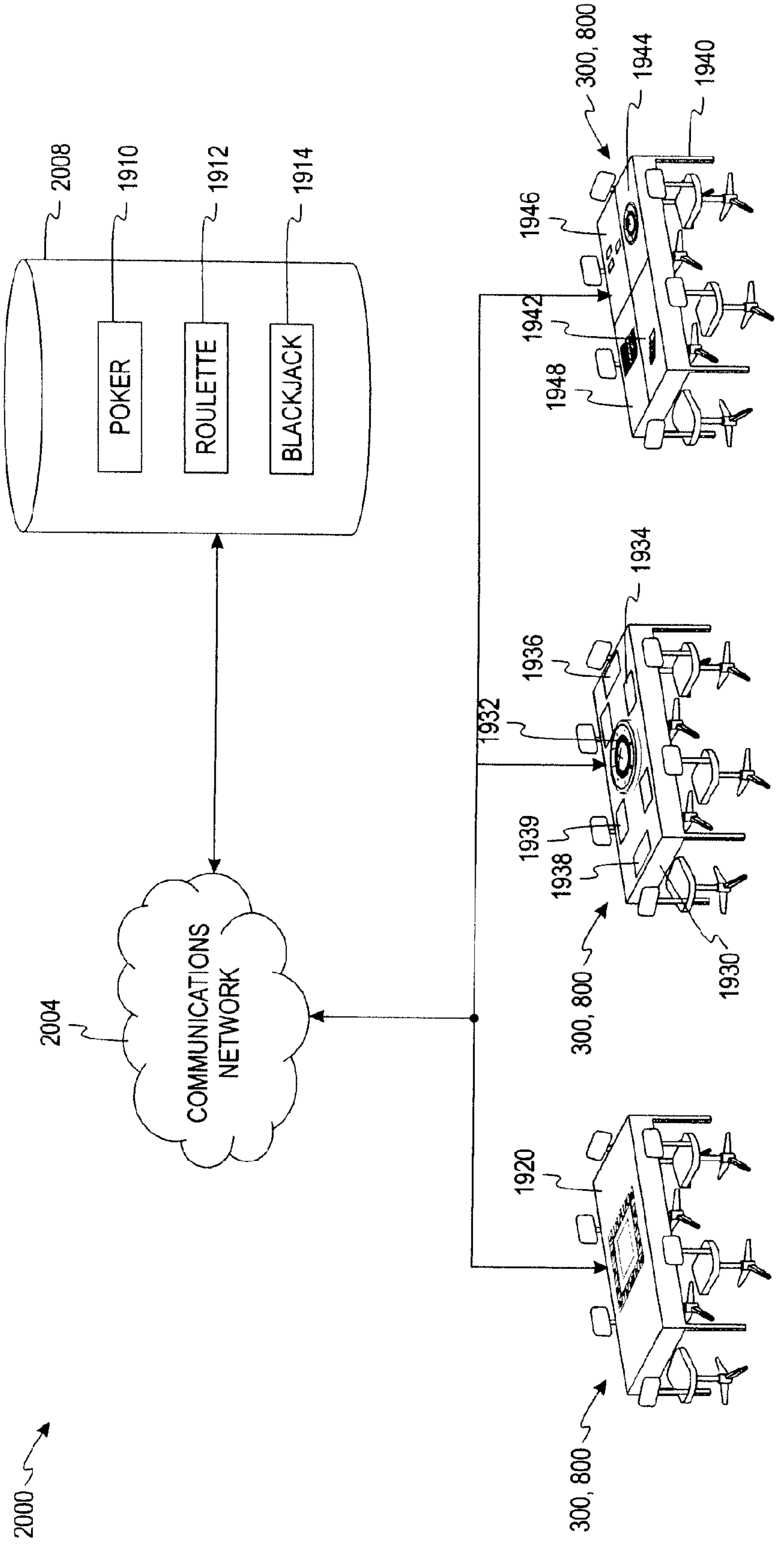
FIG. 19 is a block diagram of a specific exemplary wagering game network including a server storing a plurality of multi-player wagering games according to a specific aspect of various embodiments of the invention.

FIG. 19 is an exemplary configuration of networked gaming systems receiving downloadable wagering games from a remote database according to various embodiments of the invention. The wagering game network 2000 includes the wagering game server 2008 that is remotely communicatively linked via the communications network 2004 to a plurality of gaming systems 1920, 1930, 1940, which are configured as the gaming systems 300 or 800 described above. FIG. 19 illustrates three gaming systems each having a display surface for displaying or projecting wagering game images thereon in accordance with aspects described and shown herein. The wagering game server 2008 stores a plurality of wagering games playable on the plurality of gaming systems and displayed on their respective display surfaces. For example, display surface on gaming system 1920 displays a multi-player wagering game based on the BIG EVENT™ MONOPOLY® game offered by WMS Gaming, Inc. To change the wagering game playable on the gaming system 1920, the wagering game server 2008 downloads another multi-player wagering game, for example poker 1910, to the gaming system 1920, which reconfigures itself to display a multi-player poker game.

The gaming system 1930 portrays a multi-player roulette wagering game. Positioned over the center of the display surface of the gaming system 1930 is a physical roulette wheel that is communicatively coupled (for example, by electro-magnetic or wireless communication link) to the gaming system 300, 800 while betting areas 1934, 1936, 1938, 1939 are displayed on the display surface of the gaming system 1930. The players "place" bets on the betting areas 1934, 1936, 1938, 1939 as described above by touching or gesturing on the display surface. The physical roulette wheel 1932 is physically spun and the roulette wheel 1932 and the gaming system coordinate through the communication link to award the appropriate player(s), if any, based on the wagering game outcome. To configure the gaming system 1930 to portray a different wagering game, the roulette wheel 1932 is removed, and a new multi-player wagering game 1910, 1912, 1914 is downloaded from the server 2008 via the network 2004 to the gaming system 1930, which reconfigures itself to play the newly downloaded wagering game.

Finally, the gaming system 1940 has a display surface that is divided into quarters 1942, 1944, 1946, 1948, each quarter displaying a different multi-player wagering game whose content is downloadable individually or collectively via the network 2004 from the server 2008. For example, to change the game playable on the quadrant 1942 from a poker game to a Blackjack game, the server 2008 downloads to the gaming system 1940 the content for the Blackjack game 1914 via the network 2004. The games played on the other quadrants 1944, 1946, 1948 remain unchanged. In this way, a casino or wagering environment can remove at will unpopular games or test new games without physical intervention by an operator.

In another aspect, the gaming system 1940 displays a plurality of thumbnail images depicting a multiplicity of games playable on the gaming system 1940. Players touch a desired thumbnail, and then drags it to the middle of the display surface, where the thumbnail expands into a full-size wagering game that occupies substantially the entire display surface of a part thereof (such as one of the quadrants 1942, 1944, 1946, 1948). In the latter case, other players can select other thumbnails simultaneously and drag those thumbnails to their respective quadrant. The selected wagering games can be downloaded from the server 2008 as they are being selected. Players may have to wait a few seconds (they can be entertained by a tutorial that helps them practice using the touch-responsive display surface) while waiting for the new wagering game to be downloaded.

Figure 20:
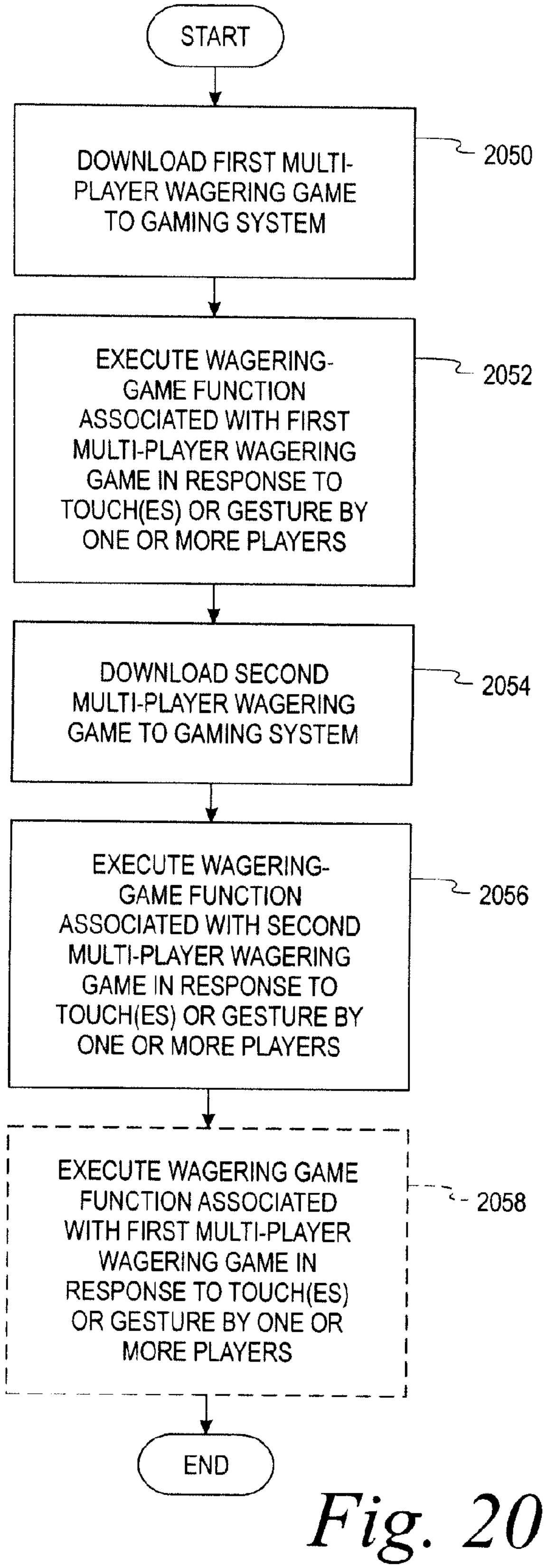
FIG. 20 is a flow chart of an exemplary method of downloading multi-player wagering game content to multiple gaming systems according to aspects of various embodiments of the invention.

FIG. 20 is a flow chart depicting a method of downloading multi-player wagering games to multiple gaming systems according to aspects of various embodiments of the invention. A first multi-player wagering game is downloaded to a gaming system (2050) via a network. The first multi-player wagering game may be stored on a server that is remote from the gaming system, such as shown and described in FIGS. 18 and 19. The gaming system may be any gaming system described or shown herein. The gaming system executes a wagering-game function associated with the first multi-player wagering game in response to one or more touches and/or one or more gestures by one or more players of the first wagering game (2052). A second multi-player wagering game is downloaded to the gaming system (2054). In an aspect, the second multi-player wagering game replaces the first multi-player wagering game. Accordingly, the gaming system executes a wagering-game function associated with the second multi-player wagering game in response to one or more touches and/or one or more gestures by one or more players of the second wagering game (2056). In another aspect, the gaming system continues to display the first wagering game after the second wagering game is downloaded and displays at least both the first and second wagering games on its display surface. In this aspect, the gaming system also executes a wagering-game function associated with the first multi-player wagering game in response to one or more touches and/or one or more gestures by one or more players (2058).

Additional embodiments may be realized. For example, privacy controls with respect to confidential information can be implemented with respect to individual gaming machine displays, as well as for common display areas using a variety of display filter devices. Such filters can be used with a wagering gaming machine, including a slot machine and hand-held gaming devices (e.g. FIGS. 1*a* and 1*b*), as well as with multi-player displays, including those embedded in a common electronic gaming table, such as a multi-touch gaming table (e.g. FIG. 3).

As used herein, "private information" refers to any information concerning a player's status, game progress, ability to play, or permission to continue to play, a particular game. Private information is typically maintained in a confidential fashion, and only revealed to the player directly affected by its content. For example, private information includes, but is not limited to: the contents of a poker hand, a house account balance, bonus points, portions of private information related to other players of the same game, the result of a particular play sequence within a game, standing in a progressive game with respect to other players, etc. A "multi-player gaming table" may include one or more multipoint sensing devices forming a part of a substantially planar playing surface, in conjunction with multiple displays, built into the playing surface and/or projected onto the playing surface, including a multitouch playing surface, as described previously.

In some embodiments, a multi-player gaming table may include a single large display, along with areas on the table (e.g., at four sides) where, for example, players can sit to view their individual cards. The designated area for each player is substantially the only area where each player can actually view the cards they hold (e.g., areas 1104, 1106, 1110, 1114 of FIG. 11*a*). If one of the players looks toward another's playing area (e.g., other sides of the table), they are unable to view it. However, all players can view the center area of the table (e.g., area 1116 of FIG. 11*a*), so that cards dealt to that area (e.g., the "flop" in some forms of poker) can be viewed by all.

Segmented privacy filters may be used to permit each player to view his own area, and the common area, but not the other player's areas. Such privacy filters may be obtained from 3M Company of St. Paul, Minn., among others. Liquid crystal displays (LCDs) with a limited viewing angle (e.g., less than 90 degrees) can also be used to preserve the confidentiality of private information. Wide-view LCD displays can be used to display common or non-private information. Poker tables with embedded filters or LCD displays for individual players can be constructed using any or all of these types of displays applied to the areas 1104, 1106, 1110, 1114, and 1116 of FIG. 11*a*, for example.

Using a multiple player gaming table, such as that shown in FIG. 3, several players can touch the table/display at the same time, and privacy can be provided on demand, as opposed to continuously. It is possible in some embodiments to sense a designated area 327 (e.g., defined by the proximity of a player's cupped hand), such that selected graphics will be revealed in that area alone. Such graphics can also be projected down onto a portion of the table surface or some other object that is only visible to an individual player (e.g. area 828 of FIG. 8).

Foam blocks and other physical barriers (e.g., individual viewing tubes) can also be added to the table surface to reduce viewing angles for individual players. For example, a multi-cell wall structure 837 of FIG. 8 (e.g., honeycomb or egg-crate) can be put in place on the table, and images projected down onto the surface over the multi-cell structure so that only the individual players can view the bottom of the cells. Mirrored or silvered viewing tubes (not shown) can also be used to view information displayed on the surface of the table.

Referring now to FIG. 12, it can be seen that very small images can also be projected, so that a virtual or real magnifying glass can be superimposed on the image to render selected portions visible to the player that has possession of the magnifier. The "magnifying glass" may comprise a hand-held object 1227 with its own display 1229 that senses location over a projected, miniature image 1231, and then displays a magnified portion 1233 to the player holding the magnifying glass. Other approaches include projecting an image in selected colors, and providing players with colored filters (not shown), either as part of glasses that can be worn, or handheld planar-type devices 1227 that can be placed over the table surface. Different colors can be provided to different players, so that only a selected player area (e.g. area 1210) will be displayed to the player equipped with the appropriate color filter (e.g. filter 1229).

Shaped surfaces on the table top, or the table surface itself can be constructed to permit a narrow viewing angle. For example, a curved table surface 339 of FIG. 3 may prevent viewing by persons that stand to one side or the other of a selected player. The surface may be built with a fixed curve, or electro-mechanical forces may be applied to a flexible table surface to bend the surface as desired, perhaps in response to specific player 346 of FIG. 3 contact with the table surface.

An image conduit 839 of FIG. 8 may also be used to convey private information, such that individual players 817 of FIG. 8 can use the conduit to bring portions of an image projected or displayed onto the surface of the multi-player gaming table image up to near eye level. A block of tightly bundled fiberoptics can be substantially vertically oriented to provide this effect. A light pipe (not shown) will bend the image, while an image conduit 817 of FIG. 8 will transfer the image from the surface where it is displayed, at one end of the conduit, to be viewed at the other end of the conduit.

A manually activated secondary object may also be used to convey private information to selected players. For example, players can be provided with glasses 341 of FIG. 3 having various degrees or orientations of polarization, so that it would be difficult or impossible to see images displayed using a different polarization. For example, two players might have polarized glasses, with one pair 341 of FIG. 3 using vertical polarization and another 343 of FIG. 3 using horizontal polarization.

In some embodiments, a split screen may be implemented to convey private information to players, perhaps by using a lenticular lens that creates a convex perspective of multiple images or light sources. The simplest form of a lenticular lens is a bifocal, which has just two magnifying lenses. Using a three-part lenticular lens, a viewing screen could be split into three portions: all three could be showing the identical image during some portion of the game play, and then, during another part of the game, the screens might be split to show a first player his cards on the first screen portion (e.g. area 1108 of FIG. 11*a*), a second player his cards on the second screen portion (e.g. area 1112 of FIG. 11*a*), and a third (e.g., middle) screen portion (e.g. area 1116 of FIG. 11*a*) with both hands down. Multiple video images may thus be viewed from different angles, so that game play elements can be added. A composite image of all of desired views may be displayed, with the various parts of the lenticular lens used to separate them for multiple players, each viewing from a different angle.

Light beams (e.g., infra-red beams 25 of FIG. 1*a*) may be projected across the viewing area 14 of FIG. 1*a* for a single player, with an alarm 27 of FIG. 1*a* coupled to alert the player when others intrude into the viewing area 14 of FIG. 1*a*. Proximity to the viewing area 14 of FIG. 1*a* can also be detected by tracking the eyes of the player. If the eyes move out of the viewing field, perhaps bounded by the light beams 25, then the display of private information 28 of FIG. 1*a* for that player may be turned off.

In some embodiments, private player information (e.g., a poker hand) is transmitted to a personal, hand-held device 2219 of FIG. 3 (e.g., cell phone or personal digital assistant (PDA)). This device 2219 may be docked at or near a playing surface 302, such as a multi-player table with additional displays. Bumpers or other physical features 2221 of FIG. 3 of the table may be used to shield the display of the hand-held device 2219 of FIG. 3, so that private information displayed thereon is visible only to a selected player 346 of FIG. 3.

Hand-held devices 1227 of FIG. 12 can also be moved over areas 1210 on a multi-player gaming table to reveal information. Such devices 1227 may be primarily optical or primarily electronic. For example, an optical device 1227 may operate to project private information to or display 1229 private information on the table surface in such a way that a portion of the device reveals text (e.g., a magnifying or shuttered portion), whereas the text is otherwise invisible to the naked eye. Similarly, the device 1227 may include a polarization filter or pattern of lines that can reveal information if the device is oriented properly over displayed text 1231.

A hand-held optical device might also take the form of a puck 331 of FIG. 3 on the table surface 302 that is rotated so as to change a displayed image, so that as the position of the puck 331 and its orientation are detected (e.g., via a pattern engraved on the bottom of the puck 331, or other orientation indicating mechanism), information is revealed and perhaps augmented. When the puck 331 is set on the table surface 302, it can result in information, associated with a designated player and the puck 331, being revealed. When the puck 331 is moved, then the information is no longer available.

A hand-held electronic device 1227 of FIG. 12 might take the form of a PDA that displays private information only in proximity to the table surface 302 (see FIG. 3), and/or when it is oriented in a selected way. For example, if the device 1227 is held in a vertical (portrait) orientation, nothing is displayed. If it is held horizontally (with reference to the viewer), in a landscape orientation, and in a designated area 1210 of the table surface, then the private information is displayed.

In some embodiments, a miniature projector 1139 of FIG. 11*b* might project the private information 1141 onto a player's cupped hand 1152.

Some apparatus and systems may include the use of a flexible apparatus 1155 of FIG. 11*c* having a display 1157 that can be manipulated by the player 1150, such that when one edge of the apparatus 1155 is lifted from a playing table proximate to the viewing surface of the display 1157, private information becomes visible to the player 1150. For example, such a display 1157 might turn on to show private information when lifted up, and turn off when returned to a resting position face-down. The higher the display 1157 is lifted from the table surface, the greater the viewing angle toward the player 1150. In most cases, the viewing angle expands vertically more than horizontally, as one edge of the device is lifter higher off of the table surface.

Projection directly onto the retina can be used to display private information to individual players. Retinal projectors 841 of FIG. 8, or retinal scan displays, can be obtained from Microvision, Inc. of Redmond, Wash. For example, a small projector can be mounted to a framework 343 of FIG. 3 worn by the player (e.g., an eyeglass frame), such that the display 345 appears to be projected out into space in front of the player 348.

Players may also be given a head-mounted display 341 to view private information, including the display of three-dimensional images. Such devices can be obtained from a variety of sources, including the i-glasses PC/SVGA Pro 3D head-mounted display available from i-O Display Systems, LLC of Sacramento, Calif. In the case of retinal projection, or individual head-mounted displays, players can activate the display by touching the surface 302 of a multi-player table.

In some cases, a flexible film or piece of plastic with a mirrored surface might be hinged to the surface of a multi-player table. Each player might then "turn-over" the edge of the display 863 of FIG. 9 to see what is reflected on the surface 865 of the mirror from the display surface 802 of the table below, or from a projector 867 in front of the mirror. For example, a light emitting diode (LED) or liquid crystal diode (LCD) display 869 might be recessed into the display surface 802 of the table and the information displayed thereon reflected to the player via the mirrored surface.

Some games, such as competitive card games, may be made more exciting by using an indicator 1135 of FIG. 11*a* in conjunction with the privacy control device to reveal to other players whether or not a selected player has viewed his own private information. An indication may also be given as to the number of times the information has been viewed. Bets and the conduct of raises might be based on the state of the indicator 1135 with respect to various players, including the number of times a selected player has viewed his own information.

When a multipoint playing surface is used, players may be given access to gesture-based revelation of private information. For example, the back of a card 1137 displayed or projected onto the table surface may be "touched" by the player to reveal only the corner of the card face, and the player's finger may be dragged across the "back" of the card to expose more and more of the card face for viewing by the player. Thus, gestures can be made to view more or less of the private information, displayed in the form of a card, or table of figures, etc. The amount of revelation may thus be variable, or fixed, such that a finger tap or touch to the back of the card may reveal a pre-selected amount of the face to the player (e.g. 25%, 50%, 75%). This fixed amount may be selected by the player, or other entities. Of course, varying portions of other forms of private information may be revealed in a similar manner.

Some embodiments may include electronic paper (e-paper) that is inductively powered by the multi-touch gaming table, such that the paper is physically separate from the table, and used to display card backs 1139 and/or card faces 1141 (e.g., e-paper with a display on both sides of the paper) when placed in close proximity to the table surface. The e-paper may also be used to display miniature images 1143 of cards that become enlarged in sequence or selectively, when the multi-touch table surface is touched by the player in proximity to the e-paper display.

Various embodiments include card tables, such as display surfaces 802 of poker tables, that include a secondary display 863 of FIG. 9 that can be flipped-up or moved between two positions to hide and reveal cards and other private information 871 for each player. Alternatively, or in addition, each player may bring a hand-held device 1227 of FIG. 12, such as a PDA or e-paper to the table to display the cards that they are dealt, as well as other private information 1233. The image is available only when the device is moved within a selected range, such as within a marked area 1210 of the table surface, and tilted to an angle that lies between horizontal (e.g., parallel with the table surface) and vertical (e.g., perpendicular to the table surface).

In some embodiments, there is a common display area 1116 of FIG. 11*a* which all players at a multiple-player table can view. There are also individual player display areas 1106, 1108, 1110, 1114, which can be viewed by corresponding individual players according the privacy controls in place for each player position. A multi-player display surface 302 of the table in FIG. 3 may include any one or more of the privacy control mechanisms described above.

Figure 21A:
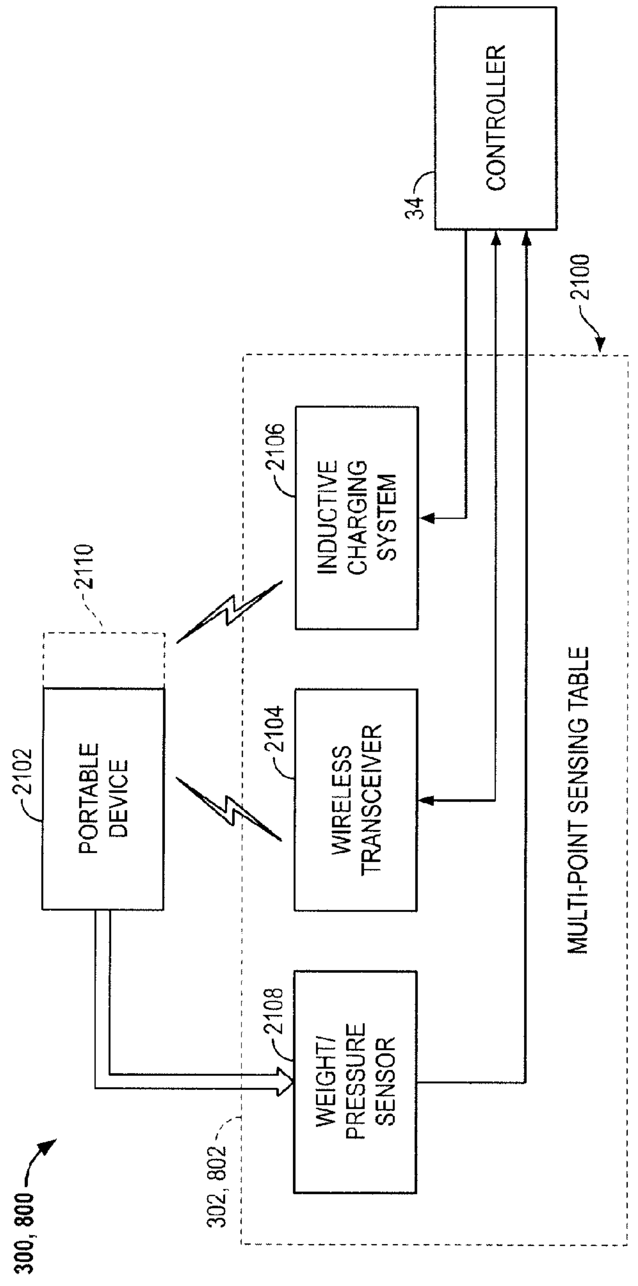
FIG. 21*a* is a functional block diagram of a portable device interacting with a multipoint sensing device according to aspects of various embodiments of the invention.

Turning now to FIG. 21*a*, a gaming system 300, 800 is shown for illustrating how a portable device 2102 may interact with a multipoint sensing table 2100 that includes a display surface 302, 802 on which the portable device 2102 is placed. The portable device is carried by a player of a wagering game or games playable on the multipoint sensing table, and the device may be an electronic device such as a gaming machine 110, a mobile phone, which may be BLUETOOTH™-enabled, a personal digital assistant, and the like, or a non-electronic object such as a deck of cards or any other object. It is something that is normally carried by the player and imbues in the player a sense of ownership and control when the player places this object onto the table, in some respects staking out a territory for him or herself in the area where the object is placed. By using an object owned or carried by the player, the player announces by placing something important to that player onto the table that this part of the table is controlled by that player.

The table 2100, which is similar to any other of the gaming systems disclosed herein, further includes a weight or pressure sensor 2108 that detects the presence of the portable device 2102 when placed in a designated region, also termed a "hotspot," defined relative to the display surface 302, 802. The weight or pressure sensor 2108 outputs a signal indicative of the weight or pressure exerted by the portable device 2102 when placed on the display surface 302, 802, and this signal is communicated to the controller 34. The weight or pressure sensor 2108 can detect information relating to the size of the object placed on the display surface 302, 802. Of course, the gaming system 300, 800 without the sensor 2108 can detect the presence of the portable device 2102 in some embodiments, but the addition of the weight/pressure sensor 2108 provides more flexibility in ascertaining information about the portable device.

The gaming system 300, 800 also includes a wireless transceiver 2104 that is controlled by the controller 34 to communicate wirelessly with the portable device 2102 when equipped with a wireless transceiver that formats wireless data according to a protocol that is compatible with both the portable device 2102 and the wireless transceiver 2104. The gaming system 300, 800 also includes an inductive charging system 2106 that inductively charges a battery 2110 of the portable device 2102 when placed in proximity to the inductive charging system 2106 on a hotspot region of the display surface 302, 802. Current signals required to provide the inductive energy for charging the battery 2110 are provided directly or indirectly via the controller 34. The casino may provide this charging service on a complimentary basis and may require the player carrying the portable device 2102 to allow marketing messages to be transmitted to the portable device 2102 in exchange for the charging service.

Figure 21B:
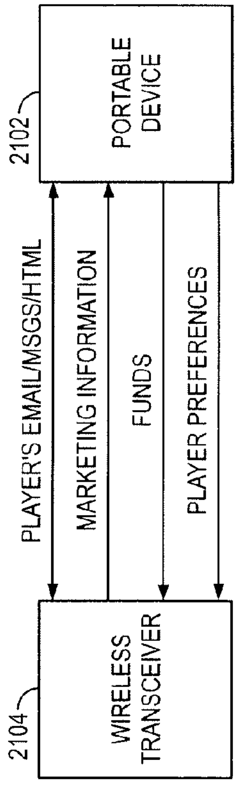
FIG. 21*b* is a functional block diagram of types of data that can be transferred between a wireless transceiver associated with the multipoint sensing device and the portable device of FIG. 21*a;*

Examples of information that may be communicated between the wireless transceiver 2104 of the gaming system 300, 800 and the portable device 2102 are shown in FIG. 21*b*. Any one or more of the data shown in FIG. 21*b* may be communicated. For example, the player's email, text messages, or HTML-formatted webpages may be communicated between the wireless transceiver 2104 and the portable device 2102. The casino may offer this service complimentary to encourage the player to remain at the table 2100. As mentioned above, marketing messages in the form of advertisements, casino announcements, and the like may be transmitted to the portable device 2102. When the portable device 2102 is a portable gaming machine, such as the gaming machine 110, funds may be transferred between the portable device 2102 and the wireless transceiver 2104 and used for placing wagers on wagering games played on the table 2100. When the portable device 2102 includes player preferences, these may also be communicated to the wireless transceiver 2104 for configuring a wagering game displayed on the display surface 302, 802 in accordance with those preferences.

To recognize the various interacting objects that may be placed on the display surface 302, 802, the gaming system 300, 800 may utilize the camera 347, 847, the object may include an RFID tag to identify itself, or there may be a pattern or an ultraviolet tag imprinted on the side of the object that will face the display surface 302, 802 when placed there, to name a few examples. When the object includes an RFID tag and the multi-touch table includes an array of antennas, such as Mitsubishi's Diamond Touch Table, the antennas may be configured to sense the RFID signals.

Figure 22B:
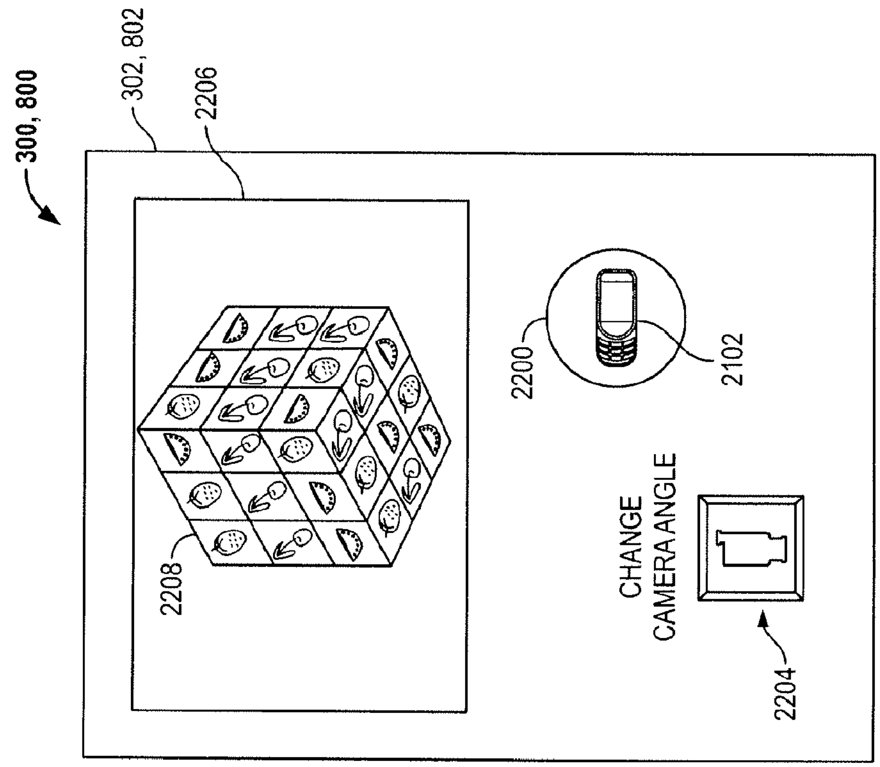
FIGS. 22*a*-22*b* are exemplary top views showing how a player places a portable device onto a surface of the multipoint sensing device and by rotating the portable device in place causes a camera angle of a 3-dimensional image to be rotated by a commensurate angle.
Figure 22A:
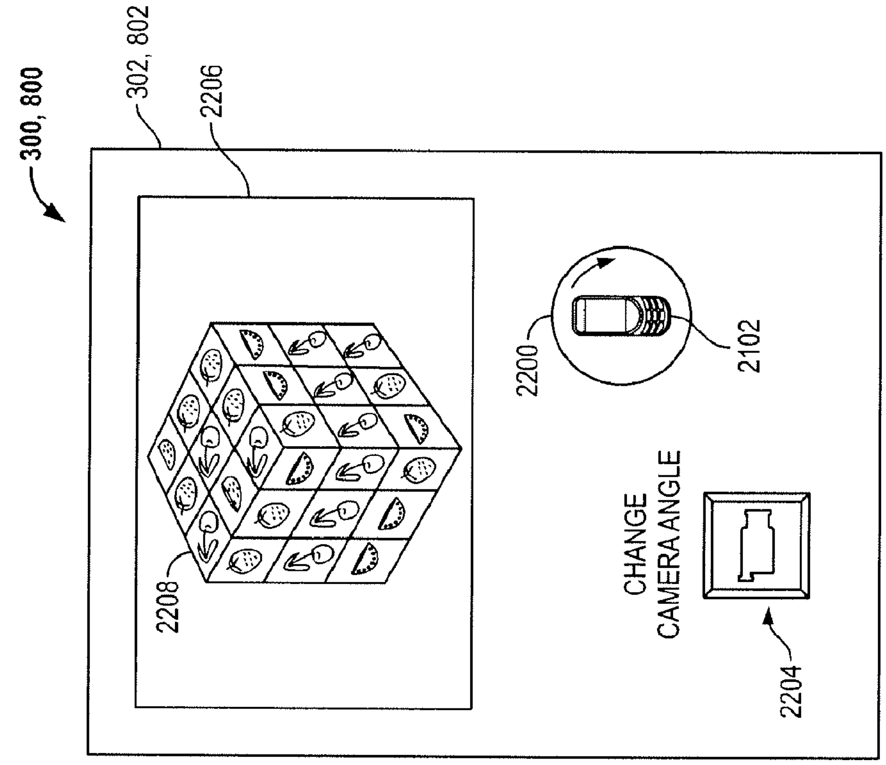

FIGS. 22*a*-22*b* illustrate exemplary graphics displayed on the display surface 302, 802. Here, the player places the portable device 2102 onto the surface of the display surface 302, 802 in a designated region 2200 and manipulates an angle of a virtual camera to cause a 3-dimensional object 2208 that is related to a wagering game being displayed on the display surface 302, 802. In the example shown the 3-D object 2208 resembles a Rubik's Cube, in which each face of the cube bears wagering-game symbols. Because the Rubik's Cube has six faces, some of which are not visible to the player, the player can manipulate a virtual camera by rotating the physical object 2102 in the designated region 2200 to cause the virtual camera to change its viewing angle. In the example shown, the player has rotated the physical object 2102 by 90 degrees, causing a 90 degree rotation in the camera angle. As a result, symbols that were previously obscured to the player are now visible. The manipulation of the physical object 2102 and the resulting change in camera angle provide the player with a sense of control over the wagering game. The game system 300, 800 can detect the presence of the physical object 2102 when it is placed in the designated region 2200.

Figure 23:
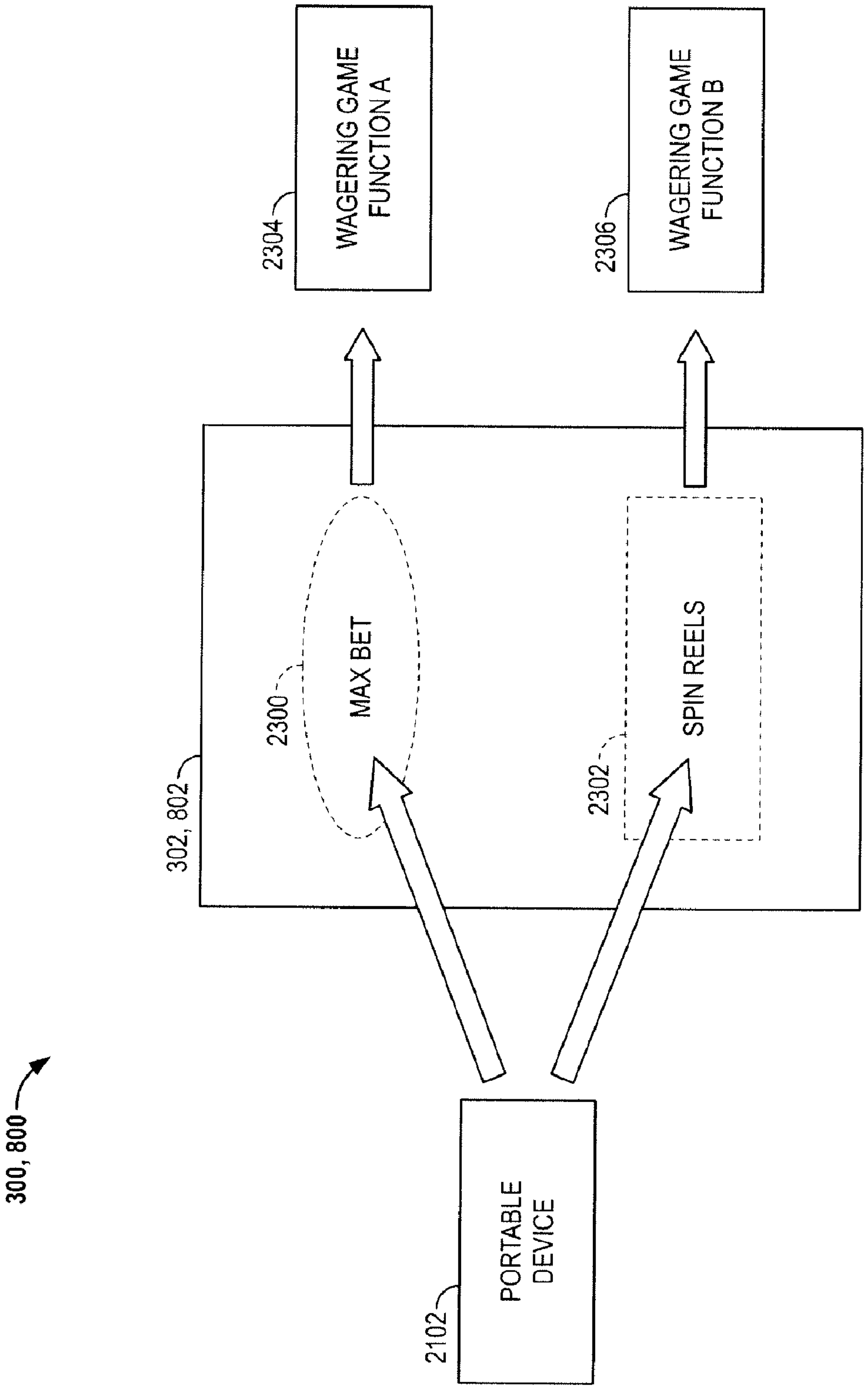
FIG. 23 is a functional block diagram illustrating how placement of a portable device onto designated areas on the surface of the multipoint sensing device causes different wagering game functions be performed.

FIG. 23 is a functional diagram of how placement of the portable device 2102 in different designated areas 2300, 2302 on the display surface 302, 802 can cause different wagering game functions 2304, 2306 to be executed by a controller, such as the controller 34. In the example shown, the portable device 2102 may be placed on the display surface in an area designated as MAX BET 2300. When the portable device 2102 is placed in this area, the wagering game function 2304 associated with input of a maximum bet is carried out. When the portable device 2102 is placed in an area designated as SPIN REELS 2302, the wagering game function 2306 associated with a spin reel function is carried out. A video slot game is displayed on the display surface 302, 802.

Figure 24:
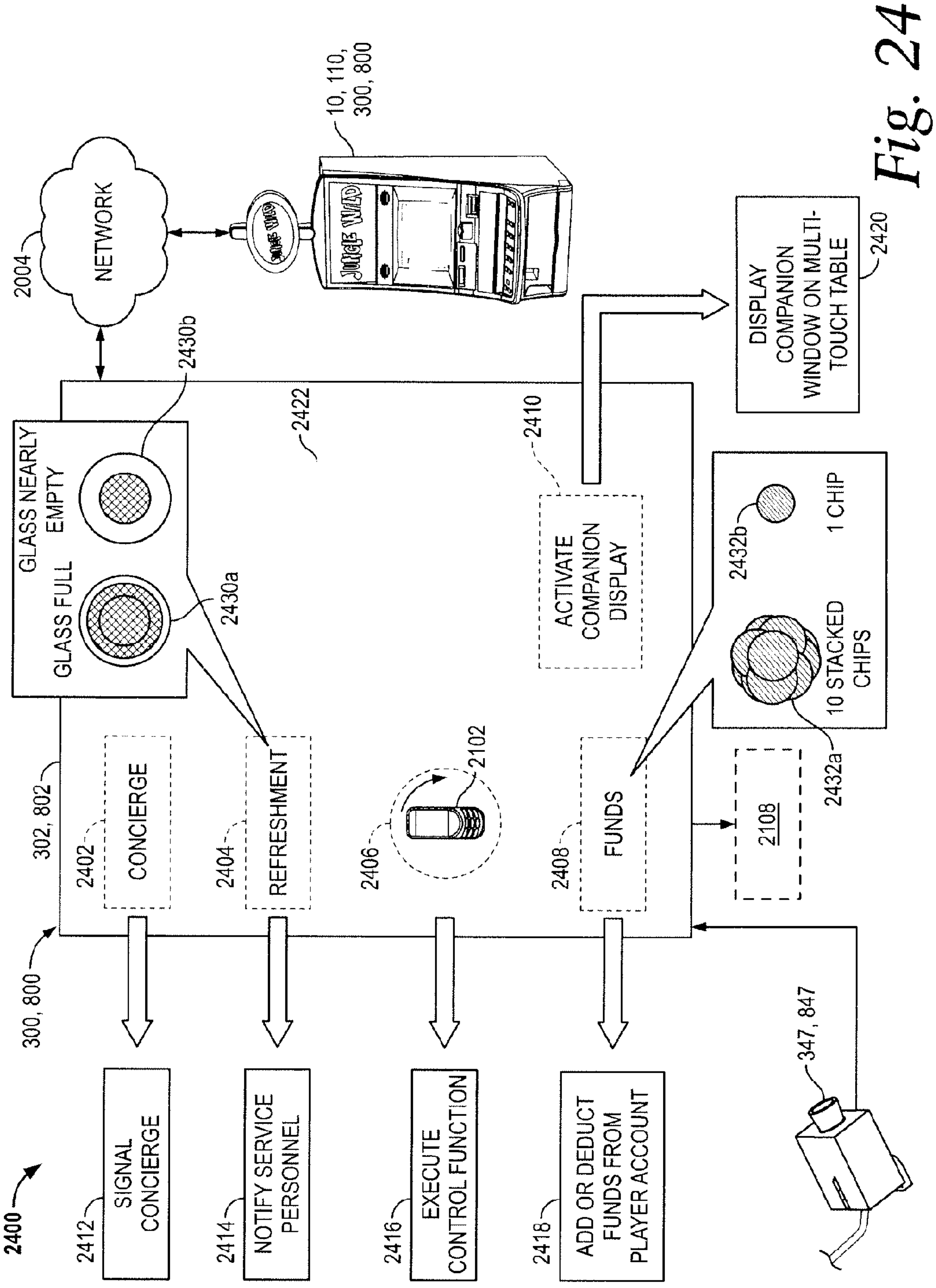
FIG. 24 is a functional block diagram of a surface of a multipoint sensing devices and associated components for causing wagering and non-wagering related functions to be performed.

FIG. 24 is a functional block diagram of the display surface 302, 802 and associated components for causing wagering and non-wagering related functions to be performed. Some designated regions 2402, 2406, 2410 are defined relative to the display surface 302, 802 such that when the portable device 2102 is placed in any of these regions or a player touches any area within any of these regions, the gaming system 300, 800 causes a wagering function 2416, 2418, 2420 or a non-wagering function 2412, 2414 to be carried out. Other designated regions 2404, 2408 are defined relative to the display surface 302, 802 and when an object is placed within any of these regions, the camera 347, 847 takes images of these objects which are analyzed by the gaming system to determine which non-wagering function, if any, to perform.

For example, a player can place a glass filled with a beverage in the refreshment area 2404 defined relative to the display surface 302, 802. The camera 347, 847 takes an images of the top view of the glass 2430*a* and also notes the diameter of the beverage. The diameter of the beverage will appear larger to the camera 347, 847 when the glass is full of the beverage and smaller when the glass 2430*b* is nearly empty. When the latter condition is satisfied, the gaming system 300, 800 automatically notifies casino service personnel (2414) of the location and the table. Another concierge region 2402 may be defined to cause a concierge or other service personnel to be summoned (2412) or to display a menu of concierge-related services, such as reservations, ordering a taxicab, online airline check-in, or hotel room service requests. The player may carry a service device, which may have a form factor that resembles a shamrock or good luck charm, which the player places in the concierge region 2402. The gaming system 300, 800 recognizes the service device and executes a service-related function 2412, such as by displaying a menu of service options relative to the display surface 302, 802.

These regions obviate the need for the player to leave the table 2400; concierge-related services can be ordered or serviced directly from the table 2400, the player may retrieve email messages and other content via the wireless transceiver 2104, the battery 2110 of the portable device 2102 carried by the player can be recharged by the inductive charging system 2106, the player can watch and place wagers on other wagering games 2422 being played elsewhere in the casino, funds can be added from a portable device 2102 carried by the player, to name a few examples. The fewer reasons there are for the player to leave the table 2400, the more likely that player will remain at the table 2400 as long as other ancillary needs are being serviced without requiring the player to interrupt game play in order to fulfill those ancillary needs.

Like the refreshment region 2404, when a player places chips 2432 in the funds region 2408, the higher the chips are stacked the larger the diameter of the topmost chip will appear to the camera 347, 847. Thus, the gaming system 300, 800 can monitor the diameter of the topmost chip 2432 to determine how many chips are stacked in the funds region 2408. The gaming system 300, 800 may also monitor the weight/pressure sensor 2108 to further verify the number of chips 2432 placed in the funds region 2408 based upon the known weight of a single chip. As the player adds or removes chips from the funds region 2408, the player's account may be incremented or decremented as appropriate to reflect the change in the amount of funds available to the player.

The funds region 2408 is also used to thwart cheating, where a player surreptitiously adds or removes chips being wagered during the wagering game, such as during a game of craps. The camera 347, 847 optionally in conjunction with the weight sensor 2108 captures the number of chips in the funds region 2408 just prior to initiation of the wagering game and again at the end of the wagering game. To the extent there is any discrepancy, the dealer, casino security, or other casino personnel may be notified automatically by the gaming system 300, 800. A video image of the alleged cheat may also be transmitted along with the notification.

A control region 2406 operates like the designated region 2200 shown in FIGS. 22*a*-22*b* and allows the player to manipulate or control an object or a virtual object, such as a virtual camera, by moving the portable device 2102 as if turning a dial within the control region 2406. When the portable device is moved in a manner recognized by the gaming system 300, 800, a control function associated with the recognized movement is executed (2416).

The display surface 302, 802 may also include a companion display region 2410, which when activated, causes a companion window 2422 to be displayed relative to the displays surface 302, 802, which shows a representation of another wagering game being played by another player at another gaming machine or system 10, 110, 300, 800 that is coupled via a network 2004 to the gaming system 300, 800 shown in FIG. 24. The size of the companion display 2422 can be manipulated by the player's fingers being moved along the display surface 302, 802 to stretch or shrink the size of the display 2422. Other regions may be defined to permit the player to place wagers on the companion wagering game 2422. Although only one is shown, multiple companion displays may be displayed relative to the display surface 302, 802.

Figure 25B:
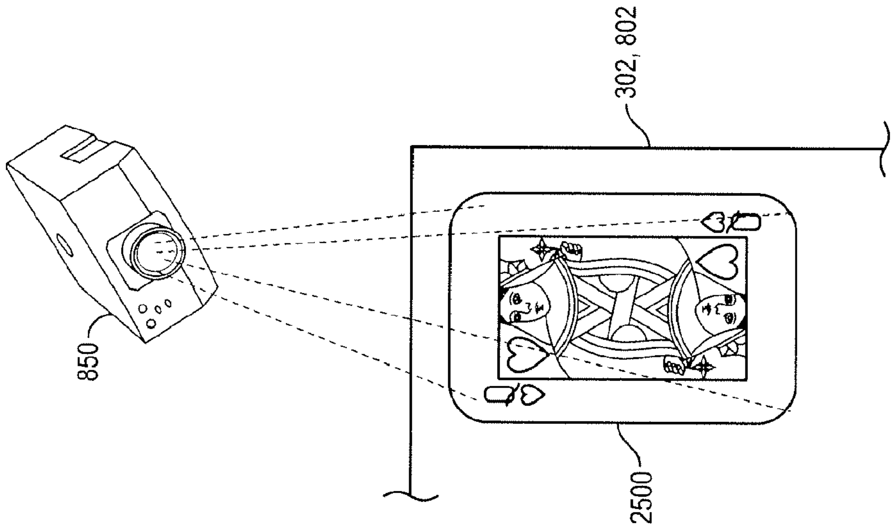
FIGS. 25*a* and 25*b* are exemplary functional illustrations of a blank card placed on a multipoint sensing device over which a projector is placed that projects onto the blank card a card face image.
Figure 25A:
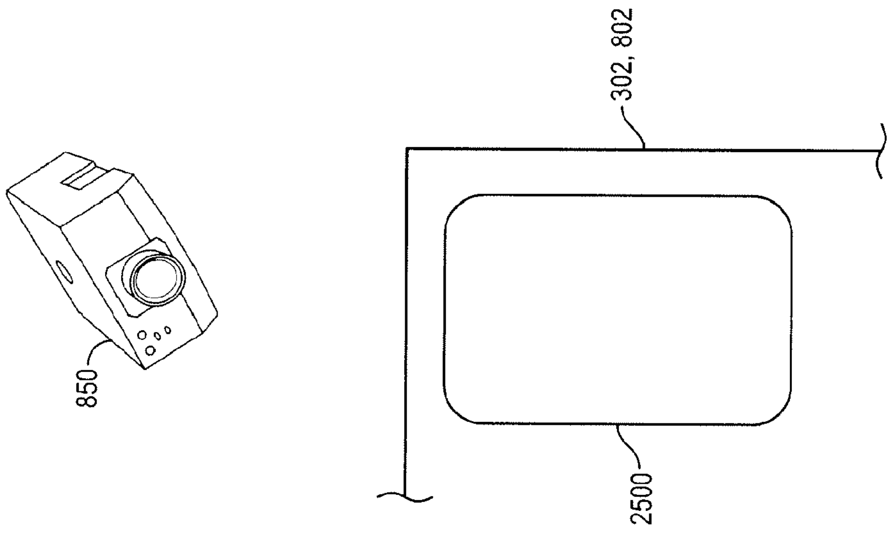

FIGS. 25*a*-25*b* are exemplary functional illustrations of a blank card placed on the display surface 302, 802 over which the projector 850 is placed that projects onto the blank card 2500 a card face image. The cards are used by the player in a wagering game played on the gaming system 300, 800. A video camera 347, 847 may also take an image of the card to determine how it is oriented on the display surface 302, 802 so that the image projected by the projector 850 is oriented so that the card face is aligned with the orientation of the card 2500. Some players prefer the physical feel of playing cards, which make them reluctant to play video wagering games where the cards are merely simulated.

The gaming system 300, 800 allows the players to use special blank cards while allowing the video images produced by the projector 850 to form the card faces. In addition, because the projector 850 can also project animated images, animations and other unusual video sequences may be displayed on the card face. For example, in a wagering game of Blackjack played on the gaming system 300, 800, if the Queen of Diamonds 2500 is dealt such that the total value of the cards exceeds 21, the expression on the Queen's face can be animated to appear to wince as if feeling the pain of the player at losing the hand. If Blackjack is dealt, text such as "Blackjack" may be projected across the cards or a short animation sequence may be projected onto the blank card faces having a celebratory or congratulatory theme. Other wagering-game images, such as a multiplier, may be displayed on the blank card 2500 for use in a bonus round, for example. For example, if the player achieves Blackjack in three consecutive rounds, the player may be awarded a multiplier that is displayed on the blank card 2500. A bonus game may be displayed near the Blackjack game on the display surface 302, 802, which the player can play before resuming play of the Blackjack game.

In this "blank card" Blackjack game, there is also no need to shuffle the cards, which will greatly increase the number of games that can be dealt per hour, thereby increasing the overall coin-in throughput to the casino. At the same time, the wagering game still retains the traditional feel of physical cards, which is attractive to those players who still prefer to play with traditional cards, thereby helping to bridge the gap between those players and players who are comfortable playing video card games.

The blank card 2500 may also include a pattern or ultraviolet tag printed on the back of the card 2500 (on the side facing the display surface 302, 802), which is detected by the gaming system 300, 800 for differentiated the card value. In other words, each card may have a designated card value that is encoded in the pattern or tag imprinted on its back, but may still have a blank front face. The gaming system 300, 800 coordinates the card-face image projected onto the card with its known face value, but may also animate that image or project other wagering-related images onto the blank face. In this implementation, the blank cards would need to be shuffled, because each card would have a predetermined value encoded on the back of each card.

Figure 26A:
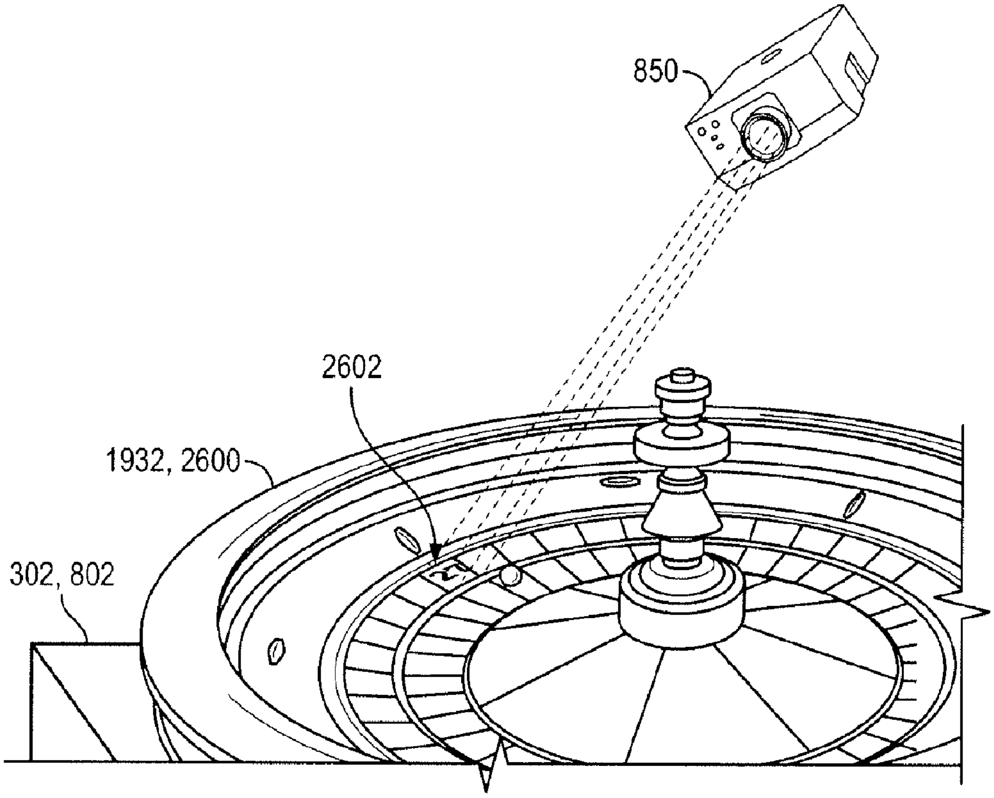
FIG. 26*a* is a perspective view of a multipoint sensing device upon which rests a physical roulette wheel whose number fields are blank until a projector projects a number onto the fields as the roulette wheel spins and comes to a stop.
Figure 26B:
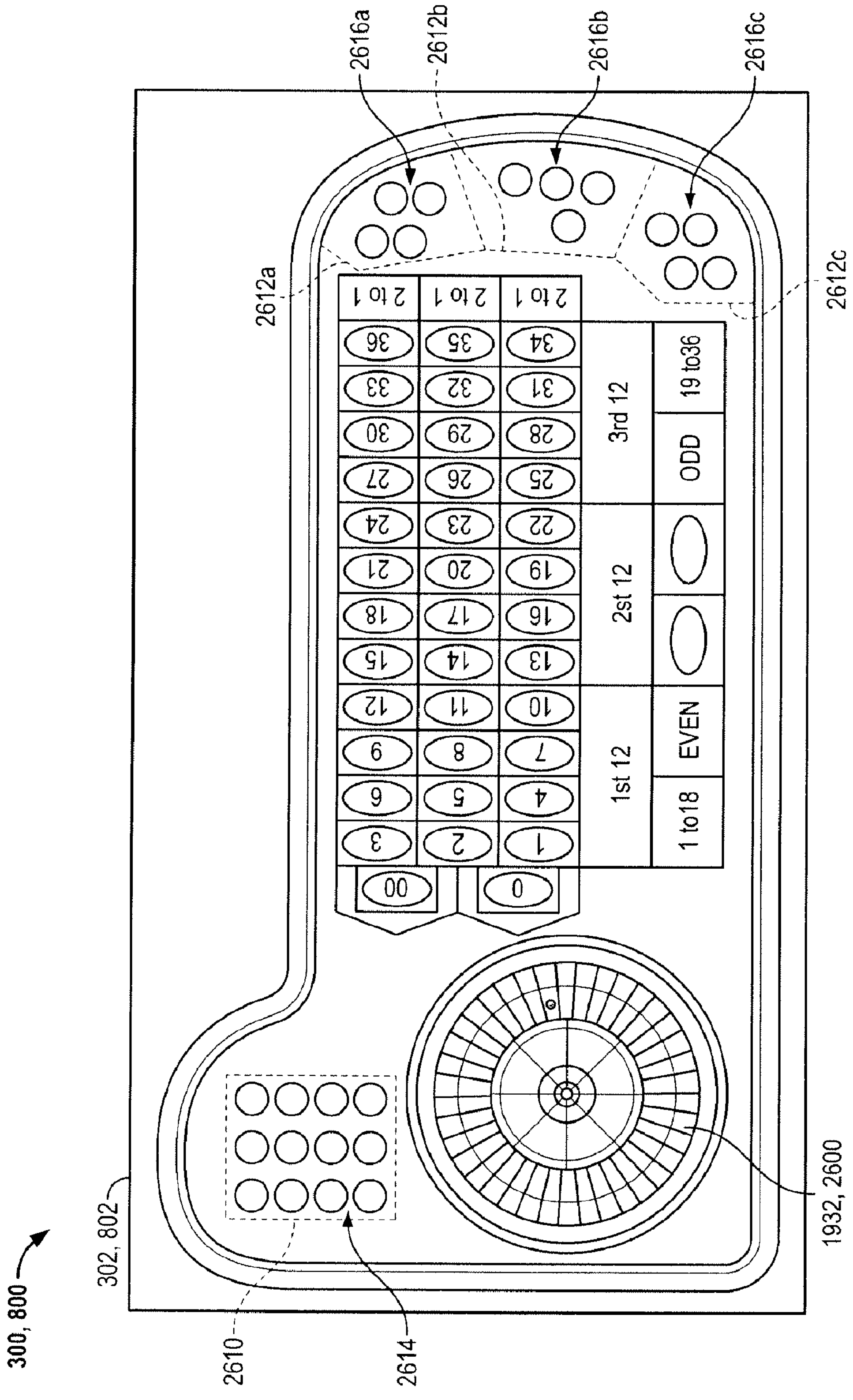
FIG. 26*b* is a top view of a roulette table displayed relative to a multipoint sensing device and the physical roulette wheel shown in FIG. 26*a*.

FIGS. 26*a* and 26*b* illustrate an implementation involving a physical roulette wheel 1932, 2600, on which the numbers in the pockets of the roulette wheel 1932, 2600 do not appear and instead are blanks. The projector 850 disposed above the roulette wheel 1932, 2600 projects onto the blanked number areas of the pockets a number 2602 as the roulette wheel 1932, 2600 is spinning and when it is at rest. The roulette wheel 1932, 2600 sits atop the display surface 302, 802 and a traditional roulette table is displayed on the display surface 302, 802 by the gaming system 300, 800. Animations or other video may also be projected by the projector 850 onto the roulette wheel 1932, 2600 as it is spinning or when it comes to a rest. Because there are not likely to be any obstructions placed in the field of view of the projector 850, the images from the projector 850 will be projected unimpeded by anything placed between it and the roulette wheel 1932, 2600.

FIG. 26*b* shows an overhead view of the roulette table displayed on the display surface 302, 802. Designated chip areas for the dealer 2610 and for the players 2612*a-c* are defined relative to the display surface 302, 802. The chips 2614, 2616*a-c* may be monitored by the video camera 347, 847 and optionally the weight/pressure sensor 2108, such as described above in connection with the funds region 2408 shown in FIG. 24. Although one projector 850 is shown, another projector may be utilized, one over the roulette wheel 1932, 2600 and the other for projecting the roulette table onto the display surface 302, 802. Depending upon the length of the display surface, multiple projectors may be needed to ensure clear, bright, and non-distorted images projected onto the display surface 302, 802.

The gaming system 300, 800 detects the rotational angle of the roulette wheel 1932, 2600 and the relative rotational angle of the ball so as to synchronize the projection onto the blank pockets the numbers such that the numbers appear to rotate at the same angular speed as the roulette wheel 1932, 2600. As the roulette wheel 1932, 2600 slows down, the numbers appear to be fixed relative to the pockets due to the synchronization of the rotational angle of the roulette wheel 1932, 2600 and the animations of the numbers that rotate with the roulette wheel 1932, 2600.

In another implementation, regular cards are played on the display surface 302, 802, with their values automatically being recognized via the camera 347, 847. During a game of Blackjack, for example, the camera 347, 847 may capture images of the cards being dealt, and through image or pattern recognition, the gaming system 300, 800 may automatically ascertain their values for purposes of determining whether a Blackjack event has occurred. If Blackjack has occurred, the gaming system 300, 800 may display a video bonus round on the display surface 302, 802.

Any of the embodiments, aspects, or implementations disclosed herein may be configured for a single player or multiple players.

General

In this detailed description, reference is made to specific examples by way of drawings and illustrations. These examples are described in sufficient detail to enable those skilled in the art to practice the inventive subject matter, and serve to illustrate how the inventive subject matter can be applied to various purposes or embodiments. Other embodiments are included within the inventive subject matter, as logical, mechanical, electrical, and other changes can be made to the example embodiments described herein. Features or limitations of various embodiments described herein, however essential to the example embodiments in which they are incorporated, do not limit the inventive subject matter as a whole, and any reference to the invention, its elements, operation, and application are not limiting as a whole, but serve only to define these example embodiments.

Such embodiments, aspects, or implementations of the inventive subject matter may be referred to herein individually or collectively by the term "invention" merely for convenience and without intending to voluntarily limit the scope of this application to any single invention or inventive concept, if more than one is in fact disclosed. Thus, although specific embodiments, aspects, and implementations have been illustrated and described herein, any arrangement calculated to achieve the same purpose may be substituted for the specific embodiments shown. This disclosure is intended to cover any and all adaptations or variations of various embodiments, aspects, or implementations. Combinations of the above embodiments, aspects, or implementations, and other embodiments, aspects, or implementations not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Description of the Embodiments, it can be seen that various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into this detailed description, with each claim standing on its own as a separate embodiment.

What is claimed is:

1. A multi-player gaming system comprising:

at least one input device for receiving a wager initiating a wagering game, the wagering game including one or more randomly selected game outcomes;

a display surface displaying game images associated with the wagering game;

a first identification device associated with a first player;

a second identification device associated with a second player;

a contact sensing device adjacent to the display surface, the contact sensing device detecting first contact data when the first player moves a wager asset across the display surface during the wagering game and associating the first contact data with the first player, the contact sensing device detecting second contact data when the second player subsequently moves the wager asset across the display surface during the wagering game and associating the second contact data with the second player, and the contact sensing device transmitting the detected first and second contact data to the first and second identification devices, respectively;

one or more processors;

at least one memory device storing instructions that, when executed by the one or more processors, cause the gaming system to:

receive the detected first and second contact data from the respective identification devices, and determine a transfer of a value of the wager asset from the first player to the second player based on the first and second contact data; and adjust, during the wagering game, credit balances of the first player and the second player to reflect the determined transfer of value.

2. The gaming system of claim 1, wherein the wager asset is a virtual wager asset.

3. The gaming system of claim 1, wherein the wager asset is a physical wager asset.

4. The gaming system of claim 2, wherein one of the first and second players directly contacts the display surface to move the virtual wager asset across the display surface.

5. The gaming system of claim 3, wherein one of the first and second players contacts the physical wager asset to move the physical wager asset across the display surface.

6. The gaming system of claim 1, wherein one of the first and second identification devices includes a receiver that is capacitively coupled to the first or second player, respectively.

7. The gaming system of claim 1, wherein the credit balances are adjusted by accessing a player account on a gaming server.

8. The gaming system of claim 1, wherein the credit balances are adjusted by modifying data on a player smartcard.

9. The gaming system of claim 1, wherein the credit balances are adjusted by modifying data on a portable data unit carried by the player.

10. The gaming system of claim 1, wherein the contact sensing device is a multi-point sensing device.

11. The gaming system of claim 1, wherein the first player moves the wager asset into a designated region of the display surface and the second player subsequently moves the wager asset out of the designated region of the display surface.

12. A computer-implemented method of tracking player transactions during a wagering game, the wagering game including one or more randomly selected game outcomes, at least part of the wagering game being conducted via game images displayed on a display device, the method comprising:

detecting, via a contact sensing device adjacent to the display surface, first contact data when a first player moves a wager asset across the display surface during the wagering game, and associating the first contact data with the first player;

detecting, via the contact sensing device, second contact data when a second player moves the wager asset across the display surface during the wagering game, and associating the second contact data with the second player;

transmitting the first and second contact data to a first and a second identification device associated with the first and second players, respectively;

determining, via one or more processors and based on the first and second contact data, a transfer of a value of the wager asset from the first player to the second player; and adjust, during the wagering game, credit balances of the first and second player to reflect the determined transfer of value.

13. The method of claim 12, wherein the wager asset is a virtual wager asset.

14. The method of claim 12, wherein the wager asset is a physical wager asset.

15. The method of claim 13, wherein one of the first and second players directly contacts the display surface to move the virtual wager asset across the display surface.

16. The method of claim 14, wherein one of the first and second players contacts the physical wager asset to move the physical wager asset across the display surface.

17. The method of claim 14, wherein the credit balances are adjusted by accessing a player account on a gaming server.

18. The method of claim 14, wherein the credit balances are adjusted by modifying data on a player smartcard.

19. The method of claim 14, wherein the credit balances are adjusted by modifying data on a portable data unit carried by the player.

20. The method of claim 14, wherein the first player moves the wager asset into a designated region of the display surface and the second player subsequently moves the wager asset out of the designated region of the display surface.

21. A machine-readable, non-transitory medium storing executable instructions that, when executed by one or more processors, cause a gaming system perform a method comprising:

receiving a wager to initiate a wagering game including one or more randomly selected game outcomes, at least a part of the wagering game being conducted via game images displayed on a display device;

detecting, via a contact sensing device adjacent to the display surface, first contact data when a first player moves a wager asset across the display surface during the wagering game, and associating the first contact data with the first player;

detecting, via the contact sensing device, second contact data when a second player moves the wager asset across the display surface during the wagering game, and associating the second contact data with the second player;

transmitting the first and second contact data to a first and a second identification device associated with the first and second players, respectively;

determining, via one or more processors and based on the first and second contact data, a transfer of a value of the wager asset from the first player to the second player; and adjust, during the wagering game, credit balances of the first and second player to reflect the determined transfer of value.

22. The medium of claim 21, wherein the system adjusts the credit balance by accessing a player account on a gaming server.

23. The medium of claim 21, wherein the system adjusts a credit balance by one of modifying data on a player smartcard and modifying data on a portable data unit carried by the player.

24. The medium of claim 21, wherein the first player moves the wager asset into a designated region of the display surface and the second player subsequently moves the wager asset out of the designated region of the display surface.

25. A multi-touch, multi-player gaming table operatively connected to a gaming device, the gaming device conducting a wagering game including one or more randomly selected game outcomes, the gaming table comprising:

a non-vertical, multi-player-accessible display surface displaying game images associated with the wagering game;

a contact sensing device a contact sensing device adjacent to the display surface, the contact sensing device detecting first contact data when the first player moves a wager asset across the display surface during the wagering game and associating the first contact data with the first player, the contact sensing device detecting second contact data when the second player subsequently moves the wager asset across the display surface during the wagering game and associating the second contact data with the second player, and the contact sensing device transmitting the detected first and second contact data to first and second identification devices, respectively;

one or more table processors;

at least one memory device storing instructions that, when executed by the one or more table processors, cause the gaming table to:

receive the detected first and second contact data from the respective identification devices, and determine a transfer of a value of the wager asset from the first player to the second player based on the first and second contact data;

adjust, during the wagering game, credit balances of the first player and the second player to reflect the determined transfer of value; and transmit, to the gaming device, the adjusted credit balances of the first and second players.

* * * * *